(12) United States Patent
Nix

(10) Patent No.: US 12,388,631 B2
(45) Date of Patent: Aug. 12, 2025

(54) SYSTEM AND METHODS FOR SECURE COMMUNICATION USING POST-QUANTUM CRYPTOGRAPHY

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 217 days.

(21) Appl. No.: 18/028,499

(22) PCT Filed: Sep. 24, 2021

(86) PCT No.: PCT/US2021/052099
§ 371 (c)(1),
(2) Date: Mar. 24, 2023

(87) PCT Pub. No.: WO2022/067132
PCT Pub. Date: Mar. 31, 2022

(65) Prior Publication Data
US 2023/0361994 A1 Nov. 9, 2023

Related U.S. Application Data

(60) Provisional application No. 63/083,259, filed on Sep. 25, 2020.

(51) Int. Cl.
*H04L 9/08* (2006.01)
*H04L 9/06* (2006.01)
*H04L 9/32* (2006.01)

(52) U.S. Cl.
CPC .......... *H04L 9/0852* (2013.01); *H04L 9/0618* (2013.01); *H04L 9/0819* (2013.01); *H04L 9/085* (2013.01); *H04L 9/3247* (2013.01)

(58) Field of Classification Search
None
See application file for complete search history.

(56) References Cited

U.S. PATENT DOCUMENTS 8,681,996 B2    3/2014  Sabev
8,782,774 B1    7/2014  Pahl
(Continued)

OTHER PUBLICATIONS

Wikipedia, "Post-Quantum Cryptography Standardization", Aug. 31, 2020.
(Continued)

*Primary Examiner* — William J. Goodchild
(74) *Attorney, Agent, or Firm* — GrowIP Law Group LLC

(57) ABSTRACT

A server and a device can conduct a secure session with (i) multiple post-quantum cryptography (PQC) key encapsulation mechanisms (KEM) and (ii) forward secrecy. The device can store a server static public key (PK.server) before establishing a secure session with the server. The device can use PK.server to encrypt a device ephemeral public key (ePK.device) into a first ciphertext. The first ciphertext can also include a device digital signature. The server can receive and decrypt the first ciphertext. The server can use the ePK.device to encrypt a server ephemeral public key (ePK.server) into a second ciphertext. The second ciphertext can also include a server digital signature. The device can receive and decrypt the second ciphertext. The device can encrypt application data into a third ciphertext using both PK.server and ePK.server. PK.server can support a first PQC algorithm and ePK.server can support a different, second PQC algorithm.

20 Claims, 14 Drawing Sheets

(56) References Cited

U.S. PATENT DOCUMENTS

| | | | |
|---|---|---|---|
| 9,531,685 | B2 | 12/2016 | Gero et al. |
| 9,819,656 | B2 | 11/2017 | Carlson |
| 9,985,782 | B2 | 5/2018 | McCallum |
| 10,218,504 | B1 * | 2/2019 | Kalach ................ H04L 9/0819 |
| 10,380,362 | B2 | 8/2019 | Nix |
| 11,153,080 | B1 | 10/2021 | Nix |
| 2008/0263363 | A1 * | 10/2008 | Jueneman ............ H04L 9/0877 713/184 |
| 2009/0049299 | A1 | 2/2009 | Jablon et al. |
| 2016/0013935 | A1 | 7/2016 | Pahl |
| 2019/0097793 | A1 | 12/2019 | Nix |
| 2020/0162269 | A1 | 5/2020 | Nix |

OTHER PUBLICATIONS

GSM Association, "iUICC POC Group Primary Platform requirements", Release 1.0, May 17, 2017.

ETSI Technical Standard 103 465 v.15.0.0, "Smart Cards; Smart Secure Platform (SSP); Requirements Specification", May 2019.

Bos, et al, "CRYSTALS—Kyber: a CCA-secure module-lattice-based KEM", NIST PQC Round 1 Submission Package, Nov. 2017.

Jao, et al, "Supersingular Isogeny Key Encapsulation", NIST PQC Round 2 Submission Package, Apr. 17, 2019.

Krawczyk, et al, "HMAC-based Extract-and-Expand Key Derivation Function (HKDF)", Internet Engineering Task Force (IETF), RFC 5869, May 2010.

Aragon, et al, "BIKE—Bit-Flipping Key Encapsulation", NIST PQC Conference, Apr. 13, 2018.

Fischlin, et al, "Multi-Stage Key Exchange and the Case of Google's QUIC Protocol", Association for Computing Machinery Conference on Computer and Communications Security 2014, p. 1193-1204, 2014.

Krawczyk, et al, "The OPTLS Protocol and TLS 1.3", Proc. IEEE European Symposium on Security and Privacy, 2016.

Federal Institute of Industrial Property, Russia, "International Search Report—PCT/US 2021/052099", Dec. 2, 2021.

Federal Institute of Industrial Property, Russia, "Written Opinion of the ISA", Dec. 2, 2021.

* cited by examiner

SYSTEM AND METHODS FOR SECURE COMMUNICATION USING POST-QUANTUM CRYPTOGRAPHY

CROSS-REFERENCE TO RELATED APPLICATIONS

The present application is a U.S. National Stage Application of International Application No. PCT/US2021/052099, filed on Sep. 24, 2021, which claims the benefit of U.S. Provisional Patent Application No. 63/083,259, filed on Sep. 25, 2020, both of which are incorporated by reference herein in their entireties.

BACKGROUND

Technical Field

The present systems and methods relate to devices and servers conducting secure communications using post-quantum cryptography (PQC) key encapsulation mechanisms (KEM), and more particularly to using both (i) ephemeral keys and (ii) at least one static key pair in order to improve efficiency, increase flexibility, and enhance security of data sessions across insecure networks.

Description of Related Art

Many protocols for secure communications through the public Internet depend on classical public key infrastructure (PM) algorithms of Rivest-Shamir-Adleman (RSA), Diffi-Hellman (DH), or elliptic curve cryptography (ECC). ECC algorithms include elliptic curve Diffie-Hellman (ECDH) key exchanges. Example protocols as of September 2020 include current, published versions of Transport Layer Security (TLS), Secure Shell (SSH), Datagram Transport Layer Security (DTLS), the embedded SIM from the GSMA, the Device Provisioning Protocol (DPP) from the WiFi Alliance™, the Open Firmware Loader from Global Platform, and IP Security (IPSec). Many other examples exist as well. The security of the majority of communications on the public Internet today depend on at least one of RSA, DH, or ECC based algorithms.

Although the use of RSA, DH, and ECC algorithms are included in many different protocols and standards, quantum computers are expected to be able to solve both (i) the elliptic curve discrete logarithm problem (for DH and ECC algorithms) and (ii) the integer factorization problem (for RSA algorithms) in polynomial time, while classical computers solve the problem in exponential time. As of mid 2020, estimates for the number of reasonable quality qubits required to feasibly break a 256 bit ECC public key to determine the private key with a reasonable computation time are approximately 2000-4000 qubits. Estimates for the number of equivalent qubits required to break a 3072 bit RSA based PM public key to determine the private key are approximately 4000-8000 qubits. The number of qubits can be significantly lower for qubits with longer stability and higher quality than available as of mid 2020.

Current industry projections of the number of qubits for operating quantum computers project the above number of qubits for breaking RSA, DH, and ECC PM cryptography could be available for a computing device in approximately 5 to 10 years and likely within 15 years. As one example, in September of 2020, IBM publicly announced plans to operate quantum computers with 127 qubits in 2021, 433 qubits in 2022, and 1121 qubits in 2023. Continued projections for those announced plans show quantum computers with 4000 qubits should be available around 2024 or 2025. Consequently, a need exists in the art for secure sessions to support cryptographic algorithms based on hard problems for quantum computers that are not based on either the elliptic curve discrete logarithm problem or the integer factorization problem. A need exists in the art for secure sessions to continue using PM keys, such that a public key can be publicly shared and corresponding private keys securely stored.

The National Institute of Standards and Technology (MST) in 2020 continues to conduct a project for Post-Quantum Cryptography (PQC) Standardization. The field of post-quantum cryptography continues to develop with proposed algorithms currently undergoing detailed evaluation for standardization as of September 2020. In general, the leading candidates for post-quantum cryptography key exchange or "key encapsulation mechanisms" (KEM) propose using lattice-based algorithms, code-based algorithms, or Supersingular Isogeny Key Encapsulation (SIKE). These proposed algorithms are described by the Wikipedia article for "Post-Quantum Cryptography" dated Aug. 31, 2020, which is hereby incorporated by reference and referred to as the Wikipedia PQC article. The above KEM algorithms propose, in summary, a first party deriving a PM key pair, sending a public key to a second party, receiving a ciphertext processed with the public key from the second party, and processing the ciphertext with a private key in order determine a shared secret key for both the first party and the second party.

The exemplary algorithms for PQC KEM standardization generally have less long-term, detailed study and confirmation of security of the associated underlying "hard" problems, compared to integer factoring and calculating discrete logarithms. Consequently, the emergence of practical quantum computers over the coming decade (which can feasibly solve current hard problems for PM cryptography commonly used) requires the industry to shift to cryptographic algorithms that have potential uncertainty for long-term security. In other words, it is currently not proven that lattice-based cryptography, code-based cryptography, or SIKE problems cannot be solved in polynomial time by either classical computers or quantum computers. A need exists in the art for secure sessions using PQC algorithms to provide security greater than the security provided by any single PQC algorithm (e.g. lattice-based, code-based, or SIKE), in order to reduce concerns and uncertainty about migrating from RSA, ECC, DH algorithms to PQC algorithms.

In order to address these concerns and uncertainty regarding the industry's upcoming transition away from classical cryptography to PQC, a need exists in the art for secure sessions to efficiently use a combination of at least two distinct algorithms, with one each from lattices, codes, and SIKE. A need exists in the art for the use of two different KEM algorithms to provide security at a level of at least the most secure of the two algorithms, such that if a first algorithm is determined insecure in the future, the overall session remains as secure as the level of second algorithm. A need exists in the art for a device and a server to efficiently support and negotiate KEM parameters in order to implement a secure session that uses two distinct KEM algorithms.

The most widely deployed standard for secure sessions on the public Internet today is TLS version 1.2 as specified in the Internet Engineering Task Force (IETF) 5246. As one example, the Payment Card Industry Security Standards Council recommends at least TLS v1.2 as of mid-2020. TLS version 1.2 normally requires that four handshake messages are exchanged before a device or client can send a server encrypted application data. The four handshake messages result in a single initial shared secret key and symmetric encryption derived from a single PM algorithm (e.g. RSA, DH, or ECDH). TLS version 1.3 supports a device or client sending the server encrypted device application data after two handshake messages (e.g. "Client Hello" and "Server Hello"), but again only supports a single initial shared secret key derived from a single PM algorithm. The security for both TLS 1.2 and TLS 1.3 depends on single PM key pairs, such that if one PM key pair is compromised (such as the secret key is no longer secret), then the security of the session is compromised. A need exists in the art for a secure session to depend on more than one PM key pair, such that if a single PM key pair is compromised, then they a data session can remain secure based on at least a second, different PM key pair used to secure the session.

Secure sessions between a device and a server should also preferably support forward secrecy. In general forward secrecy is supported through the use of at least one ephemeral PM key pair from either the device or the server. In this manner, shared secret keys and resulting symmetric ciphering keys are generally not compromised from the release or compromise of a static private key used to establish the secure session. As one example, TLS v 1.3 provides forward secrecy through the use of two ephemeral ECDH PM key pairs (one for the client and one for the server). However, the two ephemeral ECDH PM key pairs are used for a single ECDH key exchange which results in both (i) a single initial shared secret key and (ii) security that depends on a single algorithm (e.g. ECC). A need exists in the art for a client/device and a server/host to both (i) obtain forward secrecy through the use of ephemeral PM keys, and (ii) obtain security for the session from two distinct PQC algorithms (e.g. two different algorithms from lattice-based algorithms, code-based algorithms, and SIKE).

Likewise, conventional technology for secure sessions in TLS v1.2, TLS v.1.3, Secure Shell (SSH), IPSec, etc. (when using PM algorithms) conduct a key exchange that results in a single initial shared secret key, such as a single "handshake secret" or "pre-master secret", where all subsequent shared secret keys are derived from the single "handshake secret" or "pre-master secret". As one example with ephemeral ECDH with TLS v1.3, a single ECDH is conducted using the client/device ephemeral PM key pair and the server/host ephemeral PM key pair in order to derive a handshake secret. The security of the handshake secret depends on the security of the single ECDH algorithm, which is likely compromised by practical quantum computers with sufficient qubits within about a decade. A need exists in the art for secure sessions to (i) derive at least two independent shared secrets equivalent to a conventional "handshake secret" from two different PQC KEM algorithms, and (ii) securely use the two independent shared secrets to derive a symmetric ciphering key for use by both a device and a network.

Even through the use of ephemeral PM key pairs and attempted forward secrecy, ephemeral ECC public keys are at a significant risk of being "broken" over the coming decade by quantum computers, such that a private key could be determined based on the public key. Breaking a single ephemeral public key in an ECDH key exchange breaks the security and forward secrecy for the session. Billions of new devices are being deployed over the next several years which connect to the Internet. Many of these devices for the "Internet of Things" such as smart meters for utility grids, or navigation systems within cars, or industrial equipment, may remain operational for more than a decade. Consequently a need exists in the art for security and encryption protocols to remain secure for more than the coming decade, when quantum computing may feasibly break traditional or classical PM algorithms, PM keys, and associated key exchanges using conventional and currently widely deployed technology. A need exists in the art for new devices to use (i) PQC KEM algorithms in a manner that resists quantum computers with rapidly growing quantum processing power, instead of (ii) classical PM algorithms based on RSA, DH, and ECC.

With conventional technology, KEM algorithms with openly shared public keys can be subject to "Man in the Middle" (MITM) attackers that can try to substitute public keys such as an unauthenticated device ephemeral public key, and/or a server ephemeral public key with an ephemeral public key for the attacker. Establishing a secure session with KEM algorithms that are resistant to MITM attackers increase complexity as well as potentially requiring additional message and data shared within the handshake messages. A need exists in the art for both a device and a server or network to efficiently use PQC KEM algorithms with the minimum number of handshake messages and reduced additional data in order to establish secure communications resistant to a MITM attacker.

For many applications supporting the "Internet of Things" (IoT), a device manufacturer or device owner can securely pre-configure a device to store at least one static public key associated with a network. The at least one static public key can be used (i) for encryption and (ii) to generate shared secrets such as for a key agreement (KA) protocol. A need exists in the art for a device to use the network static public key to securely communicate an ephemeral public key for the device to a server, such that a MITM attacker cannot feasibly (i) read the device ephemeral public key and (ii) substitute the device ephemeral public key for a fraudulent ephemeral public key of the MITM attacker. Likewise, a need exists in the art for the server to use the network static private key (corresponding to the network static public key) in order to securely communicate an ephemeral public key for the server to the device, such that a MITM attacker cannot feasibly (i) read the server ephemeral public key and (ii) substitute the server ephemeral public key for a fraudulent ephemeral public key of the MITM attacker.

As noted above, TLS 1.2 requires typically four handshake messages before a device can send secure ciphertext to a server. A device using TLS 1.3 can receive ciphertext from a server within a "server hello" after a "client hello". The "server hello" message can comprise the first response message in response to the "client hello" as the first client message. As noted above, the ciphertext within TLS 1.3 and within a "server hello" will depend on a single algorithm (ECDH). Likewise, the ciphertext within the "server hello" message can be easily read by a MITM attacker that substitutes the client ephemeral public key with an attacker ephemeral public key. A need exists in the art for a device to receive ciphertext from a server or network in the first response messages (which could be referred to as a "server hello" message), such that the ciphertext (i) is secured by at least two different PQC algorithms, and (ii) is infeasible for a MITM attacker to read the ciphertext within the first response message. Likewise, a need exists in the art for a device to send encrypted device data in the first message from the device to a server or network in a manner where the encrypted device data cannot be feasibly read by a MITM attacker or intermediate routers transferring the encrypted device data through the public Internet.

Many other examples exist as well for needs in the art for devices and servers or networks to securely support PQC KEM algorithms resistant to quantum computers. The above examples are just a few and intended to be illustrative instead of limiting.

SUMMARY

Methods and systems are provided for a device and a server to establish secure communications based on post-quantum cryptography (PQC) key capsulation mechanisms (KEM). The methods and systems provided herein can address exemplary needs in the art described above and other benefits are available as well, including increasing the security from using multiple KEM for establishing a secure session or secured communications. In exemplary embodiments, a device or client can support a first set of PQC KEM algorithms and a server can support a second set of PQC KEM algorithms. The first and second sets of PQC KEM algorithms can support at least a first mutually shared PQC KEM algorithm and a second mutually shared PQC KEM algorithm. For some embodiments, the first and second sets of PQC KEM algorithms can also support and a third mutually shared PQC KEM algorithm. Before connecting with a server, a device can store a server static public key PK.server for the first mutually shared PQC KEM algorithm. The device can derive a device ephemeral public key and device ephemeral private key for the second mutually shared PQC KEM algorithm.

The device can conduct a first KEM ENCAPS using the server static public key PK.server in order to generate a first asymmetric ciphertext and a first shared secret key K1. The device can generate a first symmetric ciphering key S1 using at least the first shared secret key K1 and a first HKDF. As contemplated herein, a HKDF can comprise a HMAC-based Extract-and-Expand Key Derivation Function (HKDF) equivalent to the HKDF described in the Internet Engineering Task Force (IETF) Request for Comments (RFC) 5869. The device can select a first plaintext comprising (i) the device ephemeral public key, (ii) an identifier or code specifying the second mutually shared PQC KEM algorithm for the device ephemeral public key, and (ii) the first set of PQC KEM algorithms supported by the device. The device can use the first symmetric ciphering key S1 to encrypt the first plaintext into a first symmetric ciphertext symm-C1. The device can send the server a first message, which could comprise a "Client Hello" message. The first message can include both the first asymmetric ciphertext C1 and the first symmetric ciphertext symm-C1. The first message can include an identity for the server static public key PK.server as a plaintext or metadata. Or, the first message can include identification information such that a network or server could select the server static public key PK.server and the associated first mutually shared PQC KEM algorithm and process the first asymmetric ciphertext using the identification information as plaintext or metadata within the first message.

The server or network can receive the first message and select a server static private key SK.server using the identity for the server static public key PK.server in the first message. The server can conduct a KEM DECAPS using the server static private key SK.server and the first mutually shared PQC KEM algorithm in order to generate the first shared secret key K1. The server can generate the first symmetric ciphering key S1 using at least the first shared secret key K1. The server can decrypt the first symmetric ciphertext using the first symmetric ciphering key S1. The server can read the first plaintext that includes (i) the device ephemeral public key, (ii) an identifier or code specifying the second mutually shared PQC KEM algorithm for the device ephemeral public key, and (ii) the first set of PQC KEM algorithms supported by the device. For some embodiments, the first and second mutually shared PQC KEM algorithm can be the same algorithm and do not have to specify different PKC KEM algorithms.

The server can select the third mutually shared PQC KEM algorithm from overlap between (i) the first set of PQC KEM algorithms supported by the device and (ii) the second set of PQC KEM algorithms supported by the server. The first mutually shared PQC KEM algorithm can be within the first set of PQC KEM algorithms and the second mutually shared PQC KEM algorithm can be within the second set of PQC KEM algorithms. In exemplary embodiments the second mutually shared PQC KEM algorithm selected by the device can support a type comprising one of lattice-based cryptography, code-based cryptography, and SIKE. In exemplary embodiments the third mutually shared PQC KEM algorithm selected by the server can support a type both (i) comprising one of lattice-based cryptography, code-based cryptography, and SIKE, and (ii) different than the type selected by the device. In this manner, two different types of PQC KEM algorithms can be mutually supported and subsequently used by both the device and the server. As described above, the first mutually shared PQC KEM algorithm is associated with the server static public key PK.server stored by the device.

An exemplary system can include a computing device and a server. The server can be operated and controlled by a network. The server can include server computing hardware, where computer hardware can comprise electrical components for processing, storing, sending or transmitting, and receiving data, including communication with other nodes via data networks. For some exemplary embodiments, a server can comprise a virtual machine operating on a host server, where the host server includes server computing hardware. Server computing hardware can include at least one processor in order to store and record data as well as communicate with other nodes over an IP network, such as with a computing device operating at a remote location from the server.

The computing device could comprise a smartphone, a laptop computer, a second server, a smart camera, an intelligent sensor for the "internet of things", a tracking device, health monitoring equipment in a hospital, a desktop computer, and other possibilities exist as well. The computing device operates a client program or executable instructions by a processor in the device for communicating with the server. Both the device and the server can store cryptographic algorithms for processing both (i) the second mutually shared PQC KEM algorithm selected by the device and (ii) the third mutually shared PQC KEM algorithm selected by the server. The first mutually shared PQC KEM algorithm can be specified for the server static public key PK.server stored by the device. Both the device and the server can store (i) a first set of parameters associated with the second mutually shared PQC KEM algorithm selected by the device and (ii) the third mutually shared PQC KEM algorithm selected by the server.

The server can derive a server ephemeral private key and a corresponding server ephemeral public key using the third mutually shared PQC KEM algorithm selected by the server. The server can conduct a second KEM using a KEM encapsulation function (KEM ENCAPS) with (i) the received device ephemeral public key from the first message and (ii) the second mutually shared PQC KEM algorithm selected by the device. The output of the KEM ENCAPS can be both (i) a second asymmetric ciphertext C2 and (ii) a second shared secret key K2. In exemplary embodiments, the server can generate a second symmetric ciphertext symm-C2 with input of the second asymmetric ciphertext C2 as a second plaintext and the first symmetric ciphering key S1. In other words, the second symmetric ciphertext symm-C2 can comprise the second asymmetric ciphertext C2 that is "double encrypted".

The server can store a server certificate and a corresponding server static public key for digital signatures. The server static public key PK.server stored by the device before sending the first message can comprise a server static public key for a KEM. The server can generate a server digital signature over at least (i) the derived server ephemeral public key, and (ii) at least one of the first asymmetric ciphertext C1 and the second shared secret key K2. The server can use a second hash-based key derivation function (HKDF) with at least the first shared secret key K1 and the second shared secret key K2 to derive at least a second symmetric ciphering key S2. As discussed above, the HKDF can be a HMAC-based Extract-and-Expand Key Derivation Function (HKDF).

The server can use a second HKDF with at least the second shared secret key K2 to derive at least a second symmetric ciphering key S2. For preferred exemplary embodiments, the server can use at least both (i) the first shared secret key K1 output from the device KEM DECAPS function (with the server static private key for PK.server) and also (ii) the second shared secret key K2 output from the server KEM ENCAPS function (with the device ephemeral public key) in order to derive at least the second symmetric ciphering key S2. In this manner, the second symmetric ciphering key S2 can provide a security level of at least the stronger of the first KEM (e.g. used the KEM DECAPS for the server) and the second KEM (e.g. used with the KEM ENCAPS for the server). Thus, if one KEM is later found compromised or broken in the future, the second symmetric ciphering key S2 can remain secured by the other KEM. This feature provides benefits over conventional technology and addresses needs in the art identified above, where a current PQC algorithm proposed for standardization could have currently unidentified weaknesses identified in the future. In other words, the input of both the first shared secret key K1 and the second shared secret key K2 into the second HKDF to derive the second symmetric ciphering key S2 can provide an overall higher level of security, and other benefits can be achieved as well.

The server can use a symmetric ciphering algorithm and the second symmetric ciphering key S2 to encrypt into a third symmetric ciphertext symm-C3 at least (i) the derived server ephemeral public key ePK.server, (ii) an identity or code for the third mutually shared PQC KEM algorithm selected by the server, (iii) the server certificate, and (iv) the server digital signature. The server can generate a response second message that includes at least (i) metadata for the symmetric ciphering algorithm (e.g. at least an identity or parameters for the symmetric ciphering algorithm), (ii) the second symmetric ciphertext symm-C2, and (iii) the third symmetric ciphertext symm-C3. The server can send the response second message to the device, and the response second message can comprise a "Server Hello" message.

The device can receive the response second message and conduct a series of steps in order to process the message. The device can use the first symmetric ciphering key S1 to decrypt the received second symmetric ciphertext symm-C2 in order to read a second plaintext comprising the second asymmetric ciphertext C2. The device can conduct the second KEM using a KEM decapsulation function (KEM DECAPS) with the received second asymmetric ciphertext in order to mutually derive or generate the second shared secret key K2. The device can use the second HKDF with at least the first shared secret key K1 and the second shared secret key K2 to mutually derive at least the second symmetric ciphering key S2.

The device can use (i) the metadata, (ii) the symmetric ciphering algorithm, and (iii) the mutually derived second symmetric ciphering key S2 to decrypt the third symmetric ciphertext symm-C3 into a third plaintext. Note that the third plaintext includes at least the server ephemeral public key ePK.server and associated parameters, and may also include a server certificate and a server digital signature. The device can use the server certificate from the third plaintext to verify the digital signature. Note that the digital signature is verified over at least one of the second asymmetric ciphertext C2 and the second shared secret key K2, and in this manner the device can confirm that the second asymmetric ciphertext C2 and the corresponding response second message originated by the server (and not from a potential "Man in the Middle" attacker). The device can verify the server certificate up to a securely stored certificate issuer certificate. In some embodiments, the server digital signature can also be over the server ephemeral public key ePK.server.

The device can conduct a third KEM using a KEM encapsulation function (KEM ENCAPS) with (i) the received server ephemeral public key from the third plaintext (e.g. transmitted within the third symmetric ciphertext symm-C3) and (ii) the third mutually shared PQC KEM algorithm selected by the server also from the third plaintext. The output of the KEM ENCAPS can be both (i) a third asymmetric ciphertext C3 and (ii) a third shared secret key K3. The device can use at least the first, second, and third shared secret keys K1, K2, and K3 and a third HDKF in order to generate a third symmetric ciphering key S3.

In some exemplary embodiments, the third asymmetric ciphertext C3 can be "double encrypted" into a fourth plaintext comprising a fourth symmetric ciphertext symm-C4 by the device using the second symmetric ciphering key S2 and the symmetric ciphering algorithm. In other words, the third asymmetric ciphertext C3 can be data that is asymmetrically encrypted using the third mutually shared PQC KEM algorithm. The encrypted fourth symmetric ciphertext symm-C4 can comprise plaintext data that is both (i) asymmetrically encrypted using the third KEM ENCAPS and then also (ii) symmetrically encrypted using the second symmetric ciphering key S2. As contemplated herein, a symmetric ciphering algorithm can use both a symmetric ciphering key and a corresponding message authentication code (MAC) key. In other exemplary embodiments, the third asymmetric ciphertext C3 can be "MACed" with a MAC key generated by the second HKDF, and a symmetric encryption of the third asymmetric ciphertext C3 could be omitted. Device can specify second metadata for a third message below that indicates if the device sends the server the third asymmetric ciphertext C3 as a "double encrypted" fourth symmetric ciphertext symm-C4, and other possibilities exist as well for a device and a server to specify the use and communication of a "double encrypted" fourth symmetric ciphertext symm-C4.

The device can select a fifth plaintext for encryption to include in a third message, which could comprise data for a "Client Finished" message. The fifth plaintext could include (i) final handshake data and also potentially (ii) application data from the device to the server. The application data could be sensor data, device configuration data, a registration message, and other possibilities exist as well. The device can use (i) the metadata from the response second message, (ii) the symmetric ciphering algorithm, and (iii) the derived third symmetric ciphering key S3 to encrypt the fifth plaintext into a fifth symmetric ciphertext symm-C5. The device can send the server the third message, where the third message can include at least the fourth symmetric ciphertext symm-C4 (possibly as a "double encrypted" third ciphertext C3) and the fifth symmetric ciphertext symm-C5.

The server can receive the third message and conduct a series of steps to process the third message. In preferred exemplary embodiments where the third message includes the "double encrypted" third asymmetric ciphertext C3, the server can use the symmetric ciphering algorithm and the second symmetric ciphering key S2 to decrypt the "double encrypted" third asymmetric ciphertext C3 from the fourth symmetric ciphertext symm-C4 into a plaintext third asymmetric ciphertext C3. After removal of the symmetric encryption, the server can read the third asymmetric ciphertext C3 which comprises data that has been asymmetrically encrypted by the device.

The server can conduct a third KEM using a KEM decapsulation function (KEM DECAPS) with (i) the third asymmetric ciphertext C3, and (ii) the third mutually shared PQC KEM algorithm selected by the server. The output of the KEM DECAPS can be the third shared secret key K3. The server can use the third HKDF with at least the third shared secret key K3 to mutually derive at least the third symmetric ciphering key S3. For preferred exemplary embodiments, the server can use at least both (i) the first shared secret key K1 output from the server KEM DECAPS function (using SK.server) and also (ii) the second shared secret key K2 output from the server KEM ENCAPS (using ePK.device) function and also (iii) the third shared secret key K3 output for the server KEM ENCAPS (using eSK.server) function in order to derive at least the third symmetric ciphering key S3.

The security benefits for including all of the first and second and third shared secret keys K1 and K2 and K3 in the generation of the third symmetric ciphering key S3 are described above for the device generation of the second symmetric ciphering key S2 (where multiple different KEM algorithms can be used to generate symmetric ciphering keys S2 and S3). In other words, the symmetric ciphering keys S2 and S3 as contemplated herein can be derived using multiple PQC KEM algorithms independently, and if any single PQC KEM algorithm is found broken or significantly weakened in the future, the symmetric ciphering keys S2 and S3 (as well as MAC keys) can be protected by at least one other and different PQC algorithm.

The server can use (i) the symmetric ciphering algorithm, and (ii) the mutually derived third symmetric ciphering key S3 to decrypt the fifth symmetric ciphertext symm-C5 into the fifth plaintext. The server can confirm the final device handshake message from the third plaintext. The server can subsequently process deice application data and derive additional symmetric ciphering keys using at least the first and second and third shared secret keys K1 and K2 and K3.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS OF THE INVENTION

FIG. 1

Figure 1:
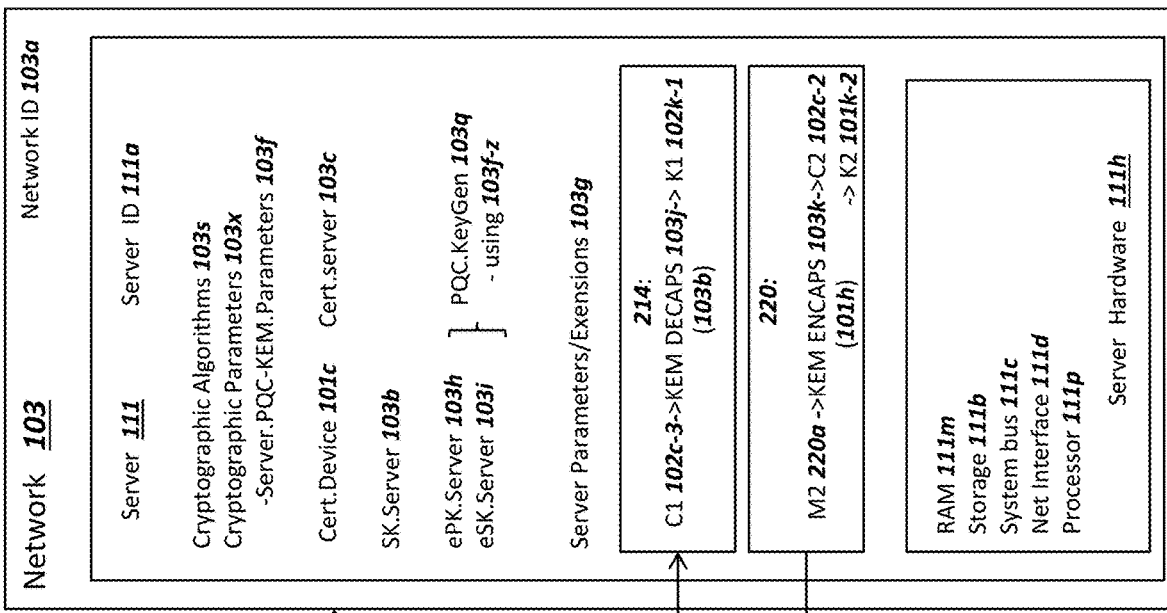
FIG. 1 is a graphical illustration of an exemplary system, where a device and a network process and communicate data in order to establish secure communications, in accordance with exemplary embodiments.

FIG. 1 is a graphical illustration of an exemplary system, where a device and a network process and communicate data in order to establish a secure communications, in accordance with exemplary embodiments. The system 100 can include a device 101, an Internet Protocol (IP) network 107, and a network 103. The depicted nodes or entities can communicate data 106 over the IP network 107. Although a single device 101 and a single network 103 are depicted in FIG. 1, a system 100 can comprise a plurality of each of the depicted nodes or entities. A system 100 as depicted in FIG. 1 can support secure sessions between the device 101 and the network 103 such as, but not limited to, using a protocol for Transport Layer Security (TLS), Datagram Transport Layer Security (DLTS), a virtual private network (VPN), IP Security (IPSec), Secure Shell (SSH), and a Wireguard VPN. Other possibilities exist as well for secure protocols supported between device 101 and network 103, without departing from the scope of the present disclosure.

Device 101 and network 103 can utilize a variety of wireless wide area network (WAN) and wireless local area network (LAN) wireless and technologies to communicate data 106 between the nodes, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, and 5G or subsequent wireless technologies. In addition, the wireless technology used by device 101 and network 103 could support or implement wireless LAN technologies such as WiFi and the related series of standards from IEEE 802.11 standards, such as 802.11ac, 802.11 ax, etc. Other examples exist as well for wireless WAN technology and/or wireless LAN technology used by device 101 and network 103 without departing from the scope of the present disclosure.

Network 103 can also connect to the IP network 107 and send/receive data 106 other via a wired connection such as, but not limited to, an Ethernet connection, or a fiber optic connection. In other words, for some exemplary embodiments, network 103 can connect to IP network 107 using a wired connection, and device 101 can connect to IP network 107 using a wireless connection. IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. A private IP network overlayed on IP network 107 could utilize private IP addresses which could also be referred to as an Intranet. Other possibilities for device 101 and network 103 to communicate data through an IP network 107 exist as well without departing from the scope of the disclosure.

Device 101 can be a computing device for sending and receiving data using a radio 101r. Device 101 can take several different embodiments, such as a general purpose personal computer, a laptop computer, a mobile phone or mobile handset based on the Android® or Fuchsia from Google e or the IOS operating system from Apple®, a tablet, a device with a sensor or actuator for the "Internet of Things", a module for "machine to machine" communications, a device that connects to a wireless Wide Area Network (WAN) operated by a mobile network operator, a router, and/or a server, and other possibilities exist as well for the embodiments of a device 101 without departing from the scope of the present disclosure. Device 101 can connect to IP network 107 with a wired connection such as Ethernet or fiber-optic lines, for embodiments where device 101 comprises a server, router, personal computer, etc.

The electrical components within device 101 can include a memory 101m, a processor 101p, a radio 101r, a sensory 101y, an actuator 101z, and a user interface 101w. As depicted in FIG. 1, a data bus 101t or a system bus 101t could internally electrically connect the depicted components within a device 101. Additional components to support the operation of device 101 can include a battery to store electrical power, and an antenna to transmit and receive RF signals. The sensor 101y can collect data external or internal to the device 101, such as temperature, motion, position, pressure, etc. A device 101 could also include the actuator 101z to convert electrical signals into physical actions, such as a motor for moving components, a relay for opening or closing a circuit, a speaker for outputting sound, etc.

Memory 101m can comprise combinations of (i) volatile random access memory and (ii) nonvolatile memory. The volatile memory can include random access memory (RAM) for relatively fast read and write operations, such as SRAM or DRAM compared, to nonvolatile memory. RAM for memory 101m could also include persistent RAM or non-volatile RAM (NVRAM), such that data in a persistent RAM memory or nonvolatile RANI is stored when power is removed. Nonvolatile memory can include storage memory such as a flash memory and record or store data when power is removed from device 101. In general, different forms and electrical components for memory 101m can be used without departing from the scope of the present disclosure. Processor 101p can comprise a central processing unit (CPU) or a "system on a chip" and be similar to a processor 111p for a server 111 described below, but with reduced capabilities for a device 101 compared to a processor 111p for a network 111.

Tamper resistant element (TRE) 113 can comprise a tamper resistant element as described in the GSMA PP Requirements document, titled "iUICC POC Group Primary Platform requirements", Release 1.0 dated May 17, 2017, which is hereby incorporated by reference in its entirety ("GSMA PP Requirements"). TRE 113 can also comprise the secure element as described in the ETSI SSP Requirements document ETSI TS 103 465 V15.0.0 (2019-05) titled "Smart Cards; Smart Secure Platform (SSP); Requirements Specification" ("ETSI SSP Requirements"), which is hereby incorporated by reference in its entirety. Tamper resistant element 113 can comprise a silicon enclave within a tamper resistant chip such as a "system on chip" operating within processor 101p. In addition, processor 103p for network 103 can include a TRE and a primary platform 109.

TRE 113 can include a primary platform (PP) 109, where a primary platform is also described in both the GSMA PP Requirements document and the SSP Requirements document. TRE 113 could also comprise a "Smart Secure Platform" (SSP) as described in the SSP Requirements document, such as the SSP depicted in FIG. 2 of the "Architecture" section 9.2.1. Primary platform 109 can comprise a secure operating environment, a secure enclave, a secure element, and include a dedicated processing core within a processor for device 101. Primary platform 109 can also operate in a Trusted Execution Environment (TEE) within a processor for device 101. Primary platform 109 can also comprise a SSP as contemplated by ETSI documents and draft specifications for 5G networks.

TRE 113 and PP 109 can support a variety of applications. TRE 113 can comprise the physical device such as a dedicated processing core or silicon area within a processor 101p in FIG. 1, and a primary platform 109 can comprise a secure processing environment operating within the TRE 113. With appropriate configured secondary platform bundle, TRE 113 and PP 101 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 101, a virtual key for cars or door locks, an secure environment for recording an identity and secret or private keys for drivers licenses, passports, online or web-site access, etc.

For some exemplary embodiments, the steps and data processing conducted by device 101 to establish a secure session such as the steps and data processing depicted and described for a device 101 in FIG. 2 and FIG. 9 below can be conducted by a secondary platform bundle operating within a primary platform 109 within a processor 101p. In other exemplary embodiments, the use of a TRE 113 and PP 109 could be (i) omitted or substituted with similar secure enclave or secure processing environment technology. For these embodiments, the processor 101p within device 101 could perform the steps and data processing depicted and described for a device 101 in FIG. 2 and FIG. 9 below without the use of a TRE 113 and PP 109. Note that the use of a TRE 113 and PP 109 could be omitted for some embodiments of a device 101, and the steps and data processing for a device 101 depicted in FIG. 2 and FIG. 9 below (as well as subsequent Figures herein) could be conducted using the processor 101p and other depicted electrical components for a device 101.

Device 101 may include radio 101r support radio-frequency (RF) communications with networks including a MNO 102 via standards such as GSM, UMTS, mobile WiMax, CDMA, LTE, LTE Advanced, 5G, and/or other mobile-network technologies. In a wireless configuration, the radio 101r may also provide connectivity to local networks such as 802.11 WLAN, Bluetooth, Zigbee, or an IEEE 802.15.4 network, among other possibilities. In exemplary embodiments, a radio 101r is connected to an antenna, which could be either internal to device 101 or external to device 101. Although a radio 101r is depicted in FIG. 1, a device could also use a network interface 101r for communicating with network 103 as depicted and described in connection with FIG. 12 below.

Note that device 101 may also optionally include user interface 101w which may include one or more devices for receiving inputs and/or one or more devices for conveying outputs. User interfaces are known in the art and thus user interfaces are not described in detail here. User interface 101w could comprise a touch screen if device 101 operates as a smartphone or mobile phone. Device 101 can optionally omit a user interface 101w, since no user input may be required for many M2M applications such as networked sensors, although a user interface 101w could be included with device 101. LED lights or a display of LEDs could also comprise a user interface 101w.

Memory 101m within device 101 can store cryptographic algorithms 101s, cryptographic parameters 101x, a device ephemeral public key infrastructure (PM) key pair comprising an device ephemeral private key 101i and a corresponding device ephemeral public key 101h, an optional device certificate cert.device 101c, a set of supported device PQC KEM parameters device.PQC-KEM.parameters 101f, a key exchange mechanism (KEM) decapsulation function 101j, and a KEM encapsulation function 101k. Associated with the device certificate cert.device 101c can be a device identity of ID.device 101c-i and a device static private key for signatures of SK-signature.device 101d. The cert.device 101c can include a public key for verifying signatures from device 101 and the corresponding static private key of SK-signature.device 101d can be used to generate the digital signatures. Note that device certificate of cert.device 101c can include a device identity of ID.device 101c-i, such that the device identity ID.device 101c-i can be securely associated with a device static public key for verifying device digital signatures. As one example, the device identity of ID.device 101c-i can be in the common name (CN) field of cert.device 101c.

Device 101 can store a network static public key of PK.server 103d along with the associated PQC KEM parameters for the network static public key of params-PK.server 103f-y. Note that the network static public key PK.server 103d can also be referred to herein as a server static public key. Both the key PK.server 103d and the associated parameters of params-PK.server 103f-y can be stored in nonvolatile memory of device 101 during device configuration or before device 101 sends a first message to server 111 in network 103. The network static public key of params-PK.server 103f-y can be equivalent to the parameters 101f-x for a device ephemeral public key of ePK.device 101h described below. In some embodiments, the parameters 101f-x for the device ephemeral public key of ePK.device 101h can specify the same algorithm (e.g. Kyber, SIKE, classical McEliece, etc) as the parameters for the network static public of params-PK.server 103f-y. In other exemplary embodiments, the parameters of parameters 101f-x for the device ephemeral public key of ePK.device 101h can specify a different algorithm from the parameters for the network static public of params-PK.server 103f-y.

In exemplary embodiments, device 101 can also store server KEM parameters Server.PQC-KEM.Parameters 103f, which can specify the KEM parameters supported by server 111. Device 101 can use the parameters 103f for server 111 and/or network 103 in order to select a subset of KEM parameters 101f-x for a device ephemeral public key associated with a step 101q. In other words, in exemplary embodiments, the KEM parameters 101f-x can comprise values that meet the following conditions, (i) are a subset of parameters 101f, (ii) are a subset of parameters 103f stored by device 101 and server 111, and (iii) are different than the parameters 103f-y for the server static public key PK.server 103d.

In general, the depicted data within memory 101m can be stored within a nonvolatile memory 101m such as flash memory or a solid state drive or hard drive when power from device 101 is removed or the device is powered off. When power is supplied to device 101 or device 101 operates, for some embodiments, the device ephemeral private key 101i and the corresponding device ephemeral public key 101h may optionally only be stored in volatile memory such as RAM. When power is supplied to device 101 or device 101, the depicted data for memory 101m can be copied by processor 101p using a bus 101t from a nonvolatile memory 101b (depicted and described for a device 101 in FIG. 12 below) into a volatile memory 101m.

Cryptographic algorithms 101s can include the steps and logic for processor 101p in device 101 to conduct in order for device 101 to securely communicate with network 103 and a server 111. Cryptographic algorithms 101s can include at least symmetric ciphering algorithms, a random number generator, a key pair generation algorithm, digital signature algorithms, asymmetric ciphering algorithms, secure hash algorithms, a HKDF, and key exchange mechanisms (KEM). Cryptographic algorithms 101s can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Cryptographic algorithms 101s can use inputs of keys such as public keys, private keys, and/or symmetric keys along with cryptographic parameters 101x in order to for device 101 to process cryptographic data including ciphertext, key exchanges, and digital signatures.

Cryptographic parameters 101x can specify values or settings for (i) processing a KEM that supports post-quantum cryptographic algorithms such as KEM DECAPS 101j and KEM ENCAPS 101k, (ii) mutually deriving a shared secret, (iii) mutually deriving a symmetric ciphering key from the shared secret using a HKDF, (iv) using a symmetric ciphering algorithm with the symmetric ciphering key, and (v) using a digital signature algorithm. As contemplated herein, cryptographic parameters 101x may also be referred to as parameters 101x. Each of device 101 and network 103 can record at least compatible subset of parameters within a set of cryptographic parameters 101x. Parameters 101x can specify values for key length, key formatting (e.g. compressed or uncompressed), encoding rules, constants, numbers or variables for a post-quantum cryptography algorithm of a key exchange mechanism, etc. Parameters 101x can specify values for a post-quantum cryptography algorithm of a digital signature algorithm.

In exemplary embodiments, cryptographic parameters 101x and cryptographic algorithms 101s (as well as cryptographic parameters 103x and cryptographic algorithms 103x for a network 103) can support post-quantum cryptography key exchanges or "key encapsulation mechanisms" (KEM) using lattice-based, code-based, and/or Supersingular Elliptic Curve Isogeny algorithms. These proposed algorithms are described by the Wikipedia article for "Post-Quantum Cryptography" dated Aug. 31, 2020, which is hereby incorporated by reference. In other words, cryptographic parameters 103x and cryptographic algorithms 103s can support (i) classical cryptographic functions such as secure hash algorithms (e.g. SHA256 or SHA3-256, etc.) and symmetric ciphering (e.g. AES, Blowfish, etc.), while also including (ii) support for PQC algorithms identified in Round 3 of the National Institute of Standards and Technology (NIST) project for Post-Quantum Cryptography (PQC) Standardization.

In general, as contemplated herein, keys, cryptographic algorithms 101s or 103s, and parameters 101x or 103x supporting post-quantum cryptography (PQC) key exchange mechanisms (KEM) can be based on any of (i) lattice based algorithms, such as learning with errors, (ii) code based algorithms such as classic McEliece or BIKE, and (iii) ECC algorithms that based on Supersingular Elliptic Curve Isogeny, and other possibilities exist as well without departing from the scope of the present disclosure. In exemplary embodiments, keys, cryptographic algorithms 101s or 103s, and parameters 101x or 103x supporting post-quantum cryptography (PQC) key exchange mechanisms (KEM) are not based on (i) the integer factorization problem, (ii) the discrete logarithm problem, or (iii) the elliptic curve discrete logarithm problem.

In exemplary embodiments, the depicted KEM parameters of Device.PQC-KEM.Parameters 101f can comprise a set of parameters that comprise a subset of the cryptographic parameters 101x, where the depicted KEM parameters of Device.PQC-KEM.Parameters 101f pertain to parameters for different PQC key exchange mechanisms. Exemplary values of the depicted KEM parameters of Device.PQC-KEM.Parameters 101f are also depicted and described in connection with FIG. 8 below. Device 101 can select a subset of 101f-x of the set of KEM parameters 101f in order to generate a device ephemeral PM key pair and conduct a first KEM with a network. As contemplated herein, the subset 101f-x of the set of KEM parameters 101f can also be referred to as KEM parameters 101f-x or a PQC KEM algorithm.

Device 101 can select a subset 101f-x of the set of KEM parameters 101f (comprising a PQC KEM algorithm) in order to generate an ephemeral PM key pair and conduct a KEM with a network 103 using a server 111. In an exemplary embodiment, subset 101f-x of the KEM parameters of Device.PQC-KEM.Parameters 101f or could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. In other words, Device.PQC-KEM.Parameters 101f could specify families or groups of parameters for multiple different PQC KEM algorithms such as, but not limited to, Kyber, SIKE, BIKE, etc., and the subset 101f-x could comprise the parameters for using a specific KEM for the family or group (such as subset 101f-x specifying values for one of the equivalent levels of 128, 192, or 256 bits of security for a symmetric ciphering algorithms). Other post-quantum cryptographic algorithms and parameters could be supported as well for both the KEM parameters of Device.PQC-KEM.Parameters 101f and a subset 101f-x.

A device 101 could store one or a plurality of different device certificates cert.device 101c. Each of the different device certificates 101c could use different values for (i) a device identity such as a user name for ID.device 101c-i, (ii) a device static public key for verifying digital signatures generated by device 101, (iii) a different certificate issuer for generating a digital signature for the device certificate 101c, and/or (iv) a subset of cryptographic parameters 101s and cryptographic algorithms 101x for use with the device certificate 101c. In exemplary embodiments, the device certificate 101c can be formatted according to X.509v3 standards. The device identity of ID.device 101c-i in a device certificate 101c can be an international mobile subscriber identity (IMSI), a subscription permanent identifier (SUFI) according to 5G standards, or a network access identifier (NAI) as specified in IETF RFC 7542, and other possibilities exist as well without departing from the scope of the present disclosure.

In exemplary embodiments, the subset of cryptographic parameters 101s and cryptographic algorithms 101x for a device certificate cert.device 101c can support any of the digital signature algorithms as specified in Round 3 of the NIST PQC project, which are also identified in the Wikipedia PQC article. The device certificate cert.device 101c can be stored in nonvolatile memory such as a storage memory for memory 101m when device 101 is powered off or inactive, and then moved into volatile memory such as a RAM memory for memory 101m when device 101 operates.

Device 101 can include a set of device parameters or device extensions 101g for conducting a secure session with a network 103 and a server 111. The device extensions 101g can include supported cipher suites supported by device 101 in establishing secure communications with network 103 and server 111. The device extensions 101g can include supported symmetric ciphering algorithms and modes, such as the Advanced Encryption Standard (AES) with a ciphertext chaining mode such as Electronic Code Book mode (ECB), Cipher Block Chaining mode (CBC), etc. Device extensions 101g can include supported secure hash algorithms, key lengths, and supported digital signature algorithms from cryptographic algorithms 101s for device 101. Device extensions 101g can also include supported cryptographic parameters 101x for use with the cryptographic algorithms 101s.

Device 101 can include a PQC key pair generation algorithm PQC.KeyGen 101q from cryptographic algorithms 101s and the selected first subset 101f-x of KEM parameters 101f. Network 103 can include a compatible PQC key pair generation algorithm 103q from cryptographic algorithms 103s described below. A PQC key pair generation algorithm 101q can use the selected first subset 101f-x of KEM parameters 101f (or KEM algorithm) in order to generate (i) a random number from a random number generator in order to derive a device ephemeral PM private key eSK.device 101h and (ii) a corresponding device ephemeral PM public key ePK.device 101i.

The device ephemeral private key eSK.device 101i can comprise a first private key for an example lattice-based algorithm of Kyber768. In other words, the selected subset 101f-x could specify use of Kyber768. The KEM parameters 101f-x could specify values of the device ephemeral private key eSK.device 101i of n=256 and q=7681. The KEM parameters 101f-x that define keys and ciphertext could be set to du=11, dv=3 and dt=11. For Kyber768, the values of k could be 3 and n could be 4. Other values for KEM parameters 101f-x are possible as well without departing from the scope of the present disclosure, such as an exemplary lattice-based algorithm of Kyber1024. With Kyber1024, the values associated KEM parameters 103f-y could be the same as above, except for the use of k=4 and n=5.

In an exemplary embodiments that use Kyber algorithms, PQC.KeyGen 101q can comprise "Algorithm 1 Kyber:CPA: KeyGen( ) key generation" from the paper "CRYSTALS—Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 101q can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 3 of the MST PQC project could be used for a PQC.KeyGen 101q or 103q function as well, without departing from the scope of the present disclosure.

Device 101 can store or record in memory 101m a KEM ENCAPS function 101k in both (i) nonvolatile memory or storage memory when device 101 is powered off and (ii) volatile memory such as RAM when device 101 is operating. A subset of parameters Device.PQC-KEM.Parameters 101f, such as the second subset 103f-y of parameters (or KEM algorithm) for the server static public key PK.server 103d could be used with KEM ENCAPS function 101k. The selected subset of parameters Device.PQC-KEM.Parameters 101f and a stored server static public key PK.server 103d of params-PK.server 103f-y can be used with the KEM ENCAPS function 101k in order to convert number such as, but not limited to, a random number for M1 208a into both (i) a first asymmetric ciphertext C1 102c-1 and a first shared secret key K1 102k-1. Note the ciphertext C1 102c-1 may be referred to herein as a first ciphertext. The parameters and values used with the KEM ENCAPS function 101k are depicted and described for a step 209 in FIG. 2 below and also in FIG. 5 below and also FIG. 8 below. The KEM ENCAPS function 101k can be included in cryptographic algorithms 101s and support a plurality of different PQC key exchange mechanisms (KEM), such as any of the PQC KEM in Round 3 of the NIST PQC project.

Device 101 can store or record in memory 101m a KEM DECAPS function 101j in both (i) nonvolatile memory or storage memory when device 101 is powered off and (ii) volatile memory such as RAM when device 101 is operating. In summary, the selected first subset of parameters 101f-x and the generated or derived device ephemeral private key eSK.Device 101i can be used with the KEM DECAPS function 101j in order to convert a second received ciphertext C2 102c-2 into a second shared secret key K2 102k-2. The parameters and values used with the KEM DECAPS function 101j are depicted and described for a step 225 in FIG. 2 below and also in FIG. 5a below and also FIG. 8 below. The KEM DECAPS function 101j can be included in cryptographic algorithms 101s and support a plurality of different PQC key exchange mechanisms (KEM), such as any of the PQC KEM in Round 3 of the NIST PQC project.

As contemplated herein, the use of the term "first ciphertext C1 102c-1" or "second ciphertext C2 102c-2" can refer to asymmetrically encrypted ciphertext used with a PQC key exchange mechanism. A different term of "a first symmetric ciphertext symm-C1 102s-1" can refer to different ciphertext that is symmetrically encrypted with a symmetric ciphering key. Thus, (i) a "first ciphertext C1 102c-1" can be communicated between device 101 and network 103, and then (ii) "a first symmetric ciphertext symm-C1 102s-1" can be communicated between device 101 and network 103, and then (iii) a "second ciphertext C2 102c-2" can be communicated between device 101 and network 103.

Network 103 can comprise a collection of servers and also operate as a cloud service. As depicted for system 100 in FIG. 1, network 103 can communicate with device 101 through IP network 107. Network 103 can include a network identity of network ID 103a, which could comprise a domain name, a name, or a string to uniquely identify network 103 in a system 100. In exemplary embodiments, at least a portion of network ID 103a can comprise a network access identifier for network 103. Network 103 can include at least one server 111 as depicted in FIG. 1. Although a single server 111 is depicted for a network 103 in FIG. 1, a network 103 could include a plurality of servers 111, where each server 111 can be identified using a different server identity of server ID 111a.

Server 111 can include hardware components similar to those of a device 101 depicted in FIG. 1, except generally with larger capacities appropriate for a server 111. Server 111 can also operate as a host computing environment with physical hardware for a virtual machine to operate as a guest computing environment. Server 111 can include a server identity of server ID 111a, which could comprise a domain name, a name, or a string to uniquely identify server 111 in a system 100. In exemplary embodiments, at least a portion of server ID 111a can comprise a network access identifier for server 111.

A server 111 can include server hardware 111h comprising random access memory (RAM) 111m, storage memory 111b, at least one system bus 111c, at least one network interface 111d, and at least one processor 103p. For a server 111 operating in a network 103, server 111 can include at least one processor 111p in order to store and record data as well as communicate with other nodes over an IP network 107, such as device 101 through an IP network 107. Processor 111p can also be referred to as a central processing unit (CPU) 111p. Processor 111p can comprise a general purpose processor appropriate for the computational requirements for a server 101, and may operate with multiple different processor cores, including field programmable gate arrays (FPGA).

A processor 111p can comprise exemplary ARM® based processors or an Intel® based processor such as belonging to the XEON® family of processors, and other possibilities exist as well. Processor 111p can utilize the system bus 111c to fetch instructions from RAM memory 111m or storage memory 111b within a server 111 and operate on the instruction. A processor 111p or 101p can include components such as registers, accumulators, and logic elements to add, subtract, multiply, and divide numerical values and record the results in memory. In exemplary embodiments, at least one processor 111p within server 111 can be used to conduct the steps and message flows depicted in FIG. 2 below, as well as the steps for a server 111 in FIG. 10 below.

RAM 111a may comprise a random access memory for Server 111. RAM 111a can be a volatile memory providing rapid read/write memory access to processor 111p. RAM 111a could be located on a separate integrated circuit in server 111. The system bus 111c may be any of several types of bus structures including a memory bus or memory controller, a peripheral bus, and a local bus using any of a variety of bus architectures including a data bus. System bus 111c connects components within server 111, such as transferring electrical signals between the components illustrated for a server 111. Server 111 can include multiple different versions of bus 111c to connect different components, including a first system bus 111c between CPU 111p and RANI 111a (which could be a memory bus), and a second system bus 111c between CPU 111p and network interface 111d, which could be a SPI bus, a PCI bus, or similar data busses.

Server 111 may also operate a network interface 111d, where network interface 111d can be used to connect and communicate with other nodes such as depicted in FIG. 1 and also FIG. 2 below. Network interface 111d can comprise a physical interface connected to system bus 111c for server 111. In exemplary embodiments, network interface 111d can comprise an Ethernet or fiber optic wired connection. Network interface 111d can connect server 111 to plurality of computing devices and other servers through networks such as the globally routable public Internet.

Nonvolatile memory 111b or "storage" 111b (which can also be referred to herein as "storage memory 111b") within server 111 can comprise a non-volatile memory for long-term storage of data, including times when server 111 may be powered off. Storage memory 111b may be a NAND flash memory or a NOR flash memory and record firmware for server 111, such as a bootloader program and an operating system. Storage memory 111b can record long-term and non-volatile storage of data or files for server 111. In exemplary embodiments, the network identity 103a is recorded in storage memory 111b when server 111 is powered off, and the network identity 103a along with a network database 244 (in FIG. 2 below) are moved by CPU 111p into RANI 111a when server 111 powers on.

Storage memory 111b can operate as a traditional hard disk drive or a solid state drive (SSD), or as a storage area network (SAN). Storage memory 111b can also comprise a plurality of spinning hard disk drives in a redundant array of independent disks (RAID) configuration. Storage memory 111b may also be referred to as "server storage" and can include exemplary file systems of FAT16, FAT32, NTFS, ext3, ext4, UDF, or similar file systems. As contemplated herein, the terms "memory 111b", "storage memory 111b", and "nonvolatile memory 111b" can be considered equivalent.

Cryptographic algorithms 103s can include the steps and logic for processor 103p in server 111 to conduct in order for server 111 and network 103 to securely communicate with device 101. Cryptographic algorithms 101s can include at least symmetric ciphering algorithms, a random number generator, a key pair generation algorithm, digital signature algorithms, asymmetric ciphering algorithms, secure hash algorithms, a HKDF, and key exchange mechanisms. Cryptographic algorithms 103s can use libraries associated with cryptographic suites such as OpenSSL, crypto++, Bouncy-Castle, or Mozilla, and other possibilities exist as well without departing from the scope of the present disclosure, including the future update of those libraries to support post-quantum cryptography. Cryptographic algorithms 103s can use inputs of keys such as public keys, private keys, and/or symmetric keys along with cryptographic parameters 103x in order to for server 111 and network 103 to process cryptographic data including ciphertext, key exchanges, and digital signatures.

Cryptographic parameters 103x can specify values or settings for (i) processing a KEM that supports post-quantum cryptographic algorithms such as KEM DECAPS 103j and KEM ENCAPS 103k, (ii) mutually deriving a shared secret, (iii) mutually deriving a symmetric ciphering key from the shared secret using a HKDF, (iv) using a symmetric ciphering algorithm with the symmetric ciphering key, and (v) using a digital signature algorithm. As contemplated herein, cryptographic parameters 103x may also be referred to as parameters 103x. Each of device 101 and network 103 can record at least compatible subset of parameters within a set of cryptographic parameters 103x. Parameters 103x can specify values for key length, key formatting (e.g. compressed or uncompressed), encoding rules, constants, numbers or variables for a post-quantum cryptography algorithm of a key exchange mechanism, etc. Parameters 103x can specify values for a post-quantum cryptography algorithm of a digital signature algorithm.

In exemplary embodiments, cryptographic parameters 103x and cryptographic algorithms 103s (as well as cryptographic parameters 101x and cryptographic algorithms 101x for a device 101) can support post-quantum cryptography key exchanges or "key encapsulation mechanisms" (KEM) using lattice, code-based, or Supersingular Elliptic Curve Isogeny algorithms. These proposed algorithms are described by the Wikipedia article for "Post-Quantum Cryptography" dated Aug. 31, 2020, which is hereby incorporated by reference. In other words, cryptographic parameters 103x and cryptographic algorithms 103s can support (i) classical cryptographic functions such as secure hash algorithms (e.g. SHA256 or SHA3-256, etc.) and symmetric ciphering (e.g. AES, Blowfish, etc.), while also including (ii) support for PQC algorithms identified in Round 3 of the National Institute of Standards and Technology (MST) project for Post-Quantum Cryptography (PQC) Standardization.

In exemplary embodiments, the depicted KEM parameters of Server.PQC-KEM.Parameters 103f can comprise a set of parameters for a subset of the cryptographic parameters 103x, where the depicted KEM parameters of Server.PQC-KEM.Parameters 103f pertain to parameters for different PQC key exchange mechanisms (KEM). Exemplary values of the depicted KEM parameters of Server.PQC-KEM.Parameters 103f are also depicted and described in connection with FIG. 8 below. Note that Server.PQC-KEM.Parameters 103f can be different than Device.PQC-KEM.Parameters 101f, but in exemplary embodiments, at least two subsets of parameters is commonly shared between a server 111 and a device 101, such as the exemplary subsets 101f-x and 103f-y as depicted and described in connection with FIG. 2 and FIG. 8 below. For some exemplary embodiments, the exemplary subsets 101f-x and 103f-y can comprise the same values and specify the same parameters. For other exemplary embodiments, the exemplary subsets 101f-x and 103f-y can specify different parameters for different KEM algorithms. In addition, in some exemplary embodiments a third subset of parameters is commonly shared between a server 111 and a device 101, such as the exemplary subset 103f-z can be used for server ephemeral PM keys as described below.

A server 111 could store one or a plurality of different server certificates cert.server 103c. Each of the different server certificates 103c could use different values for (i) a server identity such as a server name or server ID 111a, (ii) a static server static public key for verifying digital signatures generated by server 111 (different than PK.server 103d stored by device 101 for key agreement/KEM), (iii) a different certificate issuer for generating a digital signature for the server certificate 103c, and/or (iv) a subset of cryptographic parameters 103s and cryptographic algorithms 103x for use with the server certificate 103c. In exemplary embodiments, the server certificate 103c can be formatted according to X.509v3 standards or equivalent standards in the future to support PQC keys and PQC digital signatures. The server identity in a device certificate 101c can be a server ID 111a, or a network access identifier (NAI) as specified in IETF RFC 7542, and other possibilities exist as well without departing from the scope of the present disclosure.

In exemplary embodiments, the subset of cryptographic parameters 103s and cryptographic algorithms 103x for a server certificate cert.server 103c can support any of the digital signature algorithms as specified in Round 2 of the NIST PQC project, which are also identified in the Wikipedia PQC article. The server certificate cert.server 103c can be stored in nonvolatile memory such as a storage memory 111b when server 111 is powered off or inactive, and then moved into volatile memory such as a RAM memory 111m for memory 101m when server 111 operates or is connected to IP network 107.

As depicted in FIG. 1, server 111 and network 103 can also store a static private key SK.server 103b corresponding to the public key PK.server 103d stored by device 101. Although not depicted in FIG. 1, server 111 can also store and support the parameters associated with the server static private key of SK.server 103b which can be the same or equivalent to the params-PK.server 103f-y stored by device 101.

Server 111 can select a subset 103f-z of the set of KEM parameters 103f in order to generate a PM key pair and conduct a third KEM 101k'/103j' with a device 101 (where the third KEM 101k'/103j' is not depicted in FIG. 1 but is depicted and described in connection with FIG. 8 below and also step 230 in FIG. 6 below and step 237 in FIG. 7 below). In an exemplary embodiment, subset 103f-z of the KEM parameters of Server.PQC-KEM.Parameters 103f could specify the selection of BIKE-1 for approximately 128 bit of security with symmetric encryption, or BIKE-3 for approximately 192 bits of security with symmetric encryption, or BIKE-5 for approximately 256 bits of security with symmetric encryption. In other words, Server.PQC-KEM.Parameters 103f could specify a family or group of parameters for a PQC KEM such as, but not limited to, Kyber, SIKE, BIKE, etc., and the subset 103f-z could comprise the parameters for using a specific KEM for the family or group (such as subset 103f-z specifying values for one of the equivalent levels of 128, 192, or 256 bits of security for a symmetric ciphering algorithms). Other post-quantum cryptographic algorithms and parameters could be supported as well for both the KEM parameters of Server.PQC-KEM.Parameters 103f and a subset 103f-z.

Figure 8:
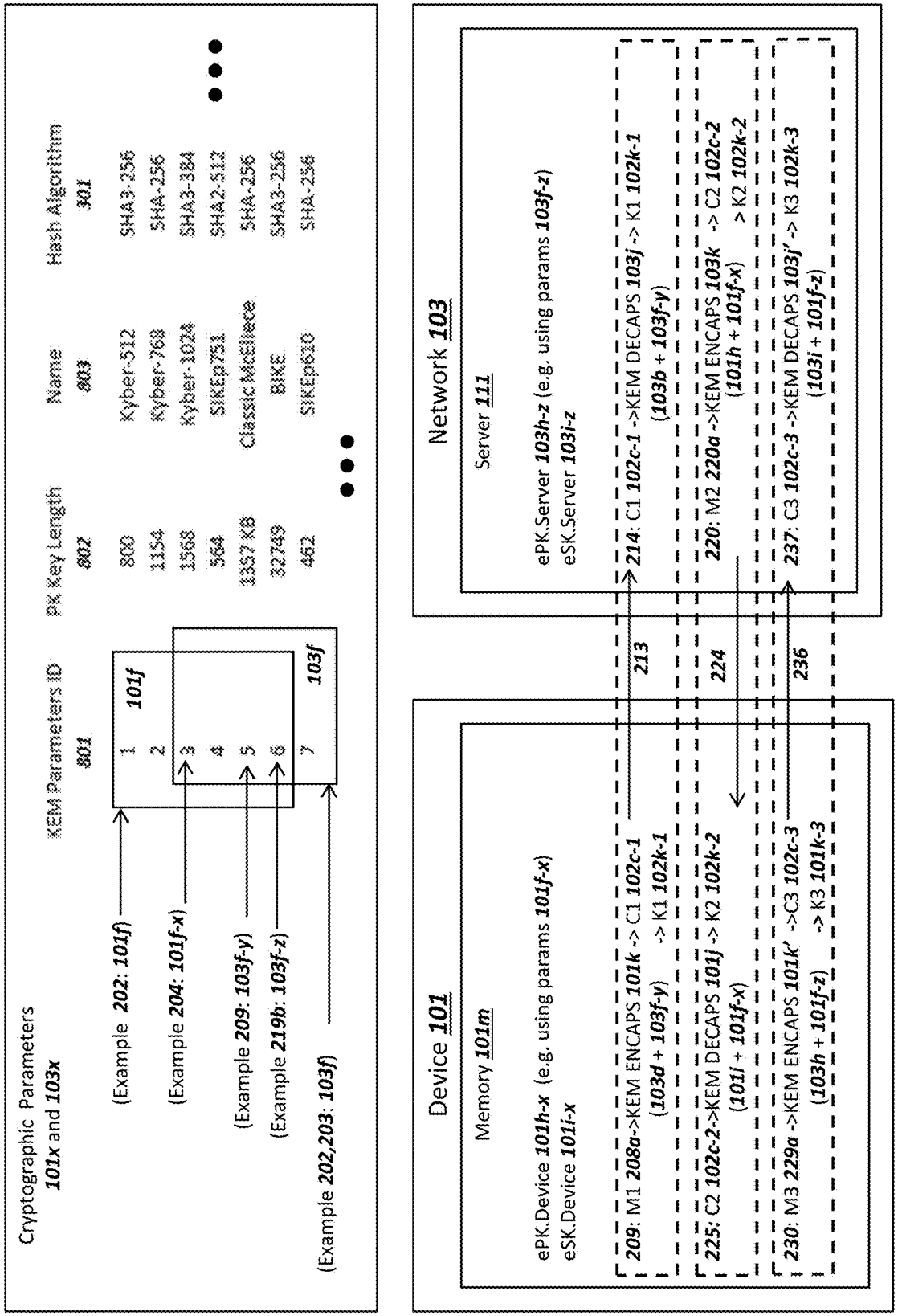
FIG. 8 is an illustration of (i) an exemplary set of cryptographic parameters for a key exchange mechanism stored and used by a device and a server, and (ii) conducting three KEM for the cryptographic parameters in accordance with exemplary embodiments.

For some preferred exemplary embodiments and as depicted in FIG. 8 below, the subset 103f-z of parameters selected by server 111 can be different than the subset 101f-x selected by device 101, such as supporting a different KEM algorithm, including a different type or family. For other existing embodiments, the subset 103f-z can be the same as the subset 101f-x, such as both server 111 and device 101 using the same KEM algorithm and parameters for device ephemeral PM keys and server ephemeral PM keys.

Server 111 can include a PQC key pair generation algorithm PQC.KeyGen 103q from cryptographic algorithms 103s and the selected subset 103f-z of KEM parameters 103f. A PQC key pair generation algorithm 103q can use the selected subset 103f-z of KEM parameters 103f in order to generate (i) a random number from a random number generator in order to derive or generate a server ephemeral PM private key eSK.server 103h and (ii) a corresponding server ephemeral PM public key ePK.server 103i.

In an exemplary embodiments that use Kyber algorithms, PQC.KeyGen 103q can comprise "Algorithm 1 Kyber:CPA: KeyGen( ) key generation" from the paper "CRYSTALS—Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 103q can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 3 of the MST PQC project could be used for a PQC.KeyGen 103q function as well, without departing from the scope of the present disclosure.

Server 111 can store or record in nonvolatile memory or storage memory 111b when server 111 is powered off and (ii) volatile memory such as RAM 111m when operating a KEM DECAPS function 103j. In summary, the subset of KEM parameters 103f-y for the server static public key SK.server 103d and the stored server static private key SK.server 103b can be used with the KEM DECAPS function 103j in order to convert a received first asymmetric ciphertext C1 102c-1 into a first shared secret key K1 102k-1. The parameters and values used with the KEM DECAPS function 103j are depicted and described for a step 214 in FIG. 2 below and also in FIG. 4 below and also FIG. 8 below. The KEM DECAPS function 103j can be included in cryptographic algorithms 103s and support a plurality of different PQC key exchange mechanisms (KEM), such as any of the PQC KEM in Round 3 of the NIST PQC project.

Server 111 can store or record in nonvolatile memory or storage memory 111b when server 111 is powered off and (ii) volatile memory such as RAM 111m when operating a KEM ENCAPS function 103k. A received subset of parameters Server.PQC-KEM.Parameters 103f, such as subset 101f-x could be used with KEM ENCAPS function 103k. The received subset of parameters Server.PQC-KEM.Parameters 103f and a received device ephemeral public key ePK.device 101h can be used with the KEM ENCAPS function 103k in order to convert number such as, but not limited to, a random number for M2 219b into both (i) a second asymmetric ciphertext C2 102c-2 and (ii) a second shared secret key K2 102k-2. The parameters and values used with the KEM ENCAPS function 103k are depicted and described for a step 220 in FIG. 2 below and also in FIG. 5a below and also FIG. 8 below. The KEM ENCAPS function 103k can be included in cryptographic algorithms 103s and support a plurality of different PQC key exchange mechanisms (KEM), such as any of the PQC KEM in Round 3 of the NIST PQC project.

Server 111 can include a set of server parameters or server extensions 103g for conducting a secure session with a device 101. The server parameters 103g can include supported cipher suites supported by server 111 in establishing a secure session with device 101. The server parameters 103g can also be used for the "Extensions" fields within a "Server Hello" message such as a second message 213 as depicted and described in connection with FIG. 2 below. The server parameters 103g can include supported symmetric ciphering algorithms and modes, such as the Advanced Encryption Standard (AES) with a ciphertext chaining mode such as Electronic Code Book mode (ECB), Cipher Block Chaining mode (CBC), etc. Server parameters 103g can include supported secure hash algorithms, key lengths, and supported digital signature algorithms from cryptographic algorithms 103s. Server parameters 103g can also include supported cryptographic parameters 103x for use with the cryptographic algorithms 103s.

FIG. 2

Figure 2:
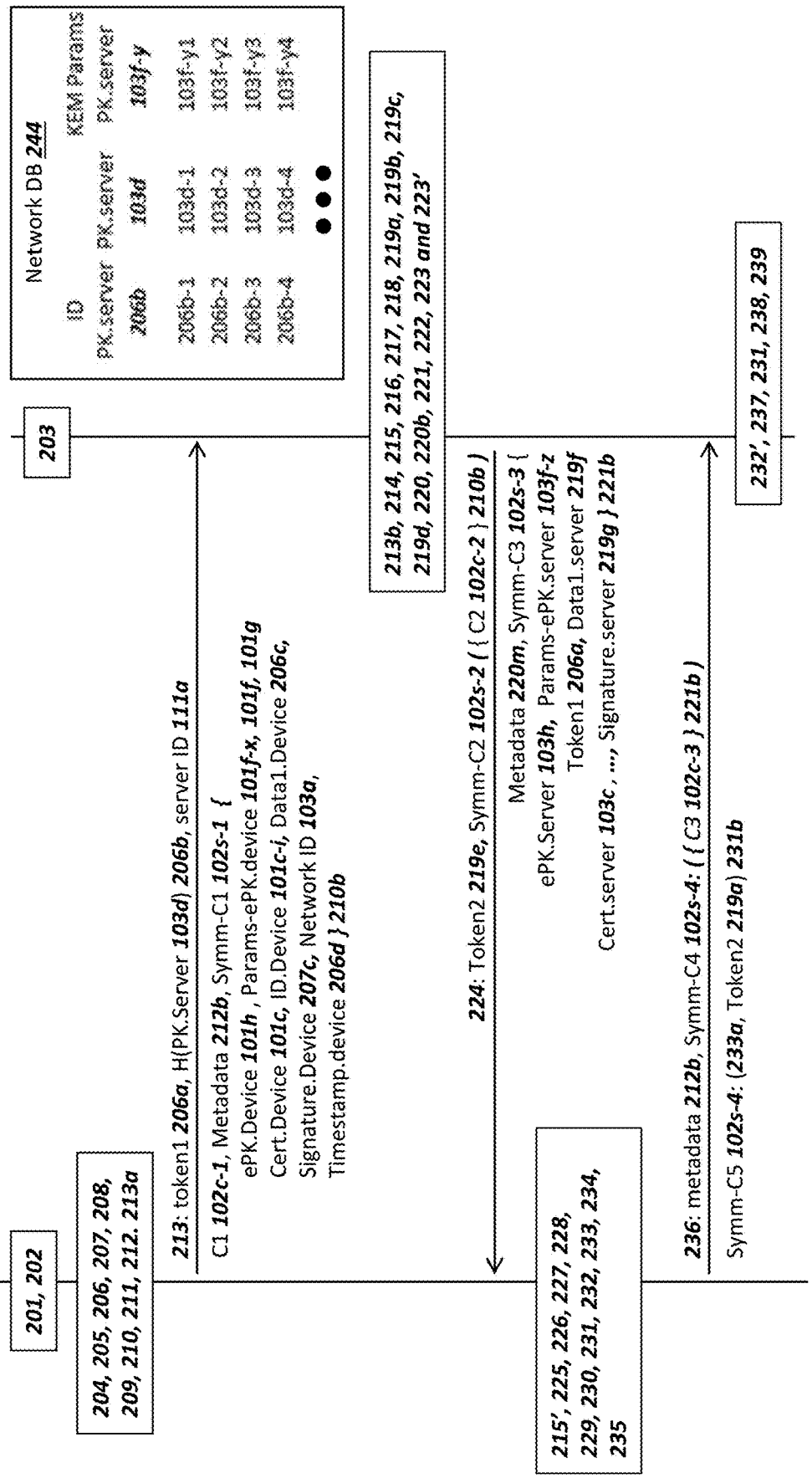
FIG. 2 is a simplified message flow diagram illustrating an exemplary system with exemplary data sent and received by a device and a network, in accordance with exemplary embodiments.

FIG. 2 is a simplified message flow diagram illustrating an exemplary system with exemplary data sent and received by a device and a network, in accordance with exemplary embodiments. System 200 can include a device 101, IP network 107, a network 103, and a server 111 operating within network 103. System 200 can also include a network database 244 for storing data pertaining to devices 101 and network 103 and server 111. The nodes or entities within system 200 were also depicted and described in connection with FIG. 1 above, where FIG. 2 depicts exemplary steps for the nodes and exemplary message flows between the nodes. Although a single device 101, IP network 107, and network 103 are depicted in a system 200, a system 200 could include a plurality of each of the depicted nodes connected via different IP networks 107. In addition, data recorded for device 101 and network 103 depicted and described above in FIG. 1 can be received and stored in the device 101 and network 103 depicted in FIG. 2 during the steps and message flows depicted in FIG. 2.

At step 201, device 101 could be manufactured. The electrical components depicted for device 101 in FIG. 2 could be assembled and connected, such as (i) mounting both RANI memory for device 101 memory 101m onto a circuit board and then also (ii) mounting flash memory or storage memory for device 101 memory 101m onto a circuit board for device 101. For some embodiments, RAM memory for device 101 memory 101m can be included within a processor 101p. Sensors 101y and actuators 101z could be connected to a device 101 in a step 201 as well. Some firmware could be loaded into device 101 at a step 201, such as storing a boot loader firmware within memory 101m in order for device 101 to being operating after power up. Some drivers could be loaded or stored within device 101 at a step 201 as well.

At step 202, firmware and software can be stored or recorded in device 101 during manufacturing or a device distribution step. The firmware and software can be stored within nonvolatile memory or storage memory for memory 101m within device 101. The firmware and software can include device drivers used by processor 101p within device 101. Memory 101m may include a flash memory and record firmware and/or an operating system for device 101. Memory 101m can record or store long-term and non-volatile storage of data or files for device 101. Device 101 could also be distributed to end users during a step 202 after the loading of firmware and configuration data for device 101.

In an exemplary embodiment, an operating system with configuration settings is recorded in memory 101m in a step 202. The operating system can include cryptographic algorithms 101s and cryptographic parameters 101x, where cryptographic algorithms 101s and cryptographic parameters 101x were depicted and described in connection with FIG. 1 above. Note that the set of parameters Device.PQC-KEM.Parameters 101f as first subset of cryptographic parameters 101x can be stored in device 101 at a step 202. The firmware, operating system, and application software loaded in device 101 in a step 202 can include machine executable instructions for processor 101p in order for processor 101p to conduct the subsequent series of steps and message flows depicted for device 101 in FIG. 2 and also subsequent figures below. For some exemplary embodiments, the server static public key of PK.server 103d and associated parameters of params-PK.server 103f-y can be stored in device 101 in a step 202. For other embodiments, the server static public key of PK.server 103d and associated parameters of params-PK.server 103f-y can be received by device 101 in a secure session through IP network 107 (potentially with a different network or server than network 103 and server 111) before device 101 sends the message 213, A step 202 can include device 101 selecting a protocol for establishing a secure session with a network 103. As contemplated herein, a secure session can comprise communications between device 101 and network 103 where the data is both encrypted and at least authenticated using a certificate and digital signature for at least one of device 101 and server 111. In preferred exemplary embodiments, the encryption of data between device 101 and network 103 supports forward secrecy through the use of ephemeral PM key pairs. The secure session could support any of TLS, DTLS, SSH, a VPN, IPSec, Wireguard, and other protocols are possible as well without departing from the scope of the present disclosure. For some embodiments, the secure session could support download of firmware for an Open Firmware Loader, equivalent to the GlobalPlatform OFL standard, but supporting PQC algorithms and security.

A step 202 can include device 101 selecting a protocol for establishing secure communications with network 103 and then using subsequent steps and message flows as depicted herein in order to conduct the protocol for the secure communications. At a step 203, server 111 within network 103 can conduct a step equivalent to a step 202 by device above, where server 111 is loaded is an operating system and configuration settings or parameters. The data could be stored within storage memory 111b. Prior to a step 203, the electrical components for a server 111 depicted as server hardware 111h in FIG. 1 above could be assembled.

A network 103 could perform the step 203 for a server 111, such as a network administrator connecting to server 111 and performing the steps. The operating system and associated application software for server 111 can include cryptographic algorithms 103s and cryptographic parameters 103x. A step 203 could include server 101 loading and operating a server package for processing secure sessions and messages such as OpenSSL, BouncyCastle, Secure Shell (SSH), an IP Security (IPSec) server, a VPN, and other possibilities exist as well for the server packages and application software loaded in a step 203. In exemplary embodiments, server 111 conducting the steps in FIG. 2 can comprise a virtual server operating on a host server, where the host server includes computing hardware 111h.

Note that the set of parameters Server.PQC-KEM.Parameters 103f as first subset of cryptographic parameters 103x can be stored in server 111 at a step 203. The firmware, operating system, and application software loaded in server 111 in a step 203 can include machine executable instructions for processor 111p in order for processor 111p to conduct the subsequent series of steps and message flows depicted for server 111 in FIG. 2 and also subsequent figures below. The software or firmware loaded in a step 203 can include host software or firmware for server 111 to conduct the subsequent steps depicted herein, such as received and processing a Transport Layer Security (TLS) "client hello" message for message 213, processing and sending a TLS "server hello" message for message 213, etc.

At step 203, server 111 can also load the cryptographic algorithms 103s with a server process for conducting transport layer security such as TLS, where the server process could comprise software such as OpenSSL, Microsoft Server, etc. In addition, although TLS is described as a technology or protocol for a secure session in FIG. 2, other and related protocols could be used as well for processing digital signatures in the current disclosure, including IP Security (IPSec), Datagram Transport Layer Security (DTLS) with UDP messages, Secure Shell (SSH), and other possibilities exist as well.

At step 203, server application software for conducting a secure session with device 101 such as a TLS server could be configured to support the use of a KEM ENCAPS function 103k and also the KEM DECAPS function 103j, which is depicted and described in connection with FIG. 1 above. Note that the configuration step 203 could also specify a preference for the use of different cryptographic algorithms 101s for the KEM ENCAPS function 103k and the KEM DECAPS function 103j.

At steps 204 through 206, device 101 can begin operating and process data in order to generate a first message 213 for server 111, where the first message 213 could comprise a "Client Hello" message. Steps 204 and subsequent steps in FIG. 2 for device 101 can use the computing hardware in device 101 as depicted in FIG. 1 above, as well as the operating system and stored parameters within device 101 stored in a step 202 above. At step 204, device 101 can power on or wake from a sleep state and then select either a network ID 103a or a server ID 111a for sending a first message 213. The IDs 103a or 111a could comprise domain names or IP addresses for connecting to the network 103. The IDs 103a or 111a could be obtained by a device 101 from (i) a configuration step 202 or (ii) via data written to device 101 during a configuration step 202.

Step 204 can include device 101 selecting device extensions 101g for use with a secure session between device 101 and server 111. In some protocols such as TLS, the device extensions 101g can be referred to as extensions, such the device or client data for the section "4.2—Extensions" within IETF RFC 8446. Device extensions 101g were also described above in connection with FIG. 1, and can include identifiers or values for supported cryptographic algorithms 101s and cryptographic parameters 101x. Device extensions 101g can include supported cipher suites such as names for symmetric ciphering algorithms, secure hash algorithms, digital signature algorithms, etc.

Device extensions 101g selected in a step 204 can include an identity for a certificate issuer or certificate authority of supported by device 101. The identity for the certificate issuer can comprise a name or string recorded in a certificate issuer certificate root certificate or possibly an intermediate certificate issuer certificates stored within device 101. A value or field for device extensions 101g processed by device 101 in a step 204 can include a certificate request, such that a "Client Hello" or first message 213 can request certificates and at least one digital signature from server 111 that supports other fields or values in device extensions 101g such as specified supported digital signature algorithms in cryptographic algorithms 101s in addition to the an identity of a supported certificate issuer by device 101.

At step 204, device 101 can select KEM parameters as a subset of the cryptographic parameters 101x for conducting a first KEM 101k/103j, where the selected KEM parameters can comprise Device.PQC-KEM.Parameters 101f. An exemplary selected set of KEM parameters Device.PQC-KEM.Parameters 101f are also depicted and described in connection with FIG. 8 below. During a step 204, device 101 could also select a subset of KEM parameters 101f-x from the set of KEM parameters Device.PQC-KEM.Parameters 101f. In other words, at a step 204, the parameters Device.PQC-KEM.Parameters 101f can include different supported families of PQC KEM, such as Kyber, BIKE, SIKE, etc, where the subset of KEM parameters 101f-x can comprise a specific, identified KEM such as one of (i) Kyber-768 or (ii) SIKEp434 or (iii) BIKE security level 3, etc. As discussed above, in exemplary embodiments, the KEM parameters 101f-x can comprise values that meet the following conditions, (i) are a subset of parameters 101f, (ii) are a subset of parameters 103f stored by device 101 and server 111, and (iii) are different than the parameters 103f-y for the server static public key PK.server 103d.

At step 205, device 101 can use a PQC.KeyGen function 101q in FIG. 1 to generate a device ephemeral PM key pair comprising a device ephemeral public key ePK.device 101h and a device ephemeral private key eSK.device 101i. The algorithm used to generate the ephemeral PM key pair can be specified in KEM parameters 101f-x selected by device 101 in a step 204 above. In a step 205, the device ephemeral PM key pair can comprise a key pair supporting key exchange mechanisms specified in Round 2 of the NIST "Post Quantum Cryptography" (PQC) project. Each KEM provides details for a KeyGen function, which could be used for a PQC.KeyGen function 101q in a step 205. The device ephemeral public key ePK.device 101h generated in a step 205 can comprise the value of "Key Share" within a "Client Hello" message for a first message 213 below.

At step 206, device 101 can also generate a first token token1.device 206a. For some embodiments, token1.device 206a can include or comprise a random number.

Token1.device 206a could also include other data such as a sequence number for communication at the transport or application layer between device 101 and network 103. Token1.device 206a could also include a session identity in order for device 101 and network 103 to track the session or sequence of communication between device 101 and network 103. At step 206, device 101 can also select or process an identity for the server static public key of PK.server 103d, such that server 111 can determine both (i) which server static public key PK.server 103d is stored and used by device 101, and (ii) the associated server static private key SK.server 103b in order to use with a first message 213 received from device. For some embodiments as depicted in FIG. 2, the identity of the server static public key of PK.server 103d can comprise a secure hash value of H (PK.server 103d) 206b. For these embodiments, the secure hash can use RIPEMD with a length of 160 bits. Or, the identification information for the server static public key of PK.server 103d could be a sequence number, name, identification number, and other possibilities exist as well.

At step 206, device 101 can also process data1.device 206c, which could comprise at least one of several different possible data sets for device 101. The possible different data sets for data1.device 206c can include a registration message for device 101, parameters 101g used by device 101, firmware or configuration settings for device 101 including values for sensor 101y and actuator 101z, and other possibilities exist as well for data1.device 206c without departing from the scope of the present disclosure. At step 206, device 101 can also generate a timestamp 206d, which can be useful for both (i) sending to server 111 and (ii) increasing resistance to replay attacks. In exemplary embodiments, device 101 can obtain a reasonably accurate time (such as to within a few seconds of a certified time source) from (i) system information blocks (SIB) transmitted by a wireless network that device 101 connects with and/or (ii) conducting an authenticated "network time protocol" (NTP) query before sending a message to network 103.

At step 206, device 101 can generate data for signature 206e, which can include the device ephemeral public key ePK.Device 101h from a step 101q in step 205 above, the subset of KEM parameters for ePK.device 101h of params-ePK.device 101f-x (e.g. the KEM algorithm for ePK.device 101h), the KEM parameters device.PQC-KEM.Parameters 101f, the device certificate of cert.device 101c, the device identity of ID.Device 101c-i, the token token1.device 206a from a step 206, data1.device 206c, the network ID 103a stored and used by device 101 for sending a first message 213, timestamp.device 206d from a step 206, and also optionally one of the first shared secret key K1 102k-1 or the first asymmetric ciphertext C1 102c-1. Other data could be included in the data for signature 206e as well, such as the identity for the server static public key PK.server 103d used by device 101 or the secure hash H (PK.server 103d). Note that not all the data or values described within this paragraph are required in the data for signature 206e, and some values could be omitted, such as a device certificate could be sent separately or omitted, the token 206a could be omitted, and other data could be omitted as well.

At step 207, device 101 can select a digital signature algorithm and conduct digital signature generation step in order to generate a digital signature which can comprise a signature.device 207c value. The algorithm for digital signature generation could be specified or identified by the supported digital signature algorithm in both device extensions 101g and server parameters 103g. In other words, the digital signature algorithm selected in a step 207 can be a selected subset supported by both device extensions 101g and server parameters 103g, and can comprise a digital signature algorithm specified within device certificate cert.device 101c. A step 207 for conducting digital signature generation is also depicted and described in connection with FIG. 3 below. The signature.device 207c value can be generated using the device static private key SK-Signature.Device 101d' for the public key in the device certificate cert.device 101c, where the keys are also described in connection with FIG. 1 above.

At step 208, device 101 can derive or generate a random number M1 208a for use in a first KEM 101k/103j between device 101 and server 111. At step 209, device 101 can use both (i) the stored server static public key of PK.server 103d and (ii) the specified subset of KEM parameters 103f-y for the server static public key and the first KEM 101k/103j in order to generate both (x) a first asymmetric ciphertext C1 102c-1 and (y) a first shared secret key K1 102k-1. At step 209, device 101 can use a KEM ENCAPS function 101k with both (i) and (ii) from the previous sentence as well as M1 208a in order to generate both (x) a first asymmetric ciphertext C1 102c-1 and (y) a first shared secret key K1 102k-1. A summary of the step 209 by device 101 with a KEM ENCAPS function 101k was also depicted and described in connection with FIG. 1 above. A device 101 can use both cryptographic algorithms 101s and cryptographic parameters 101x along with the subset of KEM parameters 103f-y in order to conduct the step 209. The function and use of a step 209 and a KEM ENCAPS function 101k is also depicted and described in FIG. 3 below.

At step 210, device 101 can use a hash-based key derivation function or a HMAC-based Extract-and-Expand Key Derivation Function (HKDF) 210a (depicted and described in FIG. 3 below for a step 210) with at least the first shared secret key K1 102k-1 output from KEM ENCAPS function 101k in order to generate both (i) a first symmetric ciphering key of S1 210b and a first message authentication code (MAC) key MAC1 210c. Note that in some exemplary embodiments, additional data mutually shared between device 101 and server 111 besides the first shared secret key K1 102k-1 can also be input into the HKDF 210a in a step 210 in order to generate S1 210b and MAC1 210c. The additional data input into HKDF 210a can comprise any plaintext data in a message 213 (e.g. not encrypted with keys S1 210b and/or MAC1 210c), such as, but not limited to, token1 206a, the identity of the server static public key 206b, the first asymmetric ciphertext C1 102c-1, and metadata 212b. Other data from a message 213 can be used for input into a HKDF 210a, in addition to the first shared secret key K1 102k-1, without departing from the scope of the present disclosure, such as, but not limited to, (i) a network ID 103a or a server ID 111a that can be included in a message 213, as well as (ii) portions of metadata 212a or timestamp 206d.

For the embodiments in the previous sentence, the values input into a HKDF 210a along with key K1 102k-1 can be transmitted external to a symmetric ciphertext encrypted with S1 210b and/or MAC 210c. In other words, the plaintext data such as the network ID 103a or a server ID 111a and/or timestamp 206c can be plaintext values sent in a message 213 below and also external to symmetric ciphertext (where they could also be included in the symmetric ciphertext within a message 213). For other embodiments, the input of additional data from a message 213 into a HKDF 210a besides K1 102k-1 could be omitted, and S1 210b and MAC1 210c could be derived from K1 102k-1 without including plaintext data from message 213 into HKDF 210a in a step 210. The function and use of a step 210 using output from KEM ENCAPS function 101*k* of at least K1 102*k*-1 and a HKDF 210*a* is also depicted and described in FIG. 3 below.

At step 211, device 101 can select and process a plaintext 211*a* for encryption into a first symmetric ciphertext symm-C1 102*s*-1. A step 211 is also depicted and described in connection with FIG. 3 below. Note that the first asymmetric ciphertext C1 102*c*-1 could be previously output from the KEM ENCAPS function 101*k* (where device 101 uses the first asymmetric ciphertext C1 102*c*-1 for the first KEM 101*k*/103*j*). In other words, a first asymmetric ciphertext C1 102*c*-1 can be used with asymmetric ciphering and a KEM and a first symmetric ciphertext symm-C1 102*s*-1 can be used with symmetric ciphering and mutually derived symmetric ciphering keys such as S1 210*b* and MAC1 210*c* (which are depicted and described below in connection with FIG. 3 for a step 211).

In exemplary embodiments the data or values for the plaintext 211*a* selected in a step 211 can include the device ephemeral public key of ePK.Device 101*h*, the associated parameters (or KEM algorithm) for the device ephemeral public key of params-ePK.device 101*f*-*x*, the set of KEM parameters 101*f* supported by device 101, device extensions 101*g* described above in FIG. 1, the device certificate of cert.device 101*c*, an identity of device ID.Device 101*c*-*i*, initial device data data1.device 206*c* described above in connection with a step 206, a device digital signature of signature.device 207*c*, an identity of the network 103 of network ID 103*a*, and a timestamp.device 206*d*. Note that some data could be omitted from a plaintext 211*a* in a step 211, such as the data could be external to plaintext 211*a* and included by device 101 in a message 213 below outside of a first symmetric ciphertext symm-C1 102*s*-1. In exemplary embodiments, at least the device ephemeral public key of ePK.Device 101*h* and the initial device data data1.device 206*a* can be included in plaintext 211*a*. Additional data could be included in plaintext 211*a* or some data listed above could be omitted from plaintext 211*a* without departing from the scope of the present disclosure.

At step 212, device 101 can use symmetric encryption 212*a* with the plaintext 211*a* from a step 211 in order to generate the first symmetric ciphertext symm-C1 102*s*-1. A step 212 is also depicted and described in connection with FIG. 3 below. The symmetric encryption 212*a* can be included within cryptographic algorithms 101*s* for device 101. The symmetric encryption 212*a* can include input of the parameters specified in metadata 212*b*, which can be a selected subset of device extensions 101*g* described above. In other words, device extensions 101*g* can support a range of parameters for device 101 and metadata 212*b* can be the specific subset for the operation of symmetric encryption 212*a*. As depicted for a step 212 below, symmetric encryption 212*a* can also use the symmetric ciphering key S1 210*b* and MAC key MAC1 210*c* from a step 210 above. In a step 212, device 101 can also use an initialization vector for the symmetric encryption 212*a*, where the initialization vector can be included with metadata 212*b* or derived from HKDF 210*a*.

As contemplated herein, "symmetric encryption" such as in the symmetric encryption step 212*a*, as well as symmetric encryption steps 223*a* and 235*a* can include a mode from parameters input, such as parameters 212*b* with symmetric encryption 212*a* for the generation of message authentication code (MAC) values using a MAC key such as MAC1 201*c* for both an integrity check and an authentication value for symmetric ciphertext generated. The MAC values generated using the mode and the MAC key are transmitted along with the symmetric ciphertext. Example modes for symmetric encryption and decryption include "Galois/Counter Mode" (CGM), Electronic Code Book (ECB), and other modes exist as well without departing from the scope of the present disclosure.

The receiving side of the symmetric ciphertext can decrypt the symmetric ciphertext and also calculate the MAC values with the MAC key and the mode specified in parameters input into a symmetric decryption step such as 215*a* below. The receiving side can confirm the calculated MAC values are equal to the received MAC values in order to confirm the integrity and authenticate the symmetric ciphertext was generated using the same MAC key. In an exemplary embodiment, the MAC values are generated over the symmetric ciphertext using the MAC key, which is also known as "encrypt-then-MAC" (EtM). Other embodiments can support the MAC values being generated over the plaintext input into the symmetric encryption. As contemplated herein, the "symmetric encryption" such as in the symmetric encryption step 212*a*, as well as symmetric encryption steps 223*a* and 235*a* can support Authenticated Encryption with Associated Data (AEAD), where the associated data can comprise plaintext or metadata sent along with the symmetric ciphertext, where metadata is shown as transmitted with symmetric ciphertext below in messages 213, 224, and 236.

After the conclusion of a step 212 by device 101, device 101 can then conduct a step 213*a* to process a first message 213 as depicted in FIG. 2. A step 213*a* can use firmware or application software within device 101 in order to perform steps as specified in a protocol for a secure session or secure communications between device 101 and network 103. For some embodiments, the first message 213 can comprise a "Client Hello" message according to the protocol for the secure session selected by device in a step 204. Device 101 can send a first message 213 to the server 111 operating in network 103 in a step 213*a*. A domain name for server 111 or an IP address for server 111, such as a server ID 111*a*, could be stored in device 101 at a step 205. A step 201*f* can comprise processor 101*p* writing the data for the first message 213 to a radio 101*r* (or equivalently a network interface if device 101 does not include a radio 101*r*).

As depicted in FIG. 2, the first message 213 from device 101 to server 111 can include a server ID 111*a*, the first token token1.device 206*a*, an identity of the server static public key PK.server 103*d*. For the embodiment depicted in FIG. 2, the identity of the server static public key PK.server 103*d* can be a secure hash value H (103*d*), although other unique identity values could be used as well. The first message 213 can also include the first asymmetric ciphertext C1 102*c*-1, metadata 212*b* associated with symmetric encryption 212*a*, and the first symmetric ciphertext symm-C1 102*s*-1. Note that the metadata 212*b* can include plaintext values for a MAC code using MAC1 210*c* (from FIG. 3 below). The metadata 212*b* can also include an initialization vector, or the initialization vector could be derived by a HKDF over at least a first shared secret key K1 102*k*-1. Message 213 can include headers or values specifying the message is for a first message or "Client Hello" according to the secure session protocol selected by the device 101.

Server 111 can receive the first message 213 via a network interface 111*d* in server hardware 111*h* (depicted for server 111 in FIG. 1, above). Server 101 can use application software such as, with cryptographic algorithms 103*s* and cryptographic parameters 103*x* and server hardware 111*h* to process the received first message 213. Note that although a message 213 with a depicted ciphertext of C1 102c-1 shows the value K1 102k-1 within brackets, the actual first shared secret key K1 102k-1 may normally not be included within the ciphertext (but rather derived from the ciphertext using the secret key and KEM algorithm). In other words, the depicted ciphertext of C1 102c-1 includes sufficient data for server 111 to use the C1 102c-1 with the KEM DECAPS 103j function to generate the first shared secret key K1 102k-1. Likewise, the depiction of brackets such as "{ } 210b" in FIG. 2 for the first symmetric ciphertext symm-C1 102s-1 in message 213 indicates the data within the brackets is encrypted with at least the shared symmetric ciphering key S1 210b, and the shared symmetric ciphering key S1 210b is not transmitted in message 213.

At step 213b, server 111 for network 103 can conduct a first step to process the first message 213. Server 111 can confirm the first message 213 is supported by server 111 using at least the identity of the server static public key 206b stored by device 101. In exemplary embodiments, a server 111 or network 103 can include a network database 244 as depicted in FIG. 2 and conduct the step 213b using the network database 244. Network database 244 can include a plurality of values for (i) the identity of the server static public key ID-PK.server 206a (which can comprise a secure hash over the server static public key in some embodiments), (ii) the associated server static public key PK.server 103d for the identity, and (iii) the KEM parameters 103f-y associated with the server static public key PK.server 103d. Although not depicted for a network database 244 in FIG. 2, a network database 244 can also include the associated server static private key SK.server 103b for the server static public key PK.server 103d.

At step 213b, server 111 can use the identity of the server static public key 206b to select the server static public key PK.server 103d and corresponding server static private key SK.server 103b from the network database 244, in addition to KEM parameters 103f-y (which include the KEM algorithm for PK.server 103d and SK.server 103b). Note that for some exemplary embodiments, the KEM parameters 103f-y (or an identifier for the KEM parameters 103f-y) can be sent as plaintext in the message 213. In some preferred exemplary embodiments, the PK.server 103d stored in device 101 can comprise a public key for the Classic McEliece algorithm, and the corresponding first asymmetric symmetric ciphertext C1 102c-1 can be less than approximately 300 bytes. Thus, although with Classic McEliece the server static public key PK.server 103d can be large for PM keys, such as an exemplary 1 MB or larger, the PK.server 103d can be distributed to device 101 during a configuration step 202 before device 101 sends a message to network 103 in a system 200.

At step 214, server 111 can use (i) the KEM parameters 103f-y (or KEM algorithm) determined from message 213 in a step 213b along with (ii) cryptographic algorithms 103s to conduct the KEM DECAPS 103j function with the received first asymmetric ciphertext C1 102c-1. The server 111 can use the server static private key of SK.server 103b with the KEM DECAPS 103j and the received first asymmetric ciphertext C1 102c-1 in order to generate the first shared secret key K1 102k-1. A step 214 for server 111 is also depicted and described in connection with FIG. 3 below. Note that for some PQC algorithms, the KEM DECAPS 103j function could fail for a small frequency of messages 121, such as less than one failure per million or billion KEM messages or ciphertext C1, and if a step 214 fails, then server 111 could send device 101 an error message and then return to a step 213b to receive the generation of a different message 213.

A step 214 can also include server 111 using the first shared secret key K1 102k-1 with the HKDF 210a (depicted in FIG. 4 below) in order to generate the first symmetric ciphering key S1 210b and the first MAC key MAC1 210c. Note that the HKDF 210a can also include input data from message 213 in addition to the first shared secret key K1 102k-1, which is also depicted and described for the step 214 below in FIG. 3. The data input into HKDF 210a by server 111 and device 101 (in step 210 above) would be identical in exemplary embodiments in order for the HKDF 210a to output the same values for server 111 and device 101. At the conclusion of a step 214, server 111 can store the first symmetric ciphering key S1 210b and first MAC key MAC1 210c, which are mutually and secretly shared between server 111 and device 101.

A step 214 can include server 111 calculating two values for the symmetric ciphering key S1 210b, where a first S1 210b-1 can be for use by server 111 for symmetric decryption of symmetric ciphertext data received from device 101 into plaintext data. A second S1 210b-2 can be for use by server 111 for symmetric encryption of plaintext data for device 101 into ciphertext data. Likewise, server 111 in a step 214 can generate two values for MAC key MAC1 210c, where the first MAC1 is used by server 111 to verify MAC codes from device 101 and the second MAC1 is used by server 111 to generate MAC codes for device 101. A server 111 can likewise use the HKDF 210a to generate all of the same first S1 210b-1, the second S2 210b-2, the first MAC1 203-1 and the second MAC 210c-2.

In the exemplary embodiment for the step 215 below for server 111, the server 111 can use the first S1 210b-1 for decryption of symm-C1 102s-1, and for the step 223' below server 111 could use the second S1 210b-2 for encryption of the second asymmetric ciphertext C2 102c-2. In other words, although the present disclosure uses the term "first symmetric ciphering key S1 210b", the "first symmetric ciphering key S1 210b" output from a HKDF 210a can comprise two components or portions of (i) key S1 210b-1 for symmetric encryption by device and (ii) key S1 210b-2 for symmetric encryption by server 111. Likewise, the server 111 can output from the same HKDF 210a the (i) key S1 210b-1 for symmetric decryption by server 111 and (ii) the key S1 210b-2 for symmetric decryption by device 101. Thus, in exemplary embodiments and as contemplated herein, the term "symmetric ciphering key S1 210b" can comprise two related keys of S1 210b-1 and S1 210b-2, which may also be referred to herein as two portions for the symmetric ciphering key S1 210b.

At step 215, server 111 can use symmetric decryption 215a with the first symmetric ciphertext symm-C1 102s-1 from a message 213 in order to read the plaintext 211a. A step 215a is also depicted and described in connection with FIG. 4 below. The symmetric decryption 215a can be included within cryptographic algorithms 103s for server 111. The symmetric decryption 215a can include input of the parameters specified in metadata 212b from a message 213 and the first symmetric ciphering key S1 210b and MAC key MAC1 210b from a step 214 above.

At step 216, server 111 can select from the plaintext 211a from the step 215 a "message to verify" 216a. The message to verify can comprise the data for input into a digital signature verification step and comprise plaintext data. A step 216 for selecting data for a "message to verify" 216a is also depicted and described in connection with FIG. 4 below.

In exemplary embodiments, the "message to verify" 216a can be equal to or the same as the "data for signature" 206a from a step 206 above, since both server 111 and device 101 could read the plaintext values for each of the fields in both the "message to verify" 216a and the "data for signature" 206a.

Figure 3:
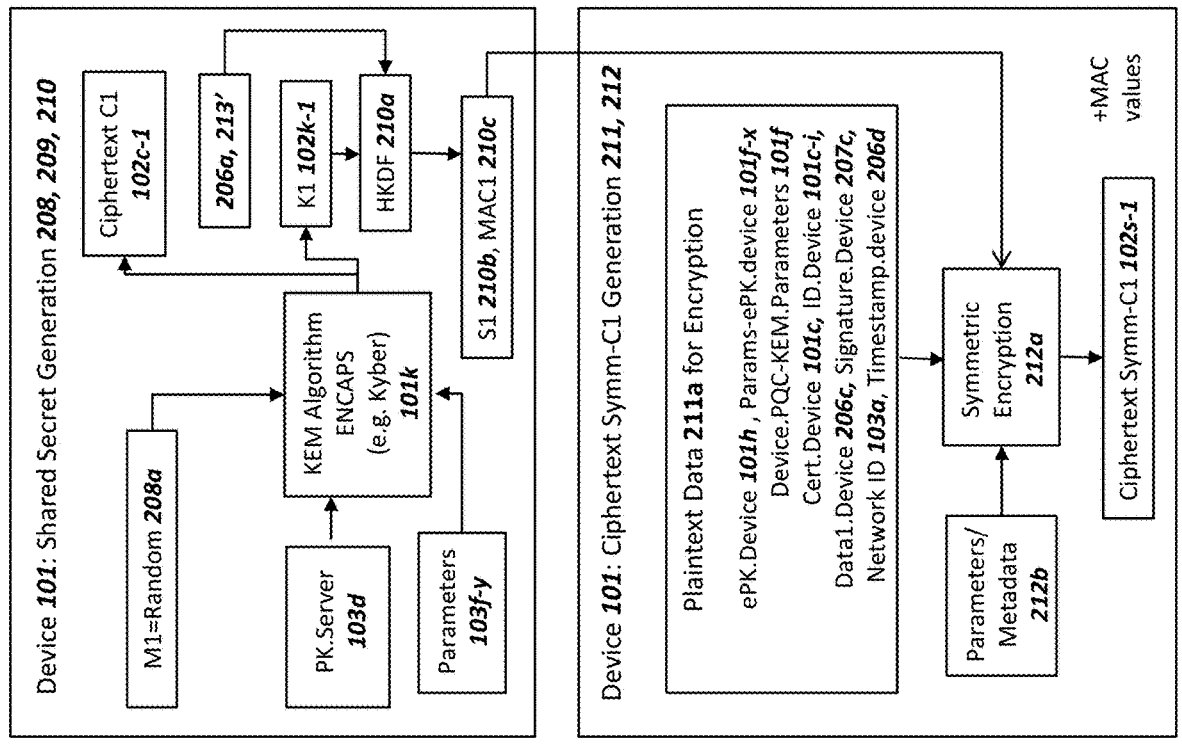
FIG. 3 is a flow chart illustrating exemplary steps for a device conducting (i) a digital signature generation, (ii) a key encapsulation mechanism to mutually derive a symmetric ciphering key, and (iii) symmetric ciphering using the derived symmetric ciphering key, in accordance with exemplary embodiments.
Figure 3:
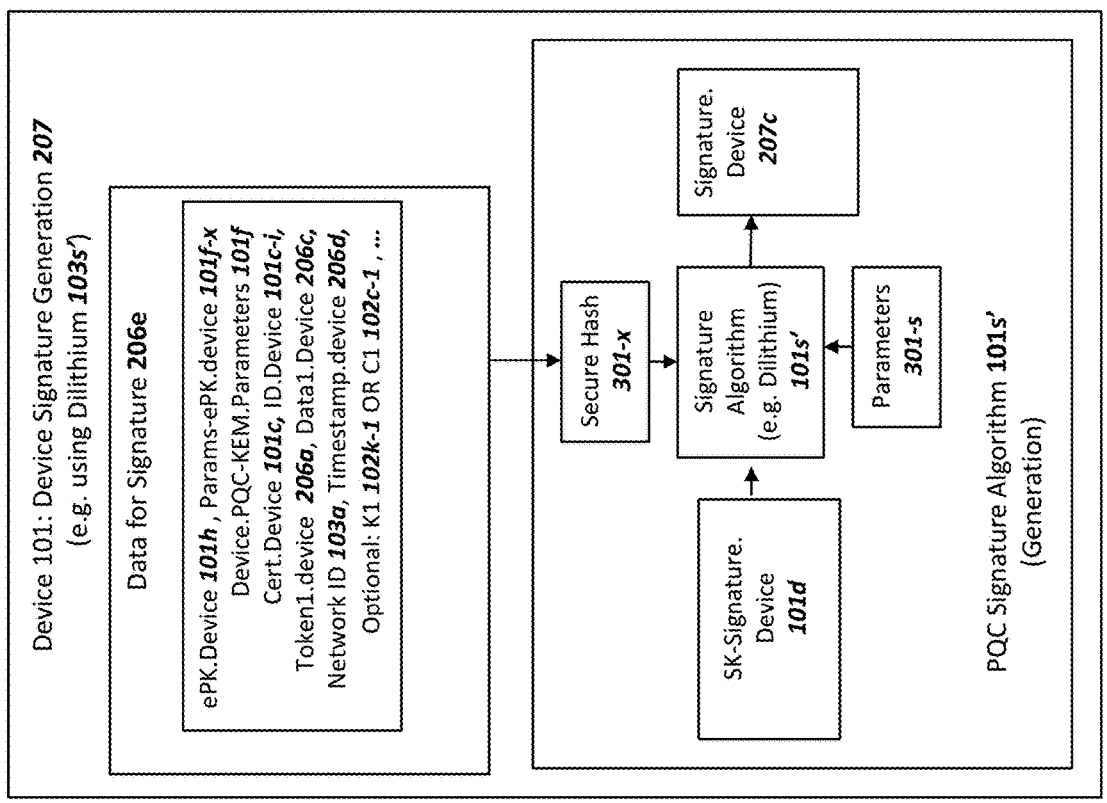

In exemplary embodiments, the "message to verify" 216a (depicted in FIG. 4) can include the same data as used by device 101 to generate the data for signature 206e (depicted in FIG. 3). The protocol used by both device 101 and server 111 could specify the two nodes use the same fields or values for the processing of digital signatures by both nodes. The "message to verify" 216a can be assembled via a step 216 by reading plaintext values from both plaintext 211a output from a step 215 and plaintext data received in a message 213. The "message to verify" 216a can include at least the device ephemeral public key ePK.Device 101h, the subset of KEM parameters for ePK.device 101h of params-ePK.device 101f-x (or KEM algorithm for ePK.device 101g), the KEM parameters device.PQC-KEM.Parameters 101f, the device certificate of cert.device 101c, the device identity of ID.Device 101c-i, the token token1.device 206a, data1.device 206c, the network ID 103a, timestamp.device 206d, and also optionally one of the first shared secret key K1 102k-1 or the first asymmetric ciphertext C1 102c-1. Note that not all values listed in the sentence above are required for inclusion in both the "message to verify" 216a and the data for signature 206e.

Other data could be included in the data for signature 206e as well, such as the identity 206b for the server static public key PK.server 103d used by device 101 in message 213 or the secure hash H (PK.server 103d). Note that not all the data or values described within this paragraph are required in the data for signature 206e, and some values could be omitted, such as a device certificate could be sent separately or omitted, the token 206a could be omitted, and other data could be omitted as well. But, in exemplary embodiments the "data for signature" 206e used by device 101 can be identical to the "message to verify" 216a used by server 111.

At step 217, server 111 can use (i) cryptographic algorithms 103s and (ii) device certificate cert.device 101c, including parameters within the device certificate, and (iii) the message to verify 216a in order to verify the digital signature of signature.device 207c. Exemplary details for conducting a step 217 are also depicted and described below in FIG. 4. Upon successful comparison of an internally calculated value for signature.device 207c with the received value for the digital signature of signature.device 207c from the message 213, then server 111 can trust that device 101 holds or operates with the private key SK-Sign.Device 101d corresponding to the device static public key in the PK-Signature.Device 103c-p in the device certificate cert.device 101c. In addition, server 111 can also trust or determine that the data within the message to verify 216a and the message 213 was transmitted by and originated by device 101.

At step 218, server 111 can verify the device certificate cert.device 101c using (i) cryptographic algorithms 103s and (ii) a trusted root or intermediate certificate issuer certificate stored within server 111. In this manner, server 111 can confirm the cert.device 101c is signed by a trusted certificate issuer. The digital signature verification steps for a step 218 on a digital signature within the cert.device 101c can be equivalent to the digital signature verification for the signature.device 207c in step 217 above, except the data being verified for the equivalent "message to verify" 216a can be data within the device certificate cert.device 101c. Note that a step 218 can include multiple levels of verifying certificates or digital signatures through a stored root or intermediate certificate in server 111, including determining that cert.device 101c has not been revoked.

At step 219a, server 111 can validate that the device ephemeral public key ePK.device 101h received within message 213 and plaintext 211a is properly structured and consistent with KEM parameters 101f-x. The device ephemeral public key ePK.device 101h can also be referred to as a key share. For example, if KEM parameters 101f-x state the key 101h supports the Kyber-786 algorithm, then in a step 219 server 111 could at least verify the ePK.device 101h is 1184 bytes long and also can be successfully input into a KEM ENCAPS function 103k for sever 111.

At a step 219a, server 111 can also verify that KEM parameters 101f-x is supported by Server.PQC-KEM.Parameters 103f. In other words, in a step 219, server 111 can determine the received KEM parameters 101f-x for a second KEM 103k/101j and ePK.device 101h are supported by server 111 by cryptographic algorithms 103s and cryptographic parameters 103x. The first KEM 101k/103j associated with KEM parameters 103f-y and PK/SK.server can be for (i) KEM ENCAPS 101k by device 101 and (ii) KEM DECAPS 103j by server as depicted and described in connection with FIG. 1 above. At a step 219a, server 111 can also generate a server token token2.server 219e, where the server token can comprise a random number issued by server 111 to device 101. The token2.server 219c can be used for a session identity and also for input into key derivation functions such as HKDF 221a as discussed below.

At step 219a, server 111 can also process data1.server 219f which could comprise at least one of several different possible data sets for server 111. The possible different data sets for data1.server 219f can include a registration response message for device 101 from server 111, parameters 103g used by server 111, firmware or configuration settings for device 101 including values for sensor 101y and actuator 101z, and other possibilities exist as well for data1.server 219f without departing from the scope of the present disclosure. For some embodiments, the data within data1.server 219f can include configuration data for device 101, such as a secondary platform bundle for PP 109.

In a preferred exemplary embodiment, for a step 219b, server 111 can select a third set of KEM parameters 103f-z that are both (i) different than the first set of KEM parameters 101f-x received in message 213 and (ii) supported by or included within the set of KEM parameters 101f also received in a message 213. The selection of a third set of KEM parameters 103f-y in a step 219b is also depicted and described in connection with FIG. 8 below. In summary, for a step 219b and in a preferred exemplary embodiment, server 111 selects KEM parameters 103f-z (or a KEM algorithm) for a third KEM 101k/103j. The first KEM comprises (i) KEM ENCAPS 101k by device 101 using PK.server 103d and (ii) KEM DECAPS 103j by server 111 as depicted and described in connection with FIG. 1 above. The second KEM comprises (i) KEM ENCAPS 103k by server 111 using ePK.device 101h and (ii) KEM DECAPS 101j by device 101. The third KEM comprises (i) KEM ENCAPS 101k' by device 101 using ePK.server 103h and (ii) KEM DECAPS 103j' by server 111 in a step 237 below. The first, second, and third KEM are also depicted and described in connection with FIG. 8 below.

In preferred exemplary embodiments, the KEM parameters 103f-z selected in a step 219b support at least the following criteria for KEM parameters 103f-z: (i) are included within a list or set of parameters 101f for device 101 received in message 213, (ii) are included within a list or set of parameters 103f for server 111 as supported by server 111, and (iii) support a different family or type of PQC algorithms than KEM parameters 101f-x. In other words if (x) device 101 signals support of Kyber and SIKE algorithms in parameters 101f and selects Kyber for KEM parameters 101f-x and ePK.device 101h, and (y) server 111 also supports Kyber and SIKE algorithms parameters 103f and cryptographic algorithms 103s, then for a step 219b server 111 for example can select a SIKE algorithm for KEM parameters 103f-z to use with the third KEM 101k'/103j' comprising KEM ENCAPS 101k' and KEM DECAPS 103j'. Other possibilities exist as well for the specific families of algorithms that could be specified in parameters 101f and 103f, received in 101f-x, and the selected in a step 219b by server 111 for KEM parameters 103f-z without departing from the scope of the present disclosure. Additional details regarding the selection of KEM parameters are depicted and described in connection with FIG. 8 below.

At step 219c, server 111 can use a PQC.KeyGen function 103q to generate a server ephemeral PM key pair comprising a server ephemeral public key ePK.server 103h and a server ephemeral private key eSK.server 103i. The algorithm used to generate the ephemeral PM key pair can be specified in KEM parameters 103f-z selected by server 111 in a step 219b above. In a step 219c, the server ephemeral PM key pair can comprise a key pair supporting key exchange mechanisms specified in Round 3 of the NIST "Post Quantum Cryptography" (PQC) project. Each KEM provides details for a KeyGen function, which could be used for a PQC.KeyGen function 103q from FIG. 1 in a step 219c. The server ephemeral public key ePK.server 103h generated in a step 219c can comprise the value of "Key Share" within a "Server Hello" message for a second message 213 below.

In some exemplary embodiments, the set of KEM parameters 103f-z (i) used in step 219c to generate a server ephemeral public key ePK.server 103h and a server ephemeral private key eSK.server 103i can be (ii) equal to or equivalent to KEM parameters 101f-x received in a message 213. In other words, some exemplary embodiments support device 101 and server 111 using the exact same algorithm for both (i) a second KEM 103k/101j initiated by a device through KeyGen and sending a first public key of ePK.device 101h, and (ii) a third KEM 101k'/103j' initiated by a server through KeyGen and sending a second public key of ePK.server 103h. Note that the first KEM 101k/103j can use the server static PM key pair such as PK.server 103d in device 101. In other exemplary embodiments, device 101 and server 111 use completely different algorithms for both (i) the second KEM 103k/101j initiated by a device through KeyGen and sending a first ephemeral public key of ePK.device 101h in a message 213, and (ii) the third KEM 101k'/103j' algorithm specified by a server 111 through KeyGen and sending a second ephemeral public key of ePK.server 103h.

In a first exemplary embodiment, (i) the second KEM 103k/101j initiated or selected by device 101 using ePK.device 101h supports lattice based algorithms, and (ii) the third KEM 101k'/103j' initiated or selected by server 111 using ePK.server 103h supports Supersingular Isogeny Key Encapsulation (SIKE). In a second exemplary embodiment, (i) the second KEM 103k/101j initiated or selected by device 101 using ePK.device 101h supports lattice based algorithms, and (ii) the third KEM 101k'/103j' initiated or selected by server 111 using ePK.server 103h supports code based algorithms. In a third exemplary embodiment, (i) the second KEM 103k/101j initiated or selected by device 101 using ePK.device 101h supports code based algorithms, and (ii) the third KEM 101k'/103j' initiated or selected by server 111 using ePK.server 103h supports lattice based algorithms.

In a fourth exemplary embodiment, (i) the second KEM 103k/101j initiated or selected by device 101 using ePK.device 101h supports code based algorithms and (ii) the third KEM 101k'/103j' initiated or selected by server 111 using ePK.server 103h supports Supersingular Isogeny Key Encapsulation. In a fifth exemplary embodiment, (i) the second KEM 103k/101j initiated or selected by device 101 using ePK.device 101h supports Supersingular Isogeny Key Encapsulation and (ii) the third KEM 101k'/103j' initiated or selected by server 111 using ePK.server 103h supports code based algorithms. In a sixth exemplary embodiment, (i) the second KEM 103k/101j initiated or selected by device 101 using ePK.device 101h supports Supersingular Isogeny Key Encapsulation and (ii) the third KEM 101k'/103j' initiated or selected by server 111 using ePK.server 103h supports lattice based algorithms.

For the six embodiments described above in the previous two paragraphs, lattice based algorithms could comprise any of CRYSTALS-KYBER, FrodoKEM, NTRU, NTRU Prime, and SABER. For the six embodiments described above in the previous two paragraphs, code based algorithms could comprise any of BIKE, Classic McEliece, and HQC. The algorithms described in the previous sentence are specified in "Round 3" of the Wikipedia PQC article.

At step 219d, server 111 can select a server certificate of cert.server 103c which supports the device extensions 101g received in a message 213. At one example, different cert.server 103c could support both (i) different digital signature algorithms and (ii) different certificate issuers (such that cert.server 103c could be verified by device 101 using the same certificate issuer). At the conclusion of a step 219d, server 111 can identify and store a cert.server 103 for subsequent steps and messages in FIG. 2 that would be compatible with device 101. In exemplary embodiments, the server certificate of cert.server 103c supports at least a subset of both device extensions 101g and server parameters 103g.

At step 220a, server 111 can also select metadata 220m, where metadata 220m can include parameters or values used for the subsequent generation of both a second asymmetric ciphertext C2 102c-2 and a second symmetric ciphertext symm-C2 102s-2. As one example, metadata 220m could include values or a name a symmetric ciphering algorithm used to generate the second symmetric ciphertext symm-C2 102s-2 or the third symmetric ciphertext symm-C3 102s-3 for data sent by server 111 to device 101 in a message 224. As a second example, the metadata 220m could include an initialization vector for the symmetric ciphertext symm-C2 102s-2 and/or symm-C3 102s-3 and also an identity of the symmetric ciphering algorithm (such as "AES" or Blowfish) and a chaining mode (e.g. ECB, CGM, etc.). For some embodiments, initialization vectors could be mutually derived using shared secret keys and HKDF, and the initialization vectors could be omitted from metadata for messages.

At step 220b, server 111 can also select server extensions 103g-1 used by the server in generating a subsequent first response message 224, which could also comprise a "Server Hello" message. Note that server extensions 103g-1 can be a subset of the supported server extensions 103g described in FIG. 1 above. Server 111 can use both (i) the received device extensions 101g from a first message 213 and (ii) stored parameters and algorithms from for server extensions 103*g* in order to select a compatible and preferred set of server extensions 103*g*-1 that would also be supported by device 101. Server extensions 103*g*-1 can select subsets of algorithms or parameters offered or proposed by device 101 in the first message 213.

A portion of the subsets of subsets of algorithms or parameters offered or proposed by device 101 in the first message 213 can also be included in metadata 220*m*, such as specifying a specific symmetric ciphering algorithm and parameters for the second and third symmetric ciphertexts C2/C3 102*c*-2/3. In other words, device 101 could use metadata 220*m* in order to process and decrypt the second and third symmetric ciphertexts C2/C3 102*c*-2/3 (where metadata 220*m* would normally be plaintext in order to device 101 to process the symmetric ciphertext). For embodiments of the present invention, the server extensions 103*g*-1 selected by a server 111 in a step 220*a* can include both (i) a digital signature algorithm for generating a digital signature in a signature.server 219*g* and (ii) symmetric ciphering parameters for processing a second and third symmetric ciphertexts C2/C3 102*c*-2/3.

At step 220, server 111 can derive or generate a random number M2 220*a* for use in a second KEM 103*k*/101*j* between server 111 and device 101. The function and use of a step 220 and a KEM ENCAPS function 103*k* is also depicted and described in FIG. 5*a* below. At step 220, server 111 can use both (i) the received device ephemeral public key of ePK.device 101*h* and (ii) the specified subset of parameters 101*f*-*x* for the device ephemeral public key and the second KEM 103*k*/101*j* in order to generate both (x) a second asymmetric ciphertext C2 102*c*-2 and (y) a second shared secret key K2 102*k*-2. At step 220, server 111 can use a KEM ENCAPS function 103*k* with both (i) and (ii) from the previous sentence in order to generate both (x) the second asymmetric ciphertext C2 102*c*-2 and (y) the second shared secret key K2 102*k*-2. A summary of the step 220 by server 111 with a KEM ENCAPS function 103*k* was also depicted and described in connection with FIG. 1 above. A server 111 can use both cryptographic algorithms 103*s* and cryptographic parameters 103*x* in order to conduct the step 220.

At step 221, server 111 can use a hash-based key derivation function or HMAC-based Extract-and-Expand Key Derivation Function (HKDF) 221*a* (depicted and described in FIG. 5 below) with at least the second shared secret key K2 102*k*-2 output from KEM ENCAPS function 103*k* in order to generate both (i) a second symmetric ciphering key of S2 221*b* and a second message authentication code (MAC) key MAC2 221*c*. Note that in some exemplary embodiments, additional data mutually shared between device 101 and server 111 besides the second shared secret key K2 102*k*-2 can also be input into the HKDF 221*a* in a step 221 in order to generate S2 221*b* and MAC2 221*c*. The additional data input into HKDF 221*a* can comprise data from the message 213 and the message 213, such as, but not limited to, the device ephemeral public key ePK.device 101*h* from device 101, device extensions 101*g*, parameters 101*f* and 101*f*-*x*, the server ephemeral public key ePK.server 103*h* from server 101, server extensions 103*g*-1, parameters 103*f*-*y*, and server certificate cert.server 103*c*.

In preferred exemplary embodiments, in a step 221, at least both the first shared secret key K1 102*k*-1 and the second shared secret key K2 102*k*-2 are input in the HKDF 221*a* in order to generate keys S2 221*b* and MAC2 221*c*. In this manner, the second symmetric ciphering key S2 and MAC key MAC2 can be mutually derived with server 111 more securely by including input from two separate shared secrets (e.g. K1 and K2, which can be derived by separate KEM algorithms), compared to deriving the key S2 and MAC2 using only a single KEM algorithm. In other words, the combination of K1 and K2 for HKDF 221*a* provides security equal to at least the stronger of the first KEM (for KEM ENCAPS 103*k*) and the second KEM (for KEM ENCAPS 101*k*). As discussed above for the generation of S1 210*b* from a first HKDF 210*a*, the second symmetric ciphering key S2 221*b* can comprise a first portion or key S2 221*b*-1 for encryption by server 111 (and decryption by device 101) and a second portion or key S2 221*b*-2 for decryption by server 111 (and encryption by device 101). Two equivalent MAC keys MAC2 221*c*-1 and MAC2 221*c*-2 can be generated in a step 221 as well.

In an exemplary embodiment, the KEM parameters 101*f*-*x* for ePK.device and KEM parameters 103*f*-*z* for ePK.server can be the same, and the second KEM 103*k*/101*j* and the third KEM 101*k*'/103*j*' could be conducted using the same PQC KEM algorithm. Although the benefits of increased security from conducting two different types of PQC KEM algorithms for the second KEM and the third KEM are not provided in this embodiment described within this paragraph, several benefits of the present disclosure are achieved to address the identified needs in the art. First, both the device and server can generate ephemeral PM key pairs, such that the security after the second and third KEM depends on more than one KEM ENCAPS/DECAPS step. Second, even with the same KEM parameters for both 101*f*-*x* and 103*f*-*z*, two distinct shared secret keys K2 and K3 can be generated and both keys K2 and K3 can be used for HKDF 231*a*. In general, the use of two distinct shared secret keys K2 and K3 compared to the use of a single shared secret key will provide a higher level of security for deriving a third symmetric ciphering key S2 221*b*.

At step 223', server 111 can use symmetric encryption 223*a* with the second asymmetric ciphertext C2 102*c*-2 as the plaintext from a step 221 above in order to generate a second symmetric ciphertext symm-C2 102*s*-2. A step 223' is also depicted and described in connection with FIG. 5*b* below. The symmetric encryption 223*a* can be included within cryptographic algorithms 103*s* for server 111. The symmetric encryption 223*a* can include input of at least (i) the parameters 220*m*' specified in metadata 220*m* from a step 220*a* above for server 111, and (ii) the symmetric ciphering key S2 221*b* and MAC key MAC2 221*c* from a step 221 above. A step 223' can also include server processing metadata 220*m*, where metadata 220*m* can include plaintext data to conduct symmetric encryption 223*a* such as handshake headers, an initialization vector, an identity of the symmetric ciphering key to use, etc. Parameters 220*m*' can comprise a portion of the metadata 220*m* determined in a step 220 above. Note that the output of the step 223' can comprise a "double encrypted" second asymmetric ciphertext C2 102*c*-2, where (i) the first layer of encryption can be via asymmetric encryption via the second KEM 103*k*/101*j*, and (ii) the second layer of encryption can be via symmetric encryption 223*a* of the second asymmetric ciphertext C2 102*c*-2.

For some exemplary embodiments, a step 223' can be omitted and the second asymmetric ciphertext C2 102*c*-2 could be transmitted without the additional layer of symmetric encryption from a step 223'. In other words, the data depicted as transmitted in a message 224 in FIG. 2 regarding the second asymmetric ciphertext C2 102*c*-2 could be "C2 102*c*-2" instead of the depicted value of "Symm-C2 102*s*-2 ({C2 102*c*-2} 210*b*)."

Although the ciphertext from the party conducting an ENCAPS function (e.g. server 111 using the device ephemeral public key ePK.device 101h) is normally secure with the first level of asymmetric encryption, additional levels of security could be obtained for the system 200 in FIG. 2 by server 111 conducting a step 223' to "double encrypt" the second asymmetric ciphertext C2 102c-2 output from KEM ENCAPS 103k also using symmetric encryption. In other words, by using "double encryption" via the second symmetric ciphertext symm-C2 102s-2, an attacker would need to break both symmetric encryption 223a and asymmetric encryption from KEM ENCAPS 103k in order to determine K2 102k-2 or read usable information regarding K2 102k-2. Without "double encryption", an attacker would need to break only asymmetric encryption from KEM ENCAPS 103k in order to determine K2 102k-2. In addition, the use of a "double encrypted" second asymmetric ciphertext C2 102c-2 by server 111 increases resistance to an attacker substituting a fake or fraudulent second asymmetric ciphertext C2 102c-2, if the attacker was able to obtain the device ephemeral public key ePK.device 101h.

Or, in an embodiment where the second asymmetric ciphertext C2 102c-2 is not "double encrypted, (i) the second asymmetric ciphertext C2 102c-2 could omit being encrypted with the symmetric ciphering key S1 210b by server 111 in a step 223' and (ii) the second asymmetric ciphertext C2' 102c-2' could be processed in a step 223a in FIG. 5b below with only the first MAC key MAC1 210c (which is depicted below in FIG. 5b). For these embodiments, the MAC codes transmitted by server 111 along with the plaintext second asymmetric ciphertext C2' 102c-2', and the MAC codes could be verified by device 101 using the MAC key MAC1 210c derived by device 101. In other words, a second asymmetric ciphertext C2 102c-2 in a message 224 below could comprise a second asymmetric ciphertext C2 102c-2 with MAC codes generated using the first MAC key MAC1 210c generated by server 111 in a step 214, such that device 101 could verify the second asymmetric ciphertext C2 102c-2 was generated by server 111 that (i) conducted the KEM ENCAPS 103k and (ii) operates with the first shared secret key K1 102k-1.

At step 222, server 111 can select and process a plaintext 222a for encryption into a third symmetric ciphertext symm-C3 102s-3. A step 222 for a server 111 is also depicted and described in connection with FIG. 5a below. Note that the second symmetric ciphertext symm-C3 102s-2 could be previously output from the step 223' above, so a processor 111p can conduct the step 222 to generate the third symmetric ciphertext symm-C3 102s-3. For embodiments where the second symmetric ciphertext symm-C3 102s-2 is omitted (such as described in the paragraph above), then a system 200 depicted in FIG. 2 could include a first symmetric ciphertext symm-C1 102s-1 in a first message 213 and then a third symmetric ciphertext symm-C3 in a second message 224.

In some exemplary embodiments for authentication of server 111 by device 101, then the plaintext 222a can also include a server certificate of cert.server 103c, as well as a server digital signature over plaintext 222a (but excluding the digital signature itself) using the private key corresponding to the public key in cert.server 103c. The digital signature for the server in a step 222 can be signature.server 219g. For a step 222, server 111 can also (i) calculate a secure hash value over data in either or both the first message 213 and a response second message 224, and (ii) input into the generation of the server digital signature of signature.server 219g. The process to generate a server digital signature of signature.server 219g can be equivalent to the process to generate a device digital signature signature.device 207c depicted and described in connection with FIG. 3.

For a step 222, the selection and processing of data for plaintext 222a can include data for (i) the server ephemeral public key ePK.server 103h, (ii) the KEM parameters 103f-z for the server ephemeral public key ePK.server 103h, where the KEM parameters 103f-z can be selected in a step 219b above, (iii) the device 101 token token1.device 206a which was received in a message 213 above, (iv) data for server 111 of data1.server 219f, (v) a server certificate cert.server 103c, (vi) a server digital signature for server 111 comprising signature.server 219g, where the digital signature can be verified using the server certificate cert.server 103c. Note that the plaintext data for generating and verifying the digital signature signature.server 219g can include the data for (i) through (v) in the previous sentence.

In addition, in exemplary embodiments, the server digital signature signature.server 219g can also be over at least the second asymmetric ciphertext C2 102c-2 and/or the second shared secret key K2 102k-2. For some embodiments, the server digital signature signature.server 219g can be over either (i) the second symmetric ciphertext symm-C2 102s-2, where the second symmetric ciphertext symm-C2 102s-2 comprises a symmetric encryption of the asymmetric second ciphertext C2 102c-2, or (ii) the second asymmetric ciphertext C2 102c-2. In addition, the server digital signature signature.server 219g can be over the server token token2 219e. For some embodiments, the server digital signature 219g can be omitted, and authentication for the server 111 can be assured through the use of the server static public key PK.server 103d stored by the device 101 and the server static private key SK.server 103b stored by the server 111 and used in the first KEM 101k/103j. In other words, only a server 111 storing or having access to the server static private key SK.server 103b could generate a mutually derived first shared secret key K1 102k-1 for both the server 111 and device 101. A server digital signature 219g can be also be over fewer values that all of (i) through (v) in the above paragraph, and for embodiments that use a server digital signature 219g, then the server digital signature 219g can be over at least the server ephemeral public key ePK.server 103h.

At step 223, server 111 can use symmetric encryption 223a with the plaintext 222a from a step 222 in order to generate the third symmetric ciphertext symm-C3 102s-3. A step 223 is also depicted and described in connection with FIG. 5a below. The symmetric encryption 223a can be included within cryptographic algorithms 103s for server 111. The symmetric encryption 223a can include input of at least (i) the parameters 220m' specified in metadata 220m from a step 220 above for server 111, and (ii) the symmetric ciphering key S2 221b and MAC key MAC2 221c from a step 221 above. A step 223 can also include server 111 processing metadata 220m, where metadata 220m can include handshake headers, an initialization vector, an identity of the algorithm for symmetric encryption 223a, etc. Metadata 220m and parameters 220m' can comprise a portion of the metadata 212b received in a message 213 from device 101.

For the exemplary embodiment depicted in FIG. 2, the second symmetric ciphertext symm-C2 102s-2 can be encrypted using the first symmetric ciphering key S1 210b and the third symmetric ciphertext symm-C3 102s-3 can be encrypted using the second symmetric ciphering key S2 221b. The derivation and use of the first symmetric ciphering key S1 210b by server 111 is depicted and described in connection with FIG. 4 below. The derivation and use of the second symmetric ciphering key S2 221b by server 111 is depicted and described in connection with FIG. 5a below.

As depicted in FIG. 2, server 111 can then send device 101 a response second message 224, where the second message 224 can also comprise a "Server Hello" message. The second message 224 can include at least (i) a server token of token2.server 219e, (ii) metadata 220m from a step 220 above, (iii) the second asymmetric ciphertext C2 102c-2 output from the KEM ENCAPS function 103k (where the second asymmetric ciphertext C2 102c-2 can be optionally encrypted into a second symmetric ciphertext symm-C2 102s-2 in a step 223' as depicted and described in connection with FIG. 5b below), and (iii) the third symmetric ciphertext symm-C3 102s-3 output from step 223. For some embodiments as depicted with the second message 224 in FIG. 2, server 111 could send the second asymmetric ciphertext C2 102c-2 output from a step 223' (depicted in FIG. 5b below), where the second asymmetric ciphertext C2 102c-2 is "double encrypted" and contained within a second symmetric ciphertext symm-C2 102s-2, as depicted in FIG. 2.

Additional data could be included in a response message 224 without departing from the scope of the present disclosure. For some embodiments, the portions of data for a response second message 224 of (i) metadata 220m, (ii) token2 219e, (iii) the second symmetric ciphertext symm-C2 102s-2 (or possibly second asymmetric ciphertext C2 102c-2 without "double encryption" and a step 223'), and (iv) the third symmetric ciphertext symm-C3 102s-3 could be sent as separate segments, portions, TCP or UDP packets, or sub-messages, The aggregate delivery of the data for items (i) through (iv) in the previous sentence can represent the response second message 224. Note the first message 213 and the messages 236 below could likewise be separated into different segments, where the collective segments for each message represent the full message.

Device 101 can receive the second message 224 and conduct a series of steps in order to process the message and securely receive data from the server. For embodiments where the second message includes a "double encrypted" second symmetric ciphertext symm-C2 102s-2, device 101 could conduct a step 215' as depicted and described in connection with FIG. 5b below in order to decrypt the second symmetric ciphertext symm-C2 102s-2 using the first symmetric key S1 210b in order to read a plaintext value for the second asymmetric ciphertext C2 102c-2. Device 101 could process the "double encrypted" second symmetric ciphertext symm-C2 102s-2 using the metadata 212b that was sent by device 101 in a message 213 (such as specifying a symmetric ciphering algorithms as well as parameters such as AES-128 or AES-192, etc.).

In other words, for a step 215' the device 101 could (i) use the first symmetric ciphering key S1 210b and MAC key MAC1 210c (from a step 209) in order to (ii) decrypt the second symmetric ciphertext symm-C2 102s-2 into the second asymmetric ciphertext C2 102c-2. For some embodiments, the use of a first symmetric ciphering key S1 210b could be omitted in a step 215' (and also corresponding step 223' by server 111), and the second ciphertext symm-C2 102s-2' could comprise the second asymmetric ciphertext C2 102c-2 with MAC codes sent with the second message 224 that could be verified by device 101 with the first MAC key MAC1 210c. In other words, for some embodiments, the second symmetric ciphertext 102s-2 may not be "double encrypted" and alternatively include MAC codes for verification with the MAC key MAC1 210c.

At step 225, device 101 can use the specified KEM parameters 101f-x (i) transmitted in message 213 and (ii) along with cryptographic algorithms 101s to conduct the KEM DECAPS 101j function with the received second asymmetric ciphertext C2 102c-2. The device can use the device ephemeral private key of eSK.device 101i with the KEM DECAPS 101j and the received second ciphertext 102c-2 in order to generate the second shared secret key K2 102k-2. A step 225 for device 101 is also depicted and described in connection with FIG. 5a below. Note that for some PQC algorithms, the KEM DECAPS 101j function could fail for a small frequency of messages 224 and second asymmetric ciphertext C2 102c-2, such as less than one failure per million or billion KEM, and if a step 225 fails, then device 101 could send server 111 an error message and request regeneration and retransmission of a message 224.

A step 225 can also include device 101 using at least the second shared secret key K2 102k-2 with the HKDF 221a (depicted in FIG. 5a below) in order to generate the second symmetric ciphering key S2 221b and the second MAC key MAC1 221c. In some exemplary embodiments, the HKDF 221a can also include input of at least the first shared secret key K1 102k-1 in addition to the second shared secret key K2 102k-2 in order to generate the second symmetric ciphering key S2 221b and the second MAC key MAC2 221c. In this manner and by including the first shared secret key K1 102k-1, the symmetric ciphering key S2 and MAC key MAC2 can be mutually derived with server 111 more securely by including input from two separate shared secrets (e.g. K1 and K2, which can also be derived by separate KEM algorithms), compared to deriving the keys S2 and MAC2 using only a single KEM algorithm (e.g. using either (i) K2 only or (ii) a single, same KEM algorithm for K1 and K2). In other words, the combination of (x) K1 output from a first KEM 101k/103j and K2 output from a second KEM 103k/101j for (y) HKDF 221a provides security equal to at least the stronger of the first KEM (for KEM ENCAPS 101k) and the second KEM (for KEM DECAPS 101j). At the conclusion of a step 225, device 101 can store the second symmetric ciphering key S2 221b and MAC key MAC2 221c, which are mutually and secretly shared between device 101 and server 111.

At step 226, device 101 can use symmetric decryption 226a with the third symmetric ciphertext symm-C3 102s-3 from the second message 224 in order to read the plaintext 222a. A step 226 for device 101 is also depicted and described in connection with FIG. 5a below. The symmetric decryption 226a can be included within cryptographic algorithms 101s for device 101. The symmetric decryption 226a can include input of the parameters specified in metadata 220m from the second message 224 and the second symmetric ciphering key S2 221b and second MAC key MAC2 221b from a step 225 above. Note that metadata 220m can include parameters for a symmetric decryption 226a.

Note that the data for plaintext 222a can comprise the same plaintext 222a generated by server 111 in a step 222 above. The plaintext data can include (i) the server ephemeral public key ePK.server 103h, (ii) the KEM parameters 103f-z for the server ephemeral public key ePK.server 103h, where the KEM parameters 103f-z can be a subset of parameters 101f transmitted by device 101 in a message 213, (iii) the device 101 token token1.device 206a which was transmitted by device 101 in a message 213 above, (iv) data for server 111 of data1.server 219f, (v) a server certificate cert.server 103c, (vi) a digital signature for server 111 comprising signature.server 219g, where the digital signature can be verified using the server certificate cert.server 103c. Some data could be omitted from a plaintext 222a, such as both the server certificate cert.server 103c and the digital signature for server 111 as described in this FIG. 2 above, where authentication of the server 111 can be confirmed by device 101 through the use of the stored server static public key PK.server 103*d* to mutually derive the first shared secret key K1 102*k*-1.

At step 227, device 101 could first select a "message to verify" from message 224 and plaintext 222*a*, where the values and fields could be specified in the protocol for establishing a secure session. The "message to verify" in a step 227 could comprise data from message 224 similar to the "message to verify" 216*a* processed by a server 111. In exemplary embodiments, the "message to verify" selected and processed by device 101 in a step 227 could include at least (i) the server ephemeral public key ePK.server 103*h*, (ii) the KEM parameters 103*f-z* for the server ephemeral public key ePK.server 103*h*, (iii) the device 101 token token1.device 206*a* which was transmitted by device 101 in a message 213 above, (iv) data for server 111 of data1.server 219*f*, (v) a server certificate cert.server 103*c*. For some embodiments, the "message to verify" can also include the server token token2 219*e* and metadata 220*m*. The selection and processing of a "message to verify" in a step 227 by device 101 can be equivalent to the "message to verify" 216*a* in a step 216 by server 111 in FIG. 4 above, except using data from the server 111 in the message 224.

At step 228, device 101 can verify a digital signature for a server "Certificate Verify" or signature.server 219*g* from plaintext 222*a*. For a step 228, device 101 could use the equivalent step 217 as used by server 111 to verify a device digital signature. The "message to verify" from a step 227 could be input into a PQC Signature Algorithm 101*s'* along with the server static public key for signatures within cert.server 103*c* from message 224 in order to verify the server digital signature signature.server 219*g*. Device 101 could compare a calculated signature.server 219*g* with a received signature.server 219*g* (corresponding to the received and calculated signature.device 207*c* in step 217 above). If the calculated signature.server 219*g* (using the server public key from cert.server 103*c*) matches the received signature.server 219*g*, then device 101 can consider the digital signature verified in a step 228. A step 228 could also include device 101 verifying a certificate chain for server certificate cert.server 103*c* up through a stored root certificate or trusted intermediate certificate in device 101.

At step 229, device 101 can derive or generate a random number M3 229*a* for use in a third KEM 101*k'*/103*j'* between device 101 and server 111. The random number M3 229*a* can be used for a subsequent KEM in a step 230. The function and use of a step 230 and a KEM ENCAPS function 101*k'* is also depicted and described in FIG. 6 below. At step 230, device 101 can use both (i) the received server ephemeral public key of ePK.server 103*h* and (ii) the specified subset of parameters 103*f-z* for the server ephemeral public key and the second KEM 101*k'*/103*j'* in order to generate both (x) a third asymmetric ciphertext C3 102*c*-3 and (y) a third shared secret key K3 102*k*-3. At step 230, device 101 can use a KEM ENCAPS function 101*k* with both (i) and (ii) from the previous sentence in order to generate both (x) the third asymmetric ciphertext C3 102*c*-3 and (y) the third shared secret key K3 102*k*-3. A summary of the step 230 by device 101 with an equivalent KEM ENCAPS function 101*k* was also depicted and described in connection with FIG. 1 above. A device 101 can use both cryptographic algorithms 101*s* and cryptographic parameters 101*x* in order to conduct the step 230. At step 231, device 101 can use a hash-based key derivation function or HMAC-based Extract-and-Expand Key Derivation Function (HKDF) 231*a* (depicted and described in FIG. 6 below) with at least the third shared secret key K3 102*k*-3 output from KEM ENCAPS function 101*k'* in order to generate both (i) a third symmetric ciphering key of S3 231*b* and a third message authentication code (MAC) key MAC3 231*c*. Note that in some exemplary embodiments, additional data mutually shared between device 101 and server 111 besides the third shared secret key K3 102*k*-3 can also be input into the HKDF 231*a* in a step 231 in order to generate S3 231*b* and MAC2 231*c*. The additional data input into HKDF 231*a* can comprise data from the message 213 and the message 224, such as, but not limited to, the device ephemeral public key ePK.device 101*h* from device 101, token1.device 206*a*, parameters 101*f* and 101*f-x*, the server ephemeral public key ePK.server 103*h* from server 101, server token token2.server 219*e*, parameters 103*f-y*, server certificate cert.server 103*c*, and also the digital signature signature.server 219*g*.

In a preferred exemplary embodiment, in a step 231, at least all of the first shared secret key K1 102*k*-1, the second shared secret key K2 102*k*-2, and the third shared secret key K3 102*k*-3 are input in the HKDF 231*a* in order to generate keys S3 231*b* and MAC3 231*c*. In this manner, the third symmetric ciphering key S3 and MAC key MAC3 can be mutually derived with server 111 more securely by including input from three separately generated shared secrets (e.g. K1 and K2 and K3, which may be derived by separate KEM algorithms for some embodiments), compared to deriving the key S3 and MAC3 using only a single KEM algorithm. In other words, the combination of K1 and K2 and K3 for HKDF 231*a* provides security equal to at least the stronger of the first KEM (for KEM ENCAPS 101*k* with PK.server 103*d*) and the second KEM (for KEM DECAPS 101*j* with eSK.device 101*i*) and the third KEM (for KEM ENCAPS 101*k'* with ePK.server 103*h*). As discussed above for the generation of S1 210*b* from a first HKDF 210*a*, the output from a HKDF 231*a* of the third symmetric ciphering key S3 231*b* can comprise a first key S3 231*b*-1 for encryption by device 101 and a second key S3 231*b*-2 for encryption by server 111 (and decryption by device 101).

In an exemplary embodiment, the KEM parameters 101*f-x* for ePK.device and KEM parameters 103*f-z* for ePK.server can be the same, and the second KEM 103*k*/101*j* (with ENCAPS and ePK.device 101*h*) and the third KEM 101*k*/103*j* (with ENCAPS and ePK.server 103*h*) could be conducted or processed using the same PQC KEM algorithm. Although the benefits of increased security from conducting two different types of PQC KEM algorithms for the second KEM and the third KEM are not provided in this embodiment described within this paragraph, several benefits of the present disclosure are achieved to address the identified needs in the art. First, both the device and server can generate ephemeral PM key pairs, such that the security after the first and second KEM depends on more than one KEM ENCAPS/DECAPS step. Second, even with the same KEM parameters for both 101*f-x* and 103*f-z*, two distinct shared secret keys K2 and K3 can be generated and both keys K2 and K3 can be used for HKDF 231*a*. In general, the use of two distinct shared secret keys K2 and K3 compared to the use of a single shared secret key will provide a higher level of security for deriving a third symmetric ciphering key S3 231*b*. In exemplary embodiments, at least two different classes or types of KEM algorithms from the set of code-based algorithms, lattice based algorithms, and SIKE are used in the generation of K1 in a step 210, K2 in a step 221, and K3 in a step 231.

At step 232, device 101 can use symmetric encryption 223*a* with the third asymmetric ciphertext C3 102*c*-3 from a step 231 above in order to generate a fourth symmetric ciphertext symm-C4 102s-4. A step 232 is also depicted and described in connection with FIG. 6 below. The symmetric encryption 223a can be included within cryptographic algorithms 101s for device 101. The symmetric encryption 223a can be equivalent or the same as the symmetric encryption 223a used by a server 111 in a step 223 depicted in FIG. 5a below. The symmetric encryption 223a can include input of at least (i) the parameters 220m' specified in metadata 220m from a message 224, and (ii) the symmetric ciphering key S3 231b and MAC key MAC3 231c from a step 231 above. A step 232 can also include device 101 processing metadata 220m from message 224, where metadata 220m can include plaintext data to conduct symmetric encryption 223a such as handshake headers, an initialization vector, an identity of the symmetric ciphering key to use, etc. Parameters 220m' can comprise a portion of the metadata 220m. Note that the output of the step 232 can comprise a "double encrypted" third asymmetric ciphertext C3 102c-3, where (i) the first layer of encryption can be via asymmetric encryption via the third KEM 101k'/103j' using ePK.server 103h, and (ii) the second layer of encryption can be via symmetric encryption 223a of the third asymmetric ciphertext C3 102c-3.

For some exemplary embodiments, a step 232 can be omitted and the third asymmetric ciphertext C3 102c-3 could be transmitted without the additional layer of symmetric encryption from a step 232. In other words, the data depicted as transmitted in a message 236 in FIG. 2 regarding the third asymmetric ciphertext C3 102c-3 could be "C3 102c-3" instead of the depicted value of "Symm-C4 102s-4 ({C3 102c-3} 221b)."

Although the ciphertext from the party conducting an ENCAPS function (e.g. device 101 using the server ephemeral public key ePK.server 103h in a step 230) is normally secure with the first level of asymmetric encryption, additional levels of security could be obtained for the system 200 in FIG. 2 by device 101 conducting a step 232 to "double encrypt" the third asymmetric ciphertext C3 102c-3 output from KEM ENCAPS 101k with ePK.server 103h also using symmetric encryption. In other words, by using "double encryption" via the fourth symmetric ciphertext symm-C4 102s-4, an attacker would need to break at least both symmetric encryption 223a and asymmetric encryption from KEM ENCAPS 101k' in order to determine K3 102k-3. Without "double encryption", an attacker would need to break only asymmetric encryption from KEM ENCAPS 101k' in order to determine K3 102k-3. In addition, the use of a "double encrypted" third asymmetric ciphertext C3 102c-3 by device 101 increases resistance to an attacker substituting a fake or fraudulent third asymmetric ciphertext C3 102c-3, if the attacker was able to obtain the server ephemeral public key ePK.server 103h.

Or, in some embodiments where the third asymmetric ciphertext C3 102c-3 is not "double encrypted, (i) the fourth symmetric ciphertext symm-C4 102c-4 could omit the use of the symmetric ciphering key S2 221b by device 101 in a step 232 and (ii) the third asymmetric ciphertext C3 102c-3 could be processed in a step 223a during a step 232 with only the second MAC key MAC2 221c (which is depicted below in FIG. 6). For these embodiments, the MAC codes transmitted by device 101 along with the third asymmetric ciphertext C3 102c-3 in the third message 236 below could be verified by server 111 using the MAC key MAC2 221c derived by server 111 in a step 221. In other words, a third asymmetric ciphertext C3 102c-3 in a message 236 below could comprise a third asymmetric ciphertext C3 102c-3 with MAC codes generated using the second MAC key MAC2 221c generated by device 101 in a step 225, such that server 111 could verify the third asymmetric ciphertext C3 102c-3 was generated by device 101 that (i) conducted the KEM ENCAPS 101k' with ePK.server 101h and (ii) operates with the second shared secret key K2 102k-2.

At step 233, device 101 can process application data 233a. The application data 233a could comprise a sensor measurement from sensor 101y in FIG. 1, a registration message from device 101 to server 111, a set of configuration data for device 101 such as parameters used by device 101 for operating an application with server 111. For some embodiments, the application data 233a in a step 233 could comprise data formatted according to any one of the following protocols: SIP, IPSec, HTTP, JSON, XML, SSH, MQTT, etc.

At step 234, device 101 can select and process a plaintext 234a for encryption into a fifth symmetric ciphertext symm-C5 102c-5. A step 234 for a device 101 is also depicted and described in connection with FIG. 7 below. In exemplary embodiments, the plaintext 234a can include application data 233a from a step 233 above and also the device token token1.device 206a and the server token token2.server 219e. In some exemplary embodiments for mutual authentication between device 101 and server 111, then the plaintext 234a can also include a device certificate of cert.device 101c (instead of including cert.device 101c in plaintext 222a), and/or a digital signature over plaintext 233a (but excluding the digital signature itself) using the private key corresponding to the public key in cert.device 101c. For a step 234, device 101 can also (i) calculate a hash value over data in both the first message 213 and the response second message 234, and (ii) include the hash value in the plaintext 234a.

At step 235, device 101 can use symmetric encryption 235a with the plaintext 234a from a step 234 in order to generate the fifth symmetric ciphertext symm-C5 102s-5. A step 235 is also depicted and described in connection with FIG. 7 below. The symmetric encryption 235a can be included within cryptographic algorithms 101s for device 101. The symmetric encryption 235a can include input of at least (i) the parameters specified in metadata 212b from a step 212 above for device 101, and (ii) the symmetric ciphering key S3 231b and MAC key MAC3 231c from a step 231 above. A step 235 can also include device 101 processing metadata 212b, where metadata 212b can include handshake headers, parameters 103f-y, an initialization vector, etc. Metadata 212b in a step 235 can be equivalent (e.g. formatted the same but with different values) than the metadata 212b transmitted in a message 213 by device 101.

As depicted in FIG. 2, device 101 can then send server 111 a third message 236. For some embodiments, the third message 236 can also comprise a "Client Finished" message. The third message 236 can include at least (i) metadata 212b from a step 235 above, (ii) the fourth symmetric ciphertext symm-C4 102s-4 with third asymmetric ciphertext C3 102c-3 output from the KEM ENCAPS function 101k' in a step 230, and (iii) the fifth symmetric ciphertext symm-C5 102c-5 output from step 235. For some embodiments, a message 236 could include a plaintext value of the third asymmetric ciphertext C3 102c-3 instead of "double encryption" into the fourth symmetric ciphertext symm-C4 102s-4. For these embodiments then both (i) the fourth symmetric ciphertext symm-C4 102s-4 could be omitted and (ii) the step 232 could be omitted as well. As described above, the third asymmetric ciphertext C3 102c-3 could comprise the third asymmetric ciphertext C3 102c-3 from a step 230 by device 101 that has been either (i) encrypted with the second symmetric ciphering key S2 221b and MAC key MAC2 221*c*, or (ii) "MACed" only with the second MAC key MAC2 221*c* (such as for authentication only from device 101).

Server 111 can receive the third message 236 and take steps to process the data. At step 232' server 111 can use the metadata/parameters 212*b* from a message 236 as well as the keys S2 221*b* and MAC2 221*c* from a step 221 in FIG. 5*a* below in order to decrypt the fourth symmetric ciphertext symm-C4 102*s*-4. A step 232' is depicted and described in connection with FIG. 6 below. Server 111 could use symmetric decryption 236*a*. The output of a step 232' by server 111 can be a plaintext value of the third asymmetric ciphertext C3 102*c*-3 for use with a KEM DECAPS 103*j*. For some embodiments, the use of a symmetric ciphering key S2 221*b* could be omitted and the step 232 could use the MAC key MAC2 221*b* in order to verify a MAC code in message 236 for the third asymmetric ciphertext C3 102*c*-3.

At step 237, server 111 can use (i) the KEM parameters 101*f*-*z* sent in message 224 along with (ii) cryptographic algorithms 103*s* to conduct the KEM DECAPS 103*j* function with the received third asymmetric ciphertext C3 102*c*-3. The server 111 can use the server ephemeral private key of eSK.server 103*i* with the KEM DECAPS 103*j* and the received third asymmetric ciphertext C3 102*c*-3 in order to generate the third shared secret key K3 102*k*-3. A step 237 for server 111 is also depicted and described in connection with FIG. 7 below. Note that for some PQC algorithms, the KEM DECAPS 103*j* function could fail for a small frequency of messages 236, such as less than one failure per million or billion KEM messages or ciphertext C3, and if a step 237 fails, then server 111 could send device 101 an error message and request device 101 generates a different message 236.

A server 111 could then conduct a step 231 using at least the third shared secret key K3 102*k*-3 output from a step 237. The step 231 for a server 111 can be identical to a step 231 for device 101 in order for server 111 to mutually derive a third symmetric ciphering key S3 231*b* and MAC key MAC3 231*c*. Note that in exemplary embodiments the step 231 also includes input of shared keys K1 102*k*-1, K2 102*k*-2, and K3 102*k*-3, plus additional data shared between device 101 and server 111 with a HKDF 231*a* in order to generated the third symmetric ciphering key S3 231*b* and MAC key MAC3 231*c*. At the conclusion of a step 231 by server 111, server 111 can store the third symmetric ciphering key S3 231*b* and third MAC key MAC3 231*c*, which are mutually and secretly shared between server 111 and device 101.

At step 238, server 111 can use symmetric decryption 238*a* with the received fifth ciphertext C5 102*s*-5 from a message 236 in order to read the plaintext 234*a*. A step 238 is also depicted and described in connection with FIG. 7 below. The symmetric decryption 238*a* can be included within cryptographic algorithms 103*s* for server 111. The symmetric decryption 238*a* can include input of at least (i) the parameters specified in metadata 212*b* sent above by device 101 in a message 236, and (ii) the third symmetric ciphering key S3 231*b* and MAC key MAC3 231*c* from a step 231 in the paragraph above by server 111. The output of symmetric decryption 238*a* can be the plaintext data 234*a* which was processed by a device in a step 233 above. The plaintext data 234*a* can include device application data 233*a* which was described above for a step 233 for device 101. The device application data 233*a* could include could comprise data formatted according to any one of the following protocols: SIP, IPSec, HTTP, JSON, XML, SSH, MQTT, etc. Note that plaintext data 234*a* can also include the device token token1.device 206*a* from a message 213 above and also the server token token2.server 219*e*. In a step 238, server 111 could verify that the received and decrypted values for device token token1.device 206*a* and also the server token token2.server 219*e* match or are equal to the values for (i) device token token1.device 206*a* received in a message 213 and (ii) server token token2.server 219*e* transmitted in a message 224.

At step 239, server 111 can then process the plaintext device application data 233*a*, such as storing the application data in RAM 111*m* or storage memory 111*b*, and prepare server application data below in response to the received device application data 233*a* from message 236. A step 239 could comprise server 111 conducting steps according to the protocol of device application data 233*a* in order to process the device application data 233*a*, such as generating a HTTP response, parsing the JSON or XML data, generating an SSH server response, etc., and other possibilities exist as well for server 111 to conduct a step 239 to process device application data 233*a* without departing from the scope of the present disclosure. Although not depicted in FIG. 2, server 111 could then generate a response message to the device application data 233*a* and send a response message in order to continue the secure communications between device 101 and server 111 depicted in FIG. 2. In exemplary embodiments, subsequent messages between device 101 and server 111 after a message 236 can be processed using at least the shared secret keys K1 102*k*-1, K2 102*k*-2, and K3 102*k*-3.

FIG. 3

FIG. 3 is a flow chart illustrating exemplary steps for a device conducting (i) a digital signature generation, (ii) a key encapsulation mechanism to mutually derive a symmetric ciphering key, and (iii) symmetric ciphering using the derived symmetric ciphering key, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

FIG. 3 in the left column depicts exemplary steps for a device to generate a device digital signature 207c. The device digital signature 207c could also comprise a "Certificate Verify" value such as with transport layer security (TLS). As discussed with a step 207 in FIG. 2 above and also with a first message 213 from device 101 to server 111, the device digital signature 207c can be included in the first message 213 in order for a server 111 to verify the digital signature and authenticate device 101. The digital signature algorithms used for the digital signature generation can be specified as parameters within the device certificate cert.device 101c.

Signature generation step 207 can comprise a step using the sub-steps of (i) obtaining the data for signature 206e from a step 206 above in FIG. 2, (ii) calculating a secure hash value 301-x with a specified secure hash algorithm, (iii) using the private key SK-Signature.Device 101d corresponding to the static device public key PK-Signature.Device 103c-p in the device certificate 101c, (iv) using a digital signature algorithm 101s' (which could be a subset of cryptographic algorithms 101s), (v) inputting digital signature parameters 301-s, and (vi) calculating a resulting device digital signature 207c. Signature creation step 207 could comprise a digital signature algorithm 101s' supporting post-quantum cryptography, such as the exemplary digital signature algorithms listed and described for Round 3 of "Post-Quantum Cryptography Standardization" from Wikipedia dated Aug. 31, 2020, which is herein incorporated by reference. Example digital signature algorithms for a signature creation step 207 include (i) CRYSTALS-DILITHIUM, and FALCON using Lattice-based algorithms, (ii) SPHINCS+ using hash-based algorithms, and (iii) GeMSS using multivariate based algorithms, and (iv) Picnic using zero knowledge proofs.

Other possibilities exist as well for digital signature algorithms supporting post-quantum cryptography (PQC) for a signature algorithm 101s' in a signature creation step 207 without departing from the scope of the present disclosure. In addition, although a step 207 in FIG. 3 (and equivalently for a step 217 in FIG. 4 below) depicts the digital signature algorithm 101s' as supporting a PQC algorithm, for some embodiments the digital signature algorithm 101s' could support a classical digital signature algorithm such as RSA, DSA (using Diffie-Hellman algorithms), or ECDSA.

The data for signature 206e values or strings, which can be the same as a message to sign, can be transmitted to the verifying party, such as from device 101 to server 111 shown for message 213 in FIG. 2 above. Device 101 selecting data for a message to sign was also depicted and described above in a step 206 in connection with FIG. 2 above. In exemplary embodiments and as depicted in FIG. 3, the message to sign values can include the device ephemeral public key ePK.device 101h derived in a step 205, the selected device KEM parameters of Params-ePK.device 101f-x which could be selected in a step 204, the set of device KEM parameters supported by device 101 with server 111 of Device.PQC-KEM.Parameters 101f, the device certificate of Cert.Device 101c, a device identity of ID.Device 101c-i (which could be included in the device certificate), the device token Token1.device 206a which could comprise a random number or unique value for a secure session between device 101 and server 111, first device data of Data1.Device 206c from a step 206, the network identity of Network ID 103a for server 111 and network 103, a timestamp value of Timestamp.device 206d in order to confirm the data for signature 206e is current for server 111, and also optionally either the first shared secret key K1 102k-1 from a step 210 or the first asymmetric ciphertext C1 102c-1.

Including the first shared secret key K1 102k-1 from a step 209 or the first asymmetric ciphertext C1 102c-1 in a data for signature 206e can ensure that the device 101 generated the first asymmetric ciphertext C1 102c-1 with the server static public key PK.server 103d. In other words, the inclusion of the first shared secret key K1 102k-1 from a step 209 or the first asymmetric ciphertext C1 102c-1 in a data for signature 206e can ensure for the server that the device generated the first asymmetric ciphertext C1 102c-1 and not another device or router or MITM attacker that could have access to the server static public key PK.server 103d.

The data for signature 206a can preferably include the transmitted device ephemeral public key ePK.device 101h in order for server 111 to later confirm in a signature verification step 217 both (i) the device ephemeral public key ePK.device 101h is properly generated and used by device 101 and (ii) that a "man in the middle" (MITM) or another intermediate computer or router between device 101 and server 111 in IP network 107 has not substituted a different device ephemeral public key ePK.device 101h. The data for signature 206a could include a secure hash value 301 for the device ephemeral public key ePK.device 101h instead of the full device ephemeral public key ePK.device 101h. The benefits of including the device ephemeral public key ePK.device 101h (or equivalently a secure hash value 301) are also depicted and described below in connection with FIG. 8.

The optional secure hash value 301 could be generated by a secure hash algorithm from cryptographic algorithms 101s and could be example secure hash algorithms of RIPEMD 160, SHA256, a secure hash algorithm from the SHA3 family of algorithms and other possibilities exist as well. Or, since the data for signature 206a is input into a secure hash 301-x, the full device ephemeral public key ePK.device 101h could be included in the data for signature 206a by device 101, and a server 111 could correspondingly include the full device ephemeral public key ePK.device 101h in the "message to verify" 216a below in FIG. 4, since server 111 can store the device ephemeral public key ePK.device 101h in memory 111m of server 111.

In addition, the optional inclusion of (i) the first shared secret key K1 102k-1 from a step 209 and/or the first asymmetric ciphertext C1 102c-1 can further support device 101 and server 111 confirming that a "man in the middle" or another intermediate computer or router between device 101 and server 111 in IP network 107 is not attempting to conduct the KEM step 209 instead of device 101. In other words, including at least one of ePK.device 101h, the first asymmetric ciphertext C1, or the first shared secret K1 in the data for signature 206a can secure a system 100 and system 200 against a "man in the middle" attack when using ephemeral keys for KEM. Although not depicted in FIG. 3, for some embodiments the data for signature 206e can also include the server static public key of PK.server 103d in order to further increase security and resistance to a "man in the middle" attack.

For some embodiments, any individual value or field for the data depicted as "optional" for the data for signature 206e could be omitted from the data for signature 206e. Additional data mutually shared between device 101 and server 111 could also be included in a data for signature 206e, such as any of the data included in a message 213, where the additional data is depicted in FIG. 3 as " . . . ". As one example of additional data, the message 213 could include a second random number from device 101 (different than token1 206a) and the data for signature 206e could include the second random number from device 101 in the message 213. As another example of additional data, the message 213 could include a third random number received from server 111 or network 103 before device sends message 213, and the data for signature 206e could include the third random number from server 111 in the message 213.

The message to sign values or data for signature 206e can be input into a message digest algorithm or secure hash algorithm 301-x, which could comprise a standard algorithm such as SHA-256, SHA-3, or similar algorithms. The selection and use of the secure hash algorithm 301-x could be specified in parameters within the device certificate cert.device 101c. The output of message digest algorithm 301-x can be input along with signature algorithm parameters 301-s and the private key SK-Signature.Device 101d for the device public key PK-Signature.Device 103c-p in cert.device 101c into the signature algorithm 101s'. Parameters 301-s can specify encoding rules, padding, key lengths, selected algorithms, and other values or fields necessary to utilize the signature algorithm 101s'. Both a signature creation step 207 and a signature verification step 217 in FIG. 4 below can use the same or equivalent values for parameters input into the signature algorithm 101s'. The output of signature creation step 207 can comprise digital signature 207c, which can also comprise a "Certificate Verify" value in message 213.

FIG. 3 in the right column depicts exemplary steps for a device 101 to conduct steps 208 through 212 in order (i) to conduct a first key exchange mechanism (KEM) with server 111 in order to mutually derive a first shared secret K1 102k-1 and (ii) generate a first symmetric ciphertext of symm-C1 102s-1 from device 101 for server 111 using the first shared secret key K1 102k-1. The steps 208 through 212 were also depicted and described above in connection with FIG. 2. At step 208, device 111 can generate a first random number M1 208a for input into the first KEM ENCAPS 101k function. Random number M1 208a can comprise a message or a number that's used with KEM ENCAPS 101k in order to generate the first shared secret key K1 102k-1. For some embodiments, the value M1 208a could include additional data that is not random and a portion of M1 208a could be a random number. Note the value M1 208a is not transmitted as plaintext to server 111.

The first shared secret key K1 102k-1 can comprise a shared secret key for both the device 101 and server 111 to conduct a first hash-based key derivation function or I-MAC-based Extract-and-Expand Key Derivation Function (HKDF) 210a in order to derive a first symmetric ciphering key S1 210b and a first MAC key MAC1 210c. Note the first symmetric ciphering key S1 210b could comprise two values, where a first value is used by device 101 for encryption (and decryption by server 111) and a second value is used by server 111 for encryption (and decryption by device 101). Likewise, a first MAC key MAC1 210c could comprise two values, where a first value is used by device 101 for message authentication for messages sent by device 101 and a second value is used by server 111 for message authentication for messages sent by server 111.

Value M1 208a can be input into the first KEM ENCAPS 101k function or step. The following example within FIG. 3 will follow the steps for the Kyber algorithm within the PQ-Crystals project and proposal submitted to MST, but other and different cryptographic algorithms could be utilized as well. In an exemplary embodiment, the PQC KEM ENCAPS 101k function could follow the KEM steps specified by the Kyber algorithm. In the paper "CRYSTALS—Kyber: a CCA-secure module-lattice-based KEM" (referred to herein as Kyber paper), the message "m" can be the value M1 208a which is 256 bits in length for this embodiment. The step 101k depicted in FIG. 3 can comprise the function/step of "Kyber.Encaps" in the Kyber paper with the server static public key PK.server 103d. The KEM parameters 103f-y associated with the server static public key PK.server 103d could be stored by device 101 in nonvolatile memory 101m before device 101 conducts the step 209. The KEM parameters 103f-y associated with the server static public key PK.server 103d can correspond to a row from Table 1 of the Kyber paper such as Kyber768. The output of KEM ENCAPS 101k and "Kyber.Encaps" can be the value "c" in the Kyber paper or the first asymmetric ciphertext C1 102c-1 in FIG. 3. The length of "c" and the first asymmetric ciphertext C1 102c-1 can be an exemplary 1152 bytes, for parameters 103f-y which specify an exemplary parameter set of Kyber768.

As depicted in FIG. 3, the output of KEM ENCAPS 101k and "Kyber.Encaps" can also be the first shared secret K in the Kyber paper or the first shared secret key K1 102k-1 in FIG. 3. Note that other PQC KEM algorithms such as, not limited to, Classic McEliece and SIKE can be used to derive a first shared secret key K1 102k-1, which could correspond to a key K. The server static public key PK.server 103d could support the other PQC KEM algorithms besides Kyber. In other words, and also as described in FIG. 1 above, the first KEM 101k/103j could be conducted by device 101 with the server static public key PK.server 103d and KEM parameters 103f-y that support any of lattice, code-based, or SIKE based algorithms without departing from the scope of the present disclosure, and support for other PQC KEM algorithms are possible as well without departing from the scope of the present disclosure.

At step 210, device 101 can use a hash-based key derivation function or HMAC-based Extract-and-Expand Key Derivation Function (HKDF) 210a with at least the first shared secret key K1 102k-1 output from KEM ENCAPS function 101k in order to generate both (i) a first symmetric ciphering key of S1 210b and a first message authentication code (MAC) key MAC1 210c. Note that in some exemplary embodiments, additional data mutually shared between device 101 and server 111 besides the first shared secret key K1 102k-1 can also be input into the HKDF 210a in a step 210 in order to generate S1 210b and MAC1 210c. As depicted in FIG. 3, the additional data input into HKDF 210a can comprise plaintext data from the message 213 (depicted as data 213'), such as, but not limited to, token1 206a, H (PK.Server 103d) 206b, server ID 111a and/or metadata 212b. Note that separate data commonly shared between device 101 and server 111, such as values specified in a protocol for a secure session could specify plaintext data input into the HKDF along with the first shared secret key K1 102k-1. The HKDF 210a could be included in cryptographic algorithms 101s for device 101, as depicted and described in connection with FIG. 1 above. Not all of the additional data depicted for a step 210 besides the first shared secret key K1 102k-1 is required for input into the HKDF 210a.

Although not depicted in FIG. 3, the additional data input into HKDF 210a with the first shared secret key K1 102k-1 could include strings or values specified in parameters 103x and 101x for a secure session between device 101 and server 111. In other words, strings, values or numbers mutually shared between device 101 and server 111 before a message 213 from device (such as values specified in standards for a secure session) could be input into the HKDF 210a with the first shared secret key K1 102k-1. In a first exemplary embodiment, the strings, values, or numbers mutually shared between device 101 and server 111 before a message 213 from device 101 could be stored in both cryptographic algorithms 101s and cryptographic algorithms 103s. In a second exemplary embodiment, the strings, values, or numbers mutually shared between device 101 and server 111 before a message 213 from device 101 could be stored in both cryptographic parameters 101x and cryptographic parameters 103x.

Other data from a message 213 can be used for input into a HKDF 210a, in addition to the first shared secret key K1 102k-1, without departing from the scope of the present disclosure, such as, but not limited to, (i) a network ID 103a or a server ID 111a that can be included in a message 213, as well as (ii) portions of metadata 212b. For other embodiments, the input of additional data from a message 213 into a HKDF 210a besides K1 102k-1 could be omitted, and S1 210b and MAC1 210c could be derived from K1 102k-a using the HKDF 210a. A HKDF 210a could also derive additional keys besides S1 210b and MAC1 210c, such as, but not limited to an initialization vector for both a server 111 and a device 101.

In addition, although a single HDKF 210a is depicted in FIG. 3, a step 210 by device 101 could use multiple different HKDF 210a in sequence to derive different keys for symmetric encryption 212a by device 101 and symmetric decryption 215a (depicted in FIG. 4 below), such as a first HKDF 210a to derive the mutually shared symmetric ciphering key S1 210b, a second HKDF 210a to derive the MAC key MAC1 210c, and a third HKDF 210a to derive an initialization vector. Further, although a single HDKF 210a is depicted in FIG. 3, a step 210 by device 101 could use multiple different HKDF 210a in sequence to derive different keys for encryption by device 101, such as a first HKDF 210a to derive the a shared symmetric ciphering key S1 210b for device 101, a second HKDF 210a to derive a MAC key MAC1 210c for device 101, and a third HKDF 210a to derive an initialization vector for device 101.

At step 211, device 101 can select and process a plaintext 211a for encryption into a first symmetric ciphertext symm-C1 102s-1. A step 211 is also depicted and described in connection with FIG. 2 above. Note that the first asymmetric ciphertext C1 102c-1 could be previously output from the KEM ENCAPS function 101k (where server uses the first asymmetric ciphertext C1 102c-1 for the first KEM 101k/103j). In exemplary embodiments the data or values for the plaintext 211a selected in a step 211 can include at least the device ephemeral public key ePK.Device 101h, the associated parameters for the ephemeral public key of Params-ePK.device 101f-x, the supported KEM parameters for device 101 of Device.PQC-KEM.Parameters 101f, the device certificate of Cert.Device 101c, the device identity of ID.Device 101c-i (which could also be in the device certificate), first device data of Data1.Device 206c from a step 206, the device digital signature of Signature.Device 207c, the Network ID 103a, and a timestamp from device 101 of Timestamp.device 206d. Additional data could be included in plaintext 211a or some data listed above could be omitted from plaintext 211a without departing from the scope of the present disclosure.

At step 212, device 101 can use symmetric encryption 212a with the plaintext 211a from a step 211 in order to generate the first symmetric ciphertext symm-C1 102s-1. A step 212 is also depicted and described in connection with FIG. 2 above. The symmetric encryption 212a can be included within cryptographic algorithms 101s for device 101. The symmetric encryption 212a can include input of the parameters specified in metadata 212a and the symmetric ciphering key S1 210b and MAC key MAC1 210c from a step 210 above. In a step 212, device 101 can also use an initialization vector for the symmetric encryption 212a, where the initialization vector can be included with metadata 212a. Note that a HKDF 210a could also derive the initialization vector for use by device 101 with symmetric encryption 212a, and the resulting initialization vector could either be (i) included with plaintext metadata 212a, or (ii) omitted from plaintext metadata 212a and server 111 could mutually derive the same initialization vector using the HDKF in a step 214 below. The resulting first symmetric ciphertext symm-C1 102s-1 could be included in the first message 213 sent or transmitted from device 101 to server 111 as depicted in FIG. 2 above.

FIG. 4

Figure 4:
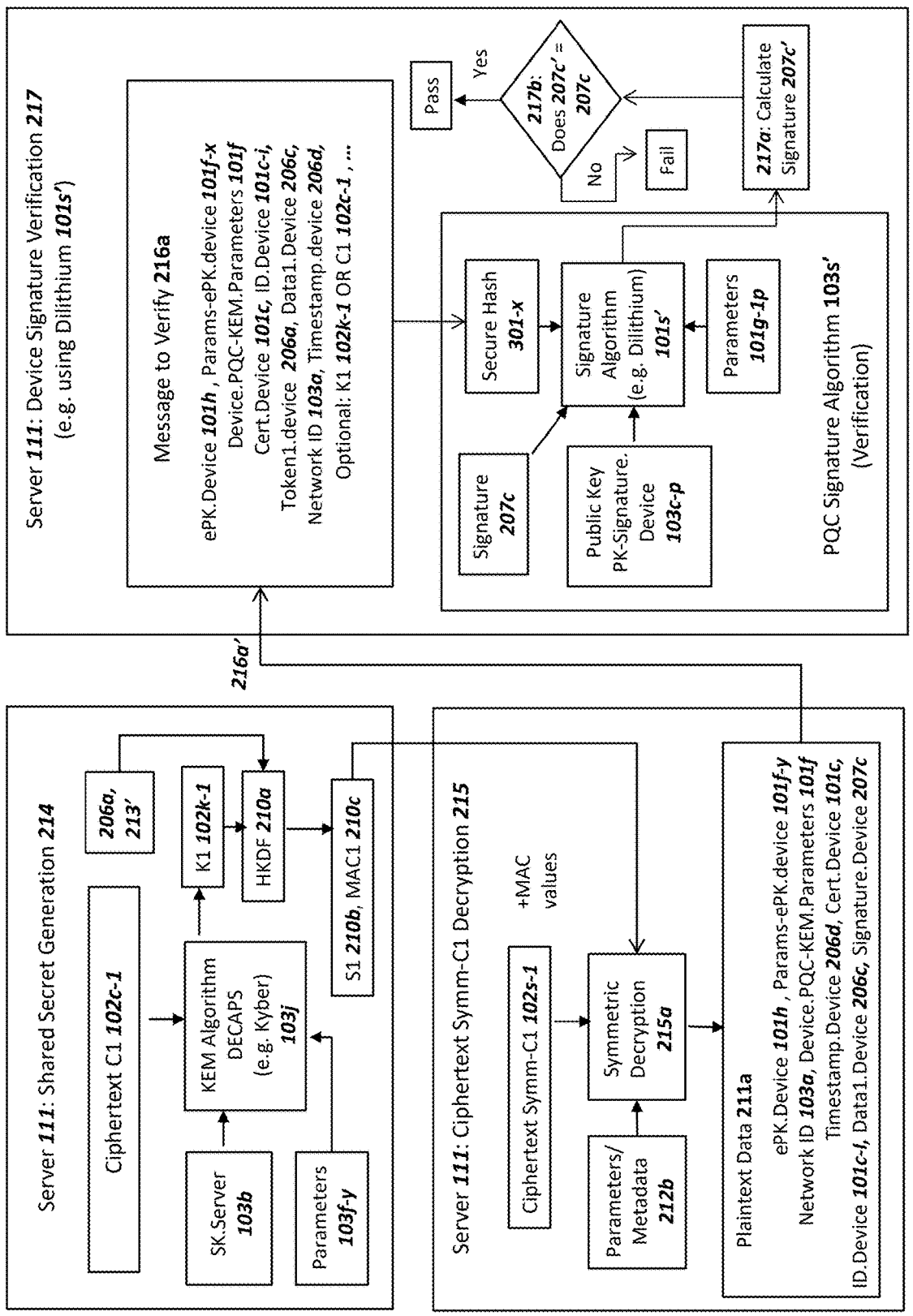
FIG. 4 is a flow chart illustrating exemplary steps for a server conducting (i) a digital signature verification, (ii) a key encapsulation mechanism to mutually derive a symmetric ciphering key, and (iii) symmetric ciphering using the derived symmetric ciphering key, in accordance with exemplary embodiments.

FIG. 4 is a flow chart illustrating exemplary steps for a server conducting (i) a digital signature verification, (ii) a key encapsulation mechanism to mutually derive a symmetric ciphering key, and (iii) symmetric ciphering using the derived symmetric ciphering key, in accordance with exemplary embodiments. FIG. 4 in the left column depicts exemplary steps for a server 111 to conduct steps 214 and 215 in order (i) to conduct the first key exchange mechanism (KEM) with device 101 in order to mutually derive the first shared secret K1 102k-1 and (ii) process the first symmetric ciphertext symm-C1 102s-1 using the first shared secret key in order to read the plaintext 211a. The steps 214 and 215 were also depicted and described above in connection with FIG. 2.

A step 214 can comprise a KEM decapsulation step by server 111 in order to mutually derive the first shared secret K1 102k-1. The following example within FIG. 4 will follow the steps for the Kyber algorithm within the PQ-Crystals project and proposal submitted to MST, but other and different cryptographic algorithms could be utilized as well. In an exemplary embodiment, the PQC KEM DECAPS 103j function could follow the KEM steps specified by the Kyber algorithm. In the paper "CRYSTALS—Kyber: a CCA-secure module-lattice-based KEM" (referred to herein as Kyber paper), the ciphertext can be received first asymmetric ciphertext C1 102c-1 from a message 213.

The KEM DECAPS 103j function depicted in FIG. 4 can comprise the function/step of "Kyber.Decaps" in the Kyber paper with the private key SK.server 103b and the first asymmetric ciphertext C1 102c-1. The private key SK.server 103b can be stored by server 111 and correspond to the server static public key of PK.server 103d. Note that server 111 could select the private key SK.server 103b based on identity information in message 213 such as the secure hash value H (PK.Server 103d) 206b. The KEM parameters 103f-y could be both (i) stored by server 111 with SK.server 103b and (ii) correspond to a row from Table 1 of the Kyber paper, such as Kyber768. The length of "c" and the first asymmetric ciphertext C1 102c-1 can be an exemplary 1152 bytes, for KEM parameters 103f-y which specify an exemplary parameter set of Kyber768. The output of KEM DECAPS 103j and "Kyber.Decaps" can be the first shared secret key K1 102k-1, which is also described as a key K in the Kyber paper. Note that other PQC KEM algorithms such as, but not limited to, Classic McEliece and SIKE can be used to derive the first shared secret key K1 102k-1, which could correspond to a key K. In other words, and also as described in FIG. 1 above, the first KEM 101k/103j could be conducted by server 111 with a server static private key SK.server 103b and KEM parameters 103f-y that support any of lattice, multivariate, or SIKE based algorithms without departing from the scope of the present disclosure.

At step 214, server 111 can use the hash-based key derivation function or HMAC-based Extract-and-Expand Key Derivation Function (HKDF) 210a with at least the first shared secret key K1 102k-1 output from KEM DECAPS function 103j in order to mutually derive both (i) the first symmetric ciphering key of S1 210b and the first message authentication code (MAC) key MAC1 210c. The server 111 can derive the first symmetric ciphering key S1 210b and MAC key MAC1 210c in a step 210 as depicted and described in connection with FIG. 3 above and also in FIG. 2. In other words, the value of S1 210b calculated by both device 101 and server 111 can be equal, and also the value of MAC1 210c calculated by both device 101 and server 111 can be equal as well.

Note that in some exemplary embodiments, additional data mutually shared between device 101 and server 111 besides the first shared secret key K1 102k-1 can also be input into the HKDF 210a in a step 214 in order to generate S1 210b and MAC1 210c. As depicted in FIG. 4, the additional data input into HKDF 210a can comprise data from the message 213 (depicted as data 213'), such as, but not limited to, token1 206a, H (PK.Server 103d) 206b, server ID 111a and/or metadata 212b from message 213. Note that separate data commonly shared between device 101 and server 111, such as values specified in a protocol for a secure session could specify plaintext data input into the HKDF along with the first shared secret key K1 102k-1. The HKDF 210a could be included in cryptographic algorithms 101s for device 101, as depicted and described in connection with FIG. 1 above.

Although not depicted in FIG. 4, the additional data input into HKDF 210a with the first shared secret key K1 102k-1 could include strings or values specified in parameters 103x and 101x for a secure session between device 101 and server 111. In other words, strings, values or numbers mutually shared between device 101 and server 111 before a message 213 from device (such as values specified in standards for a secure session) could be input into the HKDF 210a in a step 214 by server 111 with the first shared secret key K1 102k-1.

Other data from a message 213 can be used for input into a HKDF 210a, in addition to the first shared secret key K1 102k-1, without departing from the scope of the present disclosure, such as, but not limited to, (i) a network ID 103a or a server ID 111a that can be included in a message 213, as well as (ii) portions of metadata 212b. For other embodiments, the input of additional data from a message 213 into a HKDF 210a in a step 214 besides K1 102k-1 could be omitted, and S1 210b and MAC1 210c could be derived from K1 102k-a using the HKDF 210a. In summary, both device 101 and server 111 can select identical information or bytes, as well as identical sequence of bytes for the additional information from message 213 and/or token1.device 206a and/or metadata 212b for input into HKDF 210a in order for both device 101 and server 111 to mutually derive the same values for S1 210b and MAC1 210c. A HKDF 210a in a step 214 for server 111 and step 210 for device 101 could also derive additional keys besides S1 210b and MAC1 210c, such as, but not limited to an initialization vector for both a server 111 and a device 101. As discussed above with a step 210, the key S1 210b could comprise a first key S1 210b-1 for encryption by a device 101 (and decryption by a server 111), and a second key S1 210b-2 for encryption by a server 111 (and decryption by a device 101).

At step 215, server 111 can use symmetric decryption 215a with the first symmetric ciphertext symm-C1 102s-1 received in message 213 in FIG. 2 above in order to read the plaintext 211a. A step 215 is also depicted and described in connection with FIG. 2 above. The symmetric decryption 215a can be included within cryptographic algorithms 103s for server 111. The symmetric decryption 215a can include input of the parameters specified in metadata 212b from a message 213 and the symmetric ciphering key S1 210b and MAC key MAC1 210c from a step 214 above.

In a step 215, server 111 can also use an initialization vector for the symmetric decryption 215a, where the initialization vector can be included with metadata 212b. Note that a HKDF 210a could also derive the initialization vector for use by server 111 with symmetric decryption 215a, and the resulting initialization vector could either be (i) included with plaintext metadata 212b, or (ii) omitted from plaintext metadata 212b and server 111 could mutually derive the same initialization vector using the HDKF 210a from a step 214 above. The resulting plaintext 211a from a step 215 can be stored by server 111 in memory 111m and also be used with a digital signature verification step 217 by server 111 as described below. The plaintext data 211a from a step 215 can be the same as plaintext 211a processed by a device 101 as described for a step 211 above in FIG. 3 and also FIG. 2.

FIG. 4 in the right column depicts exemplary steps for a server 111 to verify a device digital signature 207c. Server 111 can use a step 217 as depicted and described in connection with FIG. 2 above in order to verify the digital signature for "Certificate Verify" 207c. As discussed with a step 207 in FIG. 2 above and also with a first message 213, the device digital signature 207c can be included in the first message 213 in order for a server to verify the digital signature and authenticate device 101. In exemplary embodiments, the digital signature comprising the "Certificate Verify" 207c can also be used to determine if a "man in the middle" is attempting to communicate data with server 111 instead of device 101. The digital signature algorithms 101s' used for the digital signature verification can be specified as parameters within the device certificate cert.device 101c.

Signature verification step 217 can comprise a step using the sub-steps of (i) obtaining the message to verify 216a from a step 216 above in FIG. 2 using plaintext 211a output from a step 215, (ii) calculating a secure hash value 301-x with a specified secure hash algorithm, (iii) using the device public key PK-Signature.Device 103c-p in the device certificate 101c, (iv) using a digital signature algorithm 101s' (which could be a subset of cryptographic algorithms 103s), (v) inputting parameters 301-s, (vi) inputting at least a portion of the received digital signature 207c, and (vi) calculating a resulting digital signature 207c'. Signature verification step 207 could comprise a digital signature algorithm 101s' specified in the device certificate cert.device 103c and also comprise the same digital signature algorithm 101s' used by device 101 to generate the digital signature 207c for the message 213. Note that the message to verify 216a can be the same as the message to sign 206a used by device 101, in exemplary embodiments for successful authentication of device 101 by server 111.

The message to verify values 216a can be input into a message digest algorithm or secure hash algorithm 301-x, which could comprise a standard algorithm such as SHA-256, SHA-3, or similar algorithms. The output of message digest algorithm 301-x can be input along with parameters 301-s and the device public key PK-Signature.Device 103c-p into signature algorithm 101s'. Parameters 301-s can specify encoding rules, padding, key lengths, selected algorithms, and other values or fields necessary to utilize a signature algorithm 101s'. Both a signature creation step 207 above and a signature verification step 217 in FIG. 4 can use the same or equivalent values for parameters 301-s.

Note that the use of a step 217 for signature verification (e.g. the signature verification portion of a digital signature algorithm 101s) in a step 217 can be different from conventional technology in several ways. First, the resulting calculated digital signature 207c' from a step 217 can be over at least one of the first shared secret key K1 102k-1 and/or the first asymmetric ciphertext C1 102c-1. In this manner, server 111 can verify that the first shared secret key K1 102k-1 and/or the first asymmetric ciphertext C1 102c-1 was generated by the device 101 and not a "man in the middle" that could have access to the server static public key PK.server 103d and generate a fraudulent first asymmetric ciphertext C1 102c-1 (but could not generate a valid device digital signature over at least the fraudulent first asymmetric ciphertext C1 102c-1).

In some exemplary embodiments, the data to sign 206e for device 101 and the message to verify 216a for server 111 could optionally include the first asymmetric ciphertext C1 102c-1, which represents the use of both PK.server 103d and K1 102k-1, and thus verification by server 111 of the signature 207c over the first asymmetric ciphertext C1 102c-1 can be sufficient for server 111 to trust that device 101 is operating with the server static public key PK.server 103d and a MITM is not trying to substitute use of the server static public key PK.server 103d.

For a step 217, at least portions of the received digital signature 207c and the calculated digital signature 207c' from a step 217 can be compared. If at least portions of the received digital signature 207c and the calculated digital signature 207c' from a step 217 are equal, then the received digital signature 207c can be considered verified. Server 111 can trust that device 101 stores and uses a private key corresponding to the public key in the device certificate 101c. If the received digital signature 207c and the calculated digital signature 207c' from a step 217 are not equal, then the signature verification fails and server 111 can transmit an error message to device 101. After verification of the received digital signature 207c, then server 111 could continue with subsequent steps after step 217, such as steps 218 through 223' as depicted and described in connection with FIG. 2 above.

FIG. 5a

Figure 5A:
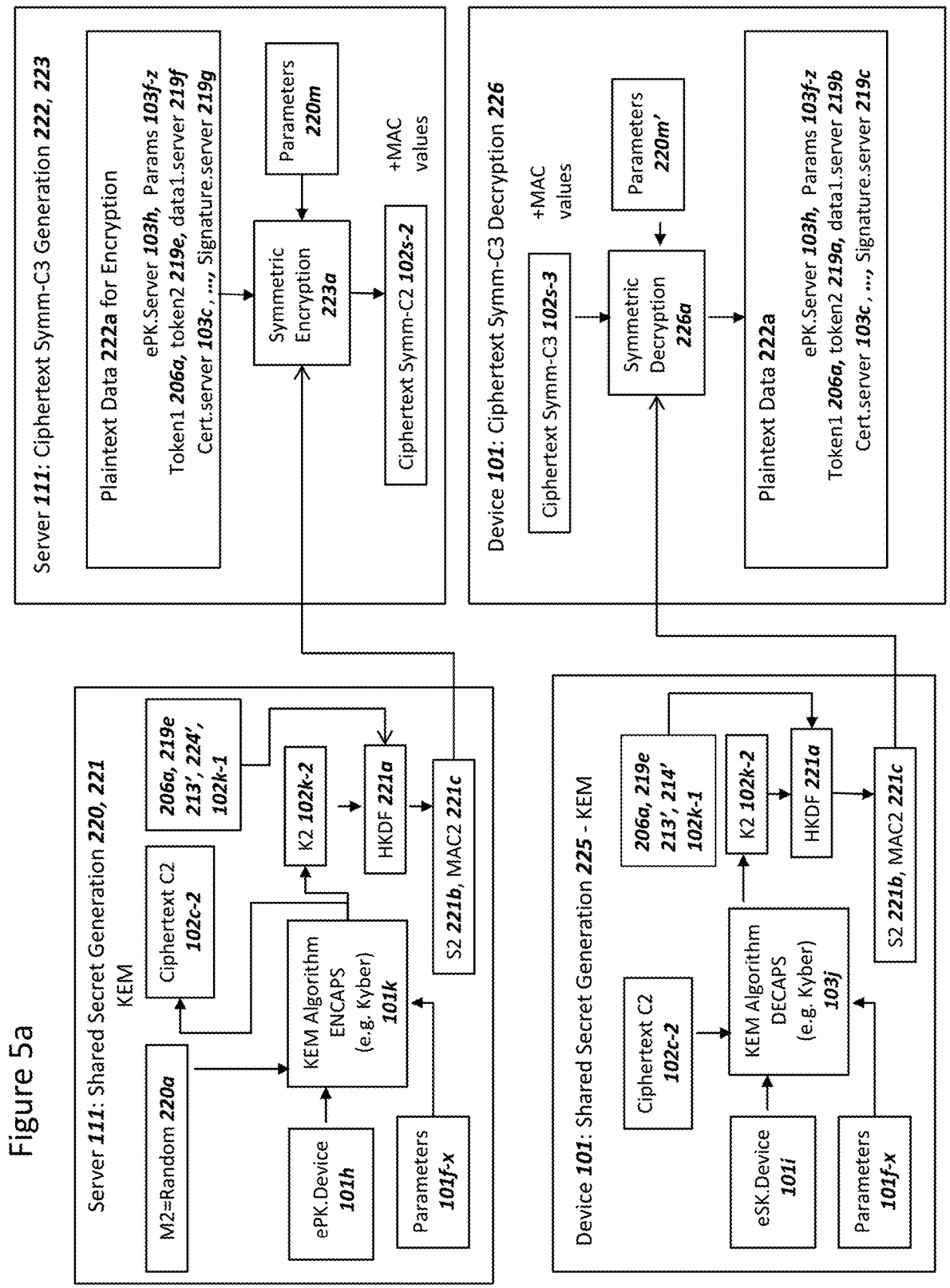
FIG. 5a is a flow chart illustrating exemplary steps for a device and a server conducting (i) a key encapsulation mechanism to mutually derive a symmetric ciphering key, and (ii) symmetric ciphering using the derived symmetric ciphering key, in accordance with exemplary embodiments.

FIG. 5a is a flow chart illustrating exemplary steps for a device and a server conducting (i) a key encapsulation mechanism to mutually derive a symmetric ciphering key, and (ii) symmetric ciphering using the derived symmetric ciphering key, in accordance with exemplary embodiments. As depicted in FIG. 5a, a server 111 can conduct a second KEM 103k/101j in a step 220 using both (i) the device ephemeral public key ePK.device 101h received in the first symmetric ciphertext symm-C1 102s-1 (or as plaintext in a message 213), and (ii) the KEM parameters Params-ePK.device 101f-x from device 101 in the first message 213. The output of the second KEM 103k/101j can include a second shared secret key of K2 102k-2 and a second asymmetric ciphertext C2 102c-2. Server 111 can then in steps 222 and 223 generate a third symmetric ciphertext symm-C3 102s-3 using at least the second shared secret key of K2 102k-2. Note that the second symmetric ciphertext symm-C2 102s-2 is depicted and described in connection with FIG. 5b below, and FIG. 5a depicts the processing of the third symmetric ciphertext symm-C3 102s-3.

As depicted in FIG. 5a, device 101 can conduct the second KEM 103k/101j in a step 225 using (i) the device ephemeral private key eSK.device 101i, (ii) the second ciphertext C2 102c-2 received from a message 224, and (ii) the KEM parameters 101f-x transmitted by device 101 in the first message 213. The output of the second KEM 103k/101j from a step 225 by device 101 can include a second shared secret key of K2 102k-2. Device 101 can then in step 226 decrypt the third symmetric ciphertext symm-C3 102s-3 using at least the second shared secret key of K2 102k-2.

At step 220 in FIG. 5a, server 111 can use the derived or generated a random number M2 220a from a step 220 depicted and described in connection with FIG. 2 above. The random number M2 220a can be for use in a second KEM 103k/101j between server 111 and device 101. Random number M2 220a could include some data or bits that are not random, such as deterministically calculated, but in exemplary embodiments at least some data or bits within both M1 208a and M2 220a are at least pseudo-random numbers or values.

At step 220, server 111 can use both (i) the received device ephemeral public key of ePK.device 101h from message 213 and (ii) the specified subset of parameters 101f-x for the device ephemeral public key and the second KEM 103k/101j in order to generate both (x) a second asymmetric ciphertext C2 102c-2 and (y) a second shared secret key K2 102k-2. At step 220, server 111 can use a KEM ENCAPS function 103k with both (i) and (ii) from the previous sentence in order to generate both (x) the second asymmetric ciphertext C2 102c-2 and (y) the second shared secret key K2 102k-2. A summary of the step 220 by server 111 with a KEM ENCAPS function 103k was also depicted and described in connection with FIG. 1 and FIG. 2 above. A server 111 can use both cryptographic algorithms 101s and cryptographic parameters 101x in order to conduct the step 220.

Note that the operation of a step 220 and KEM ENCAPS function 103k by server 111 can be equivalent to the step 209 and KEM ENCAPS function 101k by device 101, except that (i) server 111 operates with the device ephemeral public key ePK.device 101h and (ii) the KEM parameters 101f-x. Also note that the KEM parameters 101f-x in a step 220 can specify a different PQC KEM algorithm than the PQC KEM algorithm specified for a step 209 by device 101 and KEM parameters 103f-y. Consequently, the detailed steps for a KEM ENCAPS function 103k in a step 220 can be equivalent to the steps for a KEM ENCAPS function 101k in a step 209 (but with a different public key and different PQC KEM parameters and/or algorithm).

At step 221, server 111 can use a hash-based key derivation function or HMAC-based Extract-and-Expand Key Derivation Function (HKDF) 221a with at least the second shared secret key K2 102k-2 output from KEM ENCAPS function 103k in order to generate both (i) a second symmetric ciphering key of S2 221b and a second message authentication code (MAC) key MAC2 221c. Note that in some exemplary embodiments, additional data mutually shared between device 101 and server 111 besides the second shared secret key K2 102k-2 can also be input into the HKDF 221a in a step 221 in order to generate S2 221b and MAC2 221c. In preferred embodiments as depicted in FIG. 5a, the first shared secret key K1 102k-1 generated by server 111 in a step 214 in FIG. 4 and FIG. 2 can also be input into the HKDF 221a.

For a step 221, other data input into HKDF 221a besides shared secret keys K2 and/or K1 can include data from the message 213, such as, but not limited to, plaintext data transmitted in message 213 and 224 below. In exemplary embodiments, the additional data input into HKDF 221a can include the device token token1.device 206a, the server token token2.server 219e, data 213' from message 213 (described for a step 209 in FIG. 3), and also data 224' from a message 224 below. The plaintext data 224' could include metadata 220m. For other embodiments, the input of (i) the first shared secret key K1 102k-1 and/or (ii) plaintext data from message 213 (e.g. 213') and message 224 (e.g. 224') could be omitted from inclusion in the calculation of HKDF 221a, and the keys S2 221b and MAC2 221c could be derived from the second shared secret key K2 102k-2 from a step 220.

At step 222, server 111 can select and process a plaintext 222a for encryption into the third symmetric ciphertext symm-C3 102s-3. A step 222 is also depicted and described in connection with FIG. 2 above. In exemplary embodiments the data or values for the plaintext 222a selected in a step 222 can include at least the server ephemeral public key ePK.Server 103h, the associated KEM parameters for the public key of params 103f-z, the device token token1 206a, the server token token2 219e, server data data1.server 219f, the server certificate of Cert.server 103c, and a server digital signature signature.server 219g. Although not depicted for a step 222 in FIG. 5a, plaintext 222a could also include a secure hash value 222b over the data previously communicated between device 101 and server 111 in message 213. Additional data mutually shared between device 101 and server 111 outside of messages 213 could be included in the generation of the secure hash value 222b. For some exemplary embodiments, such as with the last sentence of the paragraph above (where the first shared secret key K1 102k-1 was omitted from input into HKDF 221a), then the secure hash value 222b can also be over the first shared secret key K1 102k-1.

At step 223, server 111 can use symmetric encryption 223a with the plaintext 222a from a step 222 in order to generate the third symmetric ciphertext symm-C3 102s-3. A step 223 is also depicted and described in connection with FIG. 2 above. The symmetric encryption 223a can be included within cryptographic algorithms 103s for server 111. The symmetric encryption 223a can include input of (i) metadata 220m (or in metadata 212b from a message 213) above and (ii) the symmetric ciphering key S2 221b and MAC key MAC2 221c from a step 221 above. In a step 223, server 111 can also use an initialization vector for the symmetric encryption 222a, where the initialization vector can be either (i) included with metadata 220m, or (ii) mutually derived with device 101 using the second KEM 103k/101j and HKDF 221a. After steps 220 through 223 in FIG. 5a, server 111 can include the second asymmetric ciphertext C2 102c-2 and the third symmetric ciphertext symm-C3 102s-3 the message 224 depicted in FIG. 2 and transmitted to device 101. Note that a message 224 could include the second asymmetric ciphertext C2 102c-2 "double encrypted" into a second symmetric ciphertext symm-C2 102s-2 using a step 223', which is depicted and described in connection with FIG. 2 and also in FIG. 5b below.

Device 101 can receive the message 224 from server 111 and conduct a series of steps in order to process the message. For embodiments where the second asymmetric ciphertext C2 102c-2 is "double encrypted" into a second symmetric ciphertext symm-C2 102s-2, then a device 101 could use a step 215' depicted and described in connection with FIG. 5b below in order to unwrap the first layer of symmetric encryption and read a plaintext value for the second asymmetric ciphertext C2 102c-2.

At step 225, device 101 can use (i) the specified KEM parameters 101f-x transmitted in message 213 along with (ii) cryptographic algorithms 101s to conduct the KEM DECAPS 101j function with the received second asymmetric ciphertext C2 102c-2. The device 101 can use the device ephemeral private key of eSK.device 101i with the KEM DECAPS 101j and the received second asymmetric ciphertext 102c-2 (possibly output from a step 215' in FIG. 5b below) in order to generate the second shared secret key K2 102k-2. A step 225 for device 101 is also depicted and described in connection with FIG. 2 above. Note that for some PQC algorithms, the KEM DECAPS 101j function could fail for a small frequency of messages 224, such as less than one failure per million or billion KEM messages, and if a step 224 fails, then device 101 could send server 111 an error message.

At step 225 as depicted in FIG. 5a, device 101 can include both (i) the HKDF 221a used by server 111 in a step 221, and (ii) the exact same input into the HKDF 221a as server 111 input into HKDF 221a in order to generate the second symmetric ciphering key S2 221b and second MAC key MAC2 221c. At least in preferred exemplary embodiments where the mutual shared derivation of S2 and MAC2 by device 101 and server 111 are the same values for both sides, then device should use the exact same input into HKDF 221a as used by server 111. Note that in exemplary embodiments, the step 225 by device 101 includes at least the input of both the first shared secret key K1 102k-1 from a step 210 and the second shared secret key K2 102k-2 into the HKDF 221a.

In a step 225, device 101 can use a hash-based key derivation function or HMAC-based Extract-and-Expand Key Derivation Function (HKDF) 221a with at least the second shared secret key K2 102k-2 output from KEM DECAPS function 101j in order to generate both (i) a second symmetric ciphering key of S2 221b and a second message authentication code (MAC) key MAC2 221c. As depicted in FIG. 5a, in preferred embodiments, the first shared secret key K1 102k-1 generated in a step 210 in FIG. 3 and FIG. 2 can also be input into the HKDF 221a.

In this manner and by including the first shared secret key K1 102k-1 as input into HKDF 221a, the symmetric ciphering key S2 and MAC key MAC2 can be mutually derived with server 111 more securely by including input from two separate shared secrets (e.g. K1 and K2, which can also be derived by separate KEM algorithms), compared to deriving the key S2 and MAC2 using only a single KEM algorithm (e.g. using either (i) K2 only or (ii) a single KEM for K1 and K2). In other words, the combination of K1 using a first KEM 101k/103j and K2 using a second KEM 103k/101j for HKDF 221a provides security equal to at least the stronger of the first KEM (for KEM ENCAPS 101k) and the second KEM (for KEM DECAPS 101k). In exemplary embodiments, the parameters 103f-y for the first KEM 101k/103j comprise a completely different type of KEM (e.g. lattice, code-based, or SIKE) than the type for the second KEM 103k/101j (e.g. lattice, code-based, or SIKE but also different than the first type of KEM for KEM 101k/103j). Examples of types of algorithms are included in the Wikipedia summary for the MST PQC project.

For other embodiments, the input of (i) the first shared secret key K1 102k-1 and/or (ii) plaintext data from message 213 or 224 could be omitted from inclusion in the calculation of HKDF 221a, and the keys S2 221b and MAC2 221c could be derived from the second shared secret key K2 102k-2 from a step 225.

At step 226, device 101 can use symmetric decryption 226a with the third symmetric ciphertext symm-C3 102c-3 received in message 224 in FIG. 2 above in order to read the plaintext 222a. A step 226 is also depicted and described in connection with FIG. 2 above. The symmetric decryption 226a can be included within cryptographic algorithms 101s for device 101. The symmetric decryption 226a can include input of the parameters specified in metadata 220m from a message 224 and the second symmetric ciphering key S2 221b and MAC key MAC2 221c from a step 225 above for device 101.

In a step 226, device 101 can also use an initialization vector for the symmetric decryption 226a, where the initialization vector can be included with metadata 220m. Note that a HKDF 221a could also derive the initialization vector for use by device 101 and server 111 with symmetric decryption 226a, and the resulting initialization vector could either be (i) included with plaintext metadata 220m, or (ii) omitted from plaintext metadata 220m and device 101 could mutually derive the same initialization vector using the HDKF 221a from a step 225 above. The resulting plaintext 222a from a step 226 can be the same as the plaintext 222a generated by a server 111 in a step 222. Device 101 could verify that the plaintext 222a from a step 226 includes the token token1.device 206a transmitted by device 101 in a message 213. Device 101 can then conduct the series of steps such as steps 227 through 235 as depicted and described in connection with FIG. 2 above.

FIG. 5b

Figure 5B:
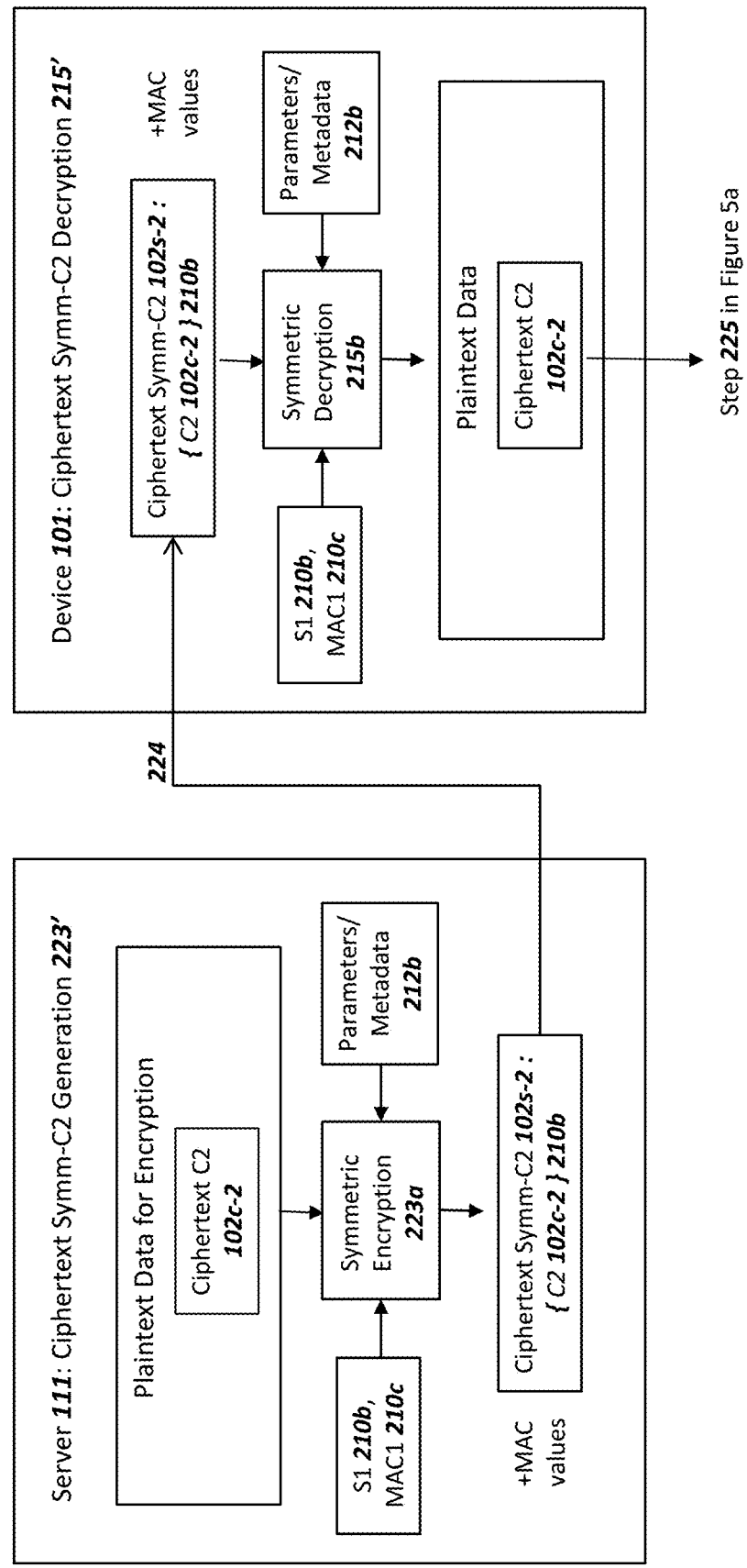
FIG. 5b is a flow chart illustrating exemplary steps for a device and a server conducting "double encryption", or symmetric ciphering of an asymmetric ciphertext from a key exchange mechanism, in accordance with exemplary embodiments.

FIG. 5b is a flow chart illustrating exemplary steps for a device and a server conducting "double encryption", or symmetric ciphering of an asymmetric ciphertext from a key exchange mechanism, in accordance with exemplary embodiments. The symmetric ciphering of the KEM ciphertext can be conducted with a mutually derived shared secret key which is derived by both the device and the server. FIG. 5b depicts an optional use of "double encryption" of the second asymmetric ciphertext C2 102c-2 into a symmetric ciphertext symm-C2 102s-2. The use of the second asymmetric ciphertext C2 102c-2 is depicted and described for a message 213 in FIG. 2 above. For some embodiments, the use of "double encryption" and the second asymmetric ciphertext C2 102c-2 could be omitted and the second asymmetric ciphertext C2 102c-2 could be transmitted from server 111 to device 101 without "double encryption." The benefit of "double encryption" for the second asymmetric ciphertext C2 102c-2 can be that it would be only feasible for the server 111 communicating with the device 101 to generate the symmetric ciphertext symm-C2 102s-2, as opposed to a "man in the middle" or intermediate router or device that attempts to substituted a fake or fraudulent second asymmetric ciphertext C2 102c-2 via a KEM with the device ephemeral public key ePK.device 101h.

At step 223', server 111 can use symmetric encryption 223a with input of the plaintext value of the second asymmetric ciphertext C2 102c-2 output from a KEM ENCAPS 103j in step 220. The plaintext value of the second asymmetric ciphertext C2 102c-2 can be the string of bits resulting from asymmetric encryption of data according to the KEM specified by KEM parameters 101f-x in step 220 and also the device ephemeral public key ePK.device 101h. The output of symmetric encryption 223a can comprise a "double encrypted" second symmetric ciphertext C2 102s-2, depicted as "Ciphertext Symm-C2 102s-2: {C2 102c-2} 210b" The brackets and designation of key S1 210b indicates that the second symmetric ciphertext C2 102s-2 can use at least the first shared secret symmetric ciphering key S1 210b and the key S1 201b is not included in the data transmitted in a message 224. The symmetric encryption 223a can be included within cryptographic algorithms 103s for server 111.

The symmetric encryption 223a can include input of (i) the parameters/metadata 212b from message 213 (or from metadata 220m from a message 224) above and (ii) the first symmetric ciphering key S1 210b and MAC key MAC1 210c from a step 214 above in FIG. 4 for server 111. In a step 223', server 111 can also use an initialization vector for the symmetric encryption 223a, where the initialization vector can be either (i) included with or generated from metadata from message 213 or message 224, or (ii) mutually derived with device 101 using the HKDF 210a in a step 214.

Note that for some exemplary embodiments, the use of "double encryption" and symmetric ciphering key S1 210b could be omitted from a step 223', but the MAC key MAC1

210c could be included in a step 223', such that MAC codes could be generated for the second asymmetric ciphertext C2 102c-2. In other words, for embodiments described in this paragraph, the second symmetric ciphertext symm-C2 102s-2 could omit symmetric ciphering but use the MAC key MAC1 210b in order generate the depicted MAC codes to authenticate that the second asymmetric ciphertext C2 102c-2 was generated by server 111 that also has mutually derived the MAC key MAC1 210c with device 101.

As depicted in FIG. 2 and also FIG. 5b, the second symmetric ciphertext C2 102s-2 can be included in message 224 from server 111 to device 101. Additional data as depicted in FIG. 2 could be included with the message 224 and device 101 can received the second symmetric ciphertext C2 102s-2. At step 215', device 101 can use symmetric decryption 215b with input of the "double encrypted" second symmetric ciphertext symm-C2 102s-2 received in a message 224. The output of symmetric decryption 215b can comprise the plaintext value of the second asymmetric ciphertext C2 102c-2 for input into KEM DECAPS 101j in step 225. The plaintext value of the second asymmetric ciphertext C2 102c-2 can be the string of bits resulting from asymmetric encryption output by server 111 in a step 220 (e.g. raw asymmetrically ciphered data without any symmetric ciphering). The symmetric decryption 215b can be included within cryptographic algorithms 101s for device 101.

The symmetric decryption 215a can include input of (i) the parameters/metadata 212b from message 213 (or from metadata 220m from a message 224) above and (ii) the symmetric ciphering key S1 210b and MAC key MAC1 210c from a step 209 above in FIG. 3 for device 101. In a step 215', device 101 can also use an initialization vector for the symmetric decryption 215b, where the initialization vector can be either (i) included with metadata in message 224, or (ii) mutually derived with server 111 using the HKDF 210a in a step 209. Note that for some exemplary embodiments, the use of "double encryption" and symmetric ciphering key S1 210b could be omitted from a step 215', but the MAC key MAC1 210b could be included, such that MAC codes could be verified for the second asymmetric ciphertext C2 102c-2. In other words, a step 215' by device 101 (along with an equivalent step 223' by server 111) could omit symmetric encryption but use and generate MAC codes for the second asymmetric ciphertext C2 102c-2 using the mutually shared MAC key MAC1 210b. In this manner, the second asymmetric ciphertext C2 102c-2 could be authenticated by device 101 even though the second asymmetric ciphertext C2 102c-2 may not be "double encrypted" for some embodiments of the present disclosure.

FIG. 6

Figure 6:
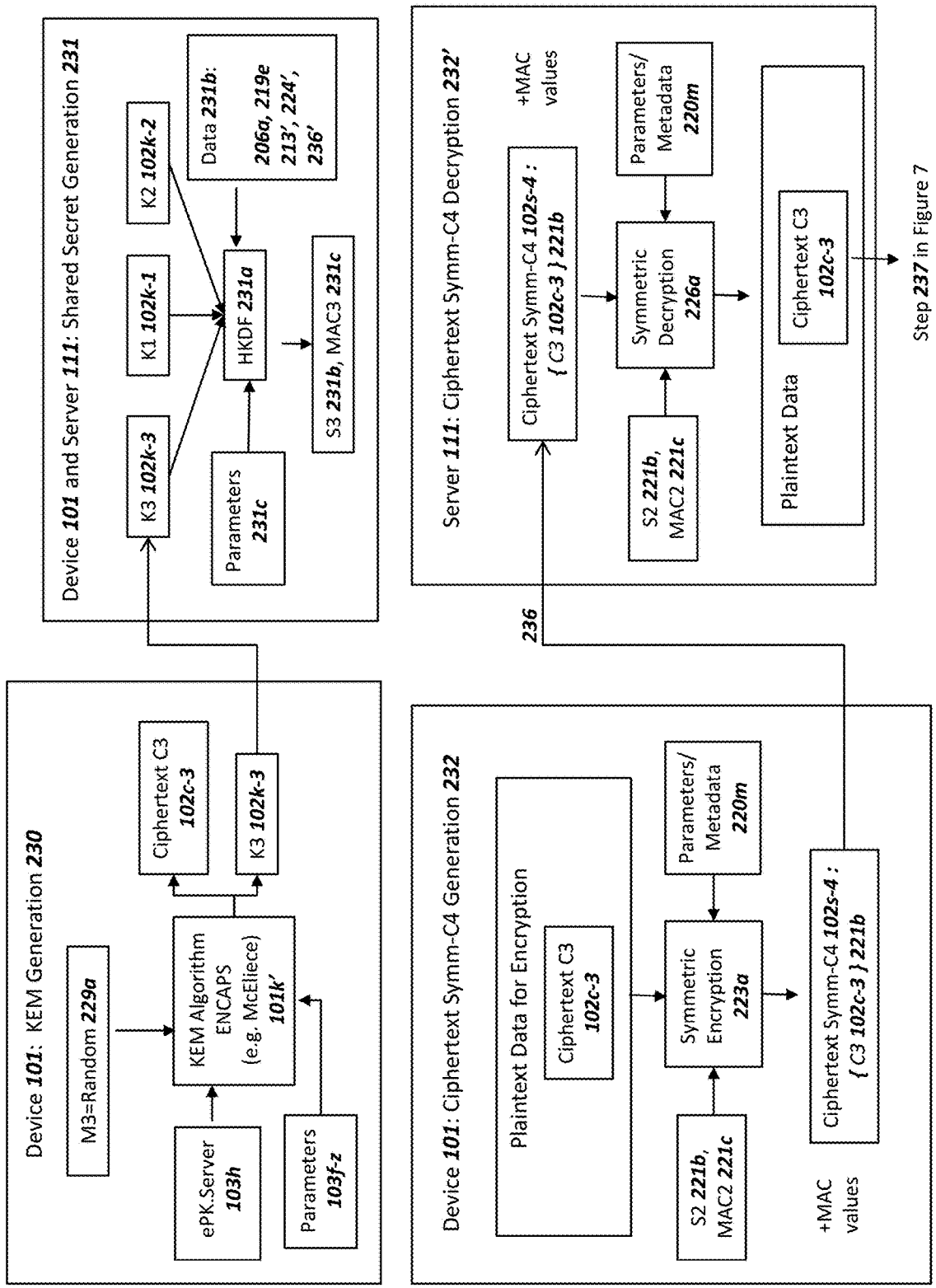
FIG. 6 is a flow chart illustrating exemplary steps for a (i) a device conducting a KEM with a server ephemeral public key to generate a shared secret, (ii) a device and server conducting a key derivation function to mutually derive a symmetric ciphering key, and (iii) symmetric ciphering using the derived symmetric ciphering key, in accordance with exemplary embodiments.

FIG. 6 is a flow chart illustrating exemplary steps for a (i) a device conducting a KEM with a server ephemeral public key to generate a shared secret, (ii) a device and server conducting a key derivation function to mutually derive a symmetric ciphering key, and (iii) symmetric ciphering using the derived symmetric ciphering key, in accordance with exemplary embodiments.

At step 230, device 101 can use a generated a random number M3 229a from a step 229 as input into a third KEM 101k'/103j' between device 101 and server 111. At step 230, device 101 can use both (i) the received server ephemeral public key of ePK.server 103h and (ii) the specified KEM parameters 103f-z for the server ephemeral public key and the third KEM 101k'/103j' in order to generate both (x) a third asymmetric ciphertext C3 102c-3 and (y) a third shared secret key K3 102k-3. At step 230, device 101 can use a KEM ENCAPS function 101k' with both (i) and (ii) from the previous sentence as well as M3 229a in order to generate both (x) a third asymmetric ciphertext C3 102c-3 and (y) a third shared secret key K3 102k-3. A summary of the step 230 by device 101 with an equivalent KEM ENCAPS function 101k was also depicted and described in connection with FIG. 1 above. A device 101 can use both cryptographic algorithms 101s and cryptographic parameters 101x along with the subset of KEM parameters 103f-z in order to conduct the step 230. The operation and use of a KEM ENCAPS function 101k is also depicted and described in FIG. 3 above for a step 209, where a step 230 can use a different KEM ENCAPS function 101k' can use a different KEM algorithm, different server public key, and also different parameters.

Device 101 and server 111 can use a step 231 with a HKDF 231a and at least the third shared secret key K3 102k-3 in order to derive a third symmetric ciphering key S3 231b and a third MAC key MAC3 231c. Step 231 was also depicted and described in connection with FIG. 2 above. Note that server 111 would generate the third shared secret key K3 102k-3 using a step 237 below before server 111 conducts the same step 231, which is also depicted in FIG. 2 above. Device 101 can use steps 234 and 235 below in FIG. 7 and also FIG. 2 with the keys output from HKDF 231a in a step 231 in order to encrypt data. Server 111 can use step 238 in FIG. 7 below and also FIG. 2 with the keys output from HKDF 231a in a step 231 in order to decrypt encrypted data.

At step 231, device 101 can use a hash-based key derivation function or HMAC-based Extract-and-Expand Key Derivation Function (HKDF) 231a with at least (i) the first shared secret key K1 102k-1 generated in a step 209 in FIG. 3 and FIG. 2, (ii) the second shared secret key K2 102k-2 output from KEM DECAPS function 101j in a step 225, (iii) the third shared secret key K3 102k-3 output from a step 230 above and KEM ENCAPS function 101k', and (iv) additional data 231b in order to generate a third symmetric ciphering key of S3 231b and a third message authentication code (MAC) key MAC3 231c. Note that in exemplary embodiments, the additional data 231b can include the device token 206a, the server token 219e, and plaintext data from messages 213, 224, and 236 below (where the plaintext portion of messages 213, 224, and 236 are depicted as 213', 224', and 236', since that data can be successfully shared between device 101 and server 111 before calculation of the keys S3 231b and MAC3 231c. Some additional data 231b could be included in (i) cryptographic algorithms 101s and 103s or (ii) cryptographic parameters 101x and 103x before a message 236 (such as values specified for a protocol of a secure session between device 101 and server 111). The additional data 231b described in the previous sentence could be included as input into HDKF 231a in a step 231.

As depicted in FIG. 6, a HKDF 231a can include input of parameters 231c. As one example, the parameters 231c could specify the use of a secure hash algorithm for use with the HKDF 231a. As another example, the parameters 231c could specify the format, sequence, structure, and fields used from the additional data 231b. Parameters 231c could be stored by device 101 and server 111 before establishing a secure session, or transmitted between the nodes in a message 213 and 224. Although not depicted for an HKDF 210a in FIG. 3 and FIG. 4 above, as well as an HKDF 221a in FIG. 5 above, both HKDF 210a and 221a can use input of parameters equivalent to parameters 231c in order to process the HKDF.

FIG. 6 also depicts the optional use of "double encryption" of the third asymmetric ciphertext C3 102*c*-3 into a fourth symmetric ciphertext symm-C4 102*s*-4 as depicted and described for a message 236 in FIG. 2 above. For some embodiments, the use of a step 232 by device 101 and also a corresponding step 232' by server 111 could be omitted and the third asymmetric ciphertext C3 102*c*-3 could be transmitted by device 101 without "double encryption".

At step 232, device 101 can use symmetric encryption 223*a* with input of the plaintext value of the third asymmetric ciphertext C3 102*c*-3 output from a KEM ENCAPS 101*j'* in step 230. The plaintext value of the third asymmetric ciphertext C3 102*c*-3 can be the string of bits resulting from asymmetric encryption of data according to the KEM specified by KEM parameters 103*f-z* in step 230. The output of symmetric encryption 223*a* can comprise a "double encrypted" fourth symmetric ciphertext symm-C4 102*s*-4. The symmetric encryption 223*a* can be included within cryptographic algorithms 101*s* for device 101.

The symmetric encryption 223*a* can include input of (i) parameters/metadata 220*m* in message 224 or metadata 212*b* in message 213 in FIG. 2 above or metadata in message 236 and (ii) the second symmetric ciphering key S2 221*b* and MAC key MAC1 221*c* from a step 225 above in FIG. 5*a* for device 101. In a step 232, device 101 can also use an initialization vector for the symmetric encryption 223*a*, where the initialization vector can be either (i) included with metadata in message 224 or 236, or (ii) mutually derived with server 111 using the HKDF 231*a* in a step 231. Note that for some exemplary embodiments, the use of "double encryption" and symmetric ciphering key S2 221*b* could be omitted from a step 232, but the MAC key MAC2 221*b* could be included, such that MAC codes could be generated for the third asymmetric ciphertext C3 102*c*-3. For this embodiment, a server 111 could use the MAC codes and the mutually derived MAC2 221*b* from a step 231 by server 111 in order to authenticate and verify that the third asymmetric ciphertext C3 102*c*-3 was transmitted by device 101.

At step 232', server 111 can use symmetric decryption 226*a* with input of the "double encrypted" fourth symmetric ciphertext symm-C4 102*s*-4 received in a message 236 in FIG. 2. The output of symmetric decryption 236*a* can comprise the plaintext value of the third asymmetric ciphertext C3 102*c*-3 for input into KEM DECAPS 103*j'* in step 237 below in FIG. 7 and also FIG. 2. The plaintext value of the third asymmetric ciphertext C3 102*c*-3 can be the string of bits resulting from asymmetric encryption output by device 101 in a step 230 (e.g. raw asymmetrically ciphered data without any symmetric ciphering). The symmetric decryption 226*a* can be included within cryptographic algorithms 103*s* for server 101.

The symmetric decryption 236*a* can include input of (i) parameters/metadata 220*m* in message 224 or metadata 212*b* in message 213 in FIG. 2 above or metadata in message 236 and (ii) the symmetric ciphering key S2 221*b* and MAC key MAC2 221*c* from a step 221 above in FIG. 5*a* for server 111. In a step 232', server 111 can also use an initialization vector for the symmetric decryption 226*a*, where the initialization vector can be either (i) included with metadata in message 236, or (ii) mutually derived with device 101 using the HKDF 221*a* in a step 221. Note that for some exemplary embodiments, the use of "double encryption" and symmetric ciphering key S2 221*b* could be omitted from a step 232', but the MAC key MAC2 221*b* could be included, such that MAC codes could be verified for the third asymmetric ciphertext C3 102*c*-3, where the device 101 could generate the MAC codes over the third asymmetric ciphertext using the MAC key MAC2 221*b*.

FIG. 7

Figure 7:
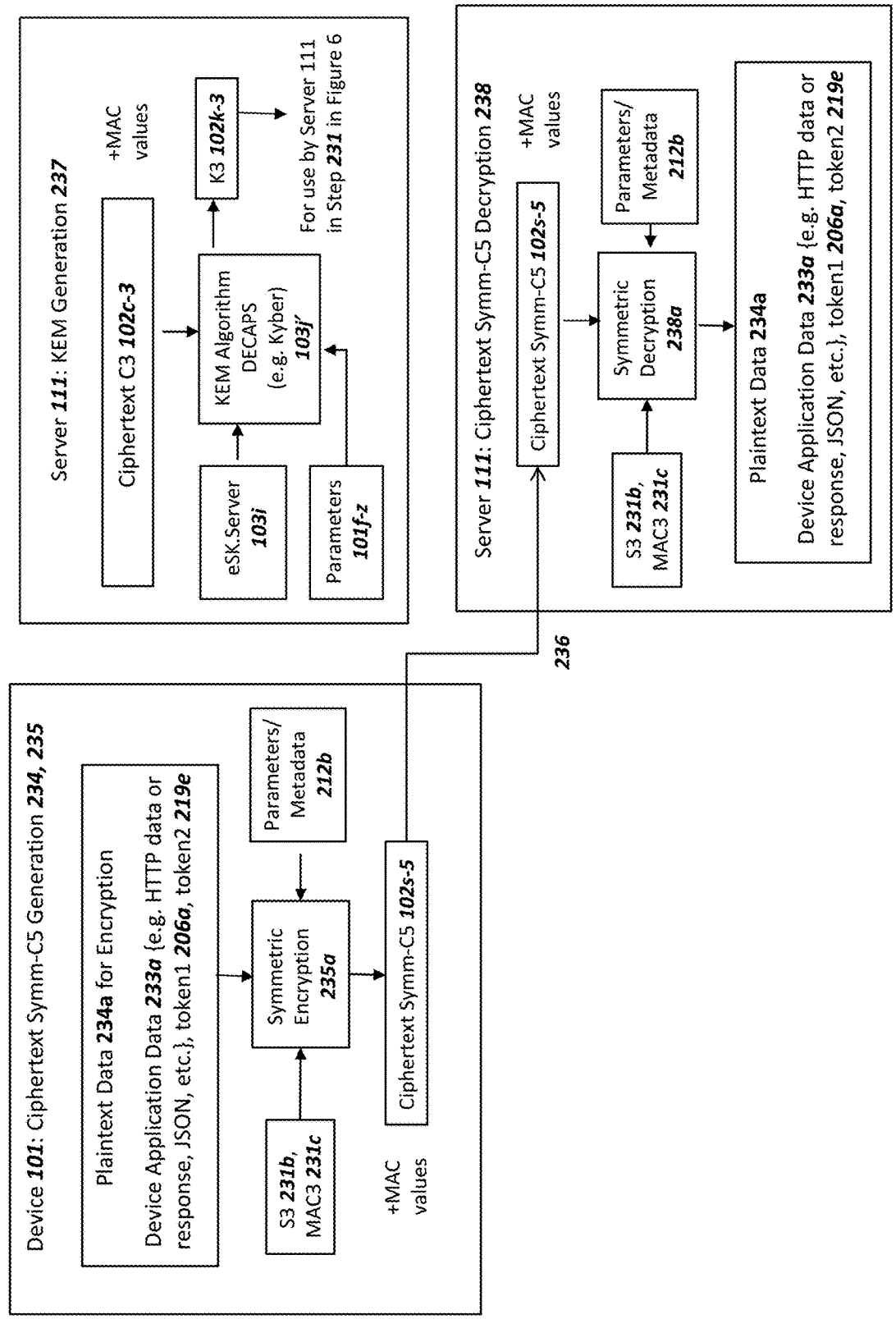
FIG. 7 is a flow chart illustrating exemplary steps for a (i) a server conducting a KEM with a server ephemeral private key to generate a shared secret, and (ii) symmetric ciphering using a mutually derived symmetric ciphering key, in accordance with exemplary embodiments.

FIG. 7 is a flow chart illustrating exemplary steps for a (i) a server conducting a KEM with a server ephemeral private key to generate a shared secret, and (ii) symmetric ciphering using a mutually derived symmetric ciphering key, in accordance with exemplary embodiments. Device 101 can conduct step 235 in order to encrypt a fifth symmetric ciphertext symm-C5 102*s*-5. Server 111 can conduct a KEM with the server ephemeral private key eSK.server 103*i* and the third asymmetric ciphertext C3 102*c*-3. Server 111 can conduct a step 238 in order to decrypt the fifth symmetric ciphertext symm-C5 102*s*-5 and read plaintext data from device 101. The exemplary steps in FIG. 7 were also depicted and described in connection with FIG. 2 above.

At step 234, device 101 can select and process a plaintext 234*a* for encryption into a fifth symmetric ciphertext symm-C5 102*s*-5. A step 234 is also depicted and described in connection with FIG. 2 above. At step 234, device 101 can select application data 233*a* for server 111 and include the application data in a plaintext 234*a*. The application data 233*a* can include data from a sensor 101*y*, actuator 101*z*, an identify of device 101, configuration data for device 101, a registration message from device 101 to server 111, as well as other data from a memory 101*m* in device 101, which is depicted in FIG. 1 above. The application data can be formatted or structured to message standards such as HTTP, DNS requests, JSON messages MQQT messages, COAP, SIP, FTP, and other standards and formats for the application data are possible as well without departing from the scope of the present disclosure. A plaintext 234*a* can comprise the combination of application data and the message formatting or structure.

At step 235, device 101 can use symmetric encryption 235*a* with the plaintext 234*a* from a step 234 in order to generate the fifth symmetric ciphertext symm-C5 102*s*-5. A step 235 is also depicted and described in connection with FIG. 2 above. The symmetric encryption 235*a* can be included within cryptographic algorithms 101*s* for device 101. The symmetric encryption 235*a* can include input of (i) the parameters or metadata 212*b* from message 213 or metadata from message 236 (or in metadata 220*m* from a message 224) above and (ii) the third symmetric ciphering key S3 231*b* and MAC key MAC3 231*c* from a step 231 above. In a step 235, device 101 can also use an initialization vector for the symmetric encryption 235*a*, where the initialization vector can be either (i) included with metadata 212*b*, or (ii) mutually derived with server 111 using the HKDF 231*a*. After step 235 in FIG. 7, device 101 can include the fifth symmetric ciphertext symm-C5 102*s*-5 in a message 236 to server 111 as depicted and described in connection with FIG. 2 above.

A server 111 can receive the message 236 with both the fourth symmetric ciphertext symm-C4 102*s*-4 and the fifth symmetric ciphertext symm-C5 102*s*-5 and conduct steps to process the ciphertext and data. As depicted and described above in a step 232' in FIG. 6, server 111 can read a plaintext data for the third asymmetric ciphertext C3 102*c*-3. At step 237, server 111 can use (i) the KEM parameters 103*f-z* for the third KEM and sent in a message 224 determined from message 213 in a step 213*b* along with (ii) cryptographic algorithms 103*s* to conduct the KEM DECAPS 103*j'* function with the received third asymmetric ciphertext C3 102*c*-3. The server 111 can use the server ephemeral private key of eSK.server 103*b* with the KEM DECAPS 103*j'* and the received third asymmetric ciphertext C3 102c-3 in order to generate the third shared secret key K3 102k-3. A step 237 for server 111 is also depicted and described in connection with FIG. 2 above. The step 237 for server 111 can be equivalent to the step 214 for server 111 above, except the KEM DECAPS 103j' function can use a different algorithm, parameters, and ciphertext in order to generate a different shared secret key K3 102k-3. As depicted in FIG. 7, after a step 237, server can use the third shared secret key K3 102k-3 with a key derivation step 231 depicted and described in connection with FIG. 6 above.

At step 238, server 111 can use symmetric decryption 238a with the received fifth symmetric ciphertext symm-C5 102s-5 from a message 236 in order to read the plaintext 234a. A step 238 is also depicted and described in connection with FIG. 2 above. The symmetric decryption 238a can be included within cryptographic algorithms 103s for server 111. The symmetric decryption 238a can include input of parameters comprising any of (i) the parameters or metadata 212b from message 213 or metadata from message 236 (or in metadata 220m from a message 224) above and (ii) the third symmetric ciphering key S3 231b and MAC key MAC3 231c from a step 231 above.

Server 111 can then read process the plaintext device application data 233a in a step 239, such as storing the application data 233a in RAM 111m or storage memory 111b, and prepare server application data below in response to the received device application data 233a from message 231. In exemplary embodiments, the plaintext data 234a can also include device token token1.device 206a and server token token2.server 219e. In a step 239 as depicted and described in connection with FIG. 2, server 111 can also confirm in a step 239 that (i) the received token2.server 219e equals the same value as transmitted by server 111 in a message 224, and (ii) the receive token1.device 206a equals the same value as transmitted by device 101 in a message 213.

FIG. 8

FIG. 8 is an illustration of (i) an exemplary set of cryptographic parameters for a key exchange mechanism stored and used by a device and a server, and (ii) conducting three KEM for the cryptographic parameters in accordance with exemplary embodiments. As depicted and described above in connection with FIG. 1, a device 101 can store a set of cryptographic parameters 101x for conducting supported key exchange mechanisms (KEM), and a server 111 can also store a set of cryptographic parameters 103x for conducting supported KEM. The cryptographic parameters can specify sets of values for cryptographic algorithms that are supported by device 101 and network 103 or server 111 in order to support the systems and methods depicted herein. Cryptographic parameters 101x and 103x or subsets thereof can be recorded in nonvolatile memory in each of device 101, and server 111 or network 103. Cryptographic parameters 101x and 103x can include values for an identification for a collection or subset of a KEM set identifier 801, a key length 802, a type or name 803, and a secure hash algorithm 804. The depicted parameters in FIG. 8 focus on parameters relevant to conducting a KEM, and different parameters could be used for symmetric ciphering algorithms and also digital signature algorithms.

As contemplated herein, when a selected set of cryptographic parameters such as using the words or description "parameters 101f" or "cryptographic parameters 101f" can specify a set of rows in the parameters for FIG. 8. An individual row of parameters or values can specify sufficient information such that both (i) a device 101 and a server 111 can conduct a KEM.KeyGen function to generate a PM key pair, and (ii) using the PM keys to conduct either KEM ENCAPS or KEM DECAPS functions (such as those depicted and described in connection with FIG. 1). KEM parameters ID 801 can be an identity for a row or set of values for cryptographic parameters 101x and 103x. PK key length 802 could represent the length of a public key in bits or bytes. Cryptographic parameters 101x and 103x could include the length of a private key in bits or bytes as well.

The type or name 803 for a set of cryptographic parameters can specify the cryptographic algorithms to use with PM keys, such as the exemplary names for post-quantum cryptography cryptographic algorithms. The field of post-quantum cryptography continues to develop with proposed algorithms currently undergoing revisions for standardization as of September 2020. In general, the leading candidates for post-quantum cryptography key exchange mechanisms propose using (i) lattice-based cryptography, (ii) code-based cryptography, or (iii) Supersingular elliptic curve isogeny cryptography, as described by the Wikipedia article for "Post-Quantum Cryptography" dated Aug. 31, 2020, which is hereby incorporated by reference.

Hash algorithm 804 in cryptographic parameters 101x and 103x can be the name of a secure hash algorithm, such as the exemplary SHA-256 algorithm depicted, which may also be referred to as "SHA-2". Hash algorithm 804 can also be used in a hash-based key derivation function within the KEM ENCAPS and KEM DECAPS function to generate keys K1 102k-1 and K2 102k-2 and K3 102k-3.

Although not depicted in FIG. 8, settings or parameters for a symmetric ciphering algorithms can specify (i) the identity or name of a symmetric ciphering algorithm such as "AES", "AES-SIV", 3DES, Blowfish, etc, and (ii) settings for the symmetric ciphering algorithm. Other possibilities exist as well for data within cryptographic parameters, such as the specification of point compression, encoding rules such as distinguished encoding rules (DER), ASN or CSN syntax notation, padding rules, byte or bit orders such as big endian, little endian, etc. In addition, the parameters for a symmetric ciphering algorithm could specify an algorithm or mode of operation for using a MAC key to generate or process MAC values, such as "Galois/Counter Mode" (CGM), CCM, etc.

The specific steps, calculations, and logic for a key exchange mechanism (KEM) can be specified according to the name 803. In general a key exchange mechanism or key exchange specified by a name 803 can comprise using a public key from a remote entity and a local private key in order to derive a shared secret. The key exchange mechanism could also comprise (i) encrypting a message "m" or random number for deriving a symmetric ciphering key (or value for the key) with a public key and (ii) decrypting the message "m" or random number for deriving the symmetric ciphering key (or value for the key) with a corresponding private key. Note the name 803 can support different types. In exemplary embodiments depicted in FIG. 8, a first KEM 101k/103j specified by server 111 or device 101 for the server static public key PK.server 103h with the KEM parameters 103f-y and ID 801 of "5" can support a type of Classic McEliece (where a different type would be "SIKE" for the ID of "4" in parameters 101f).

FIG. 8 also depicts the exemplary mutual agreement or negotiation of parameters for a first KEM 101k (ENCAPS) and 103j (DECAPS), herein referred to as "KEM 101k/103j". FIG. 8 also depicts and exemplary mutual agreement or negotiation of parameters for a second KEM 103k (ENCAPS) and 101j (DECAPS), herein referred to as "KEM 103k/101j'". FIG. 8 also depicts and exemplary mutual agreement or negotiation of parameters for a third KEM 101k' (ENCAPS) and 103j' (DECAPS), herein referred to as "KEM 101k'/103j'".

Note that any or all of the first KEM 101k/103j and second KEM 103k/101j and third KEM 101k/103j can use a different type of KEM (e.g. completely different algorithm such as a first type based on lattices and a second type based on SIKE, etc.) For some exemplary embodiments (not depicted in FIG. 8), the first KEM 101k/103j and second KEM 103k/101j could use the same type or name 803 for the algorithm of the first and second KEM. As another example, the first KEM 101k/103j could use KEM parameters 103f-y that specifies an exemplary name 803 of "Classic McEliece" and the second KEM 103k/101 could also use KEM parameters 101f-x that specifies the exemplary name 803 of "Kyber-1024". For the embodiment described in the previous sentence, the KEM parameters 103f-y from FIG. 2 would be different than the KEM parameters 101f-x. In addition, the third KEM 101k/103j could use a different set of parameters, such as KEM parameters 103f-z which specifies and exemplary name of BIKE. In this manner and in some exemplary embodiments, all of the first KEM, the second KEM, and the third KEM can use different algorithms. In other embodiments, the first KEM associated with the static server public and private keys, the first KEM can use Classic McEliece, since the public key can be distributed out of band with a device 101 before device 101 connects to server 111, and then the second and third KEM can use a different algorithm such as Kyber. Other possibilities or combinations for the use of different KEM algorithms are possible as well without departing from the scope of the present disclosure.

Thus, in preferred exemplary embodiments, the first KEM 101k/103j can use a first type (e.g. code based) for parameters 103f-y that is completely different than a second type for the second KEM 103k/101j (e.g. lattice-based or SIKE) and parameters 101f-x. Further, the third KEM 101k'/103j' can use a third type for parameters 103f-z that is different than the first and second type. In this manner and by using the technology and steps described above in FIG. 1 through FIG. 7, the security of a system 200 for application data can be (x) at least as strong as the strongest of the type for the first KEM 101k/103j and the second KEM 103k/101j and the third KEM 101k/103j for (y) data encrypted and decrypted with the third symmetric ciphering key S3 231b and MAC key MAC3 231c (where the generation of keys S3 231b and MAC3 231c include the input of shared secrets K1, K2, and K3 into a HKDF).

Or, in other preferred embodiments, the first KEM 101k/103j can use Classic McEliece for the value for the first KEM 101k/103j and parameters 103f-y. For this embodiment, the second KEM 103k/101j and third KEM 101k'/103j' could use the same type or name 803 for the algorithm of the KEM. For example, the second KEM 103k/101j could use KEM parameters 101f-x that specifies an exemplary name 803 of "Kyber-1024" and the third KEM 101k'/103j' could also use the same KEM parameters for parameters 103f-z that specifies the same exemplary name 803 of "Kyber-1024". For the embodiment described in the previous sentence, the KEM parameters 103f-z from FIG. 2 would be the same as KEM parameters 101f-x But, in preferred exemplary embodiments, the first KEM 103k/101j can use a first type (e.g. code based) that is completely different than a second type for the second KEM 103k/101j (e.g. lattice-based). In this manner, the security of a system 200 for application data can be at least as strong as the stronger of the type for the first KEM 103k/101j and the second KEM 101k/103j.

As depicted in FIG. 8, device 101 in a step 204 from FIG. 2 can select a set of supported cryptographic KEM parameters 101f, which can comprise a list of all parameters supported by device 101 for conducting the first, second, and third key exchange mechanism with server 111. The set of supported cryptographic KEM parameters 101f could be recorded or stored in device 101 in nonvolatile memory during a device configuration step 202. In exemplary embodiments, this set of supported cryptographic KEM parameters 101f comprises at least three rows with distinct KEM parameter identities 801. Each KEM parameter ID 801 could be designated a unique byte code for a field in specifications or standards for a secure session between device 101 and server 111. For the depicted parameters 101f in FIG. 8, device 101 could support an exemplary list of KEM parameters IDs 801 of "1" through "6".

As depicted in FIG. 8, the first set of KEM parameters 101f supported by device 101 can overlap or have a matching subset of the second set of KEM parameters 103f supported by server 111. Although the device 101 and server 111 could potentially not communicate between the nodes before the communication in FIG. 2, a protocol or standard could determine or specify that at least some different KEM parameter values and associated algorithm support could be required between device 101 and server 111, such as the exemplary overlap of supported algorithms depicted in FIG. 8 for KEM parameters 101f (for device 101) and 103f (for server 111). Or, device 101 could receive the set of KEM parameters 103f before device 101 sends the message 213 for some embodiments, such as if device 101 and server 111 had previously communicated.

As depicted in FIG. 8, device 101 in a step 204 from FIG. 2 can select a specific set of cryptographic KEM parameters 101f-x from parameters 101f, where the specific set of parameters 101f-x can be used to derive the device ephemeral public key ePK.device 101h. As depicted and described in connection with FIG. 2, both the selected set of cryptographic KEM parameters 101f and the specific KEM parameters 101f-x for ePK.device 101h can be included in a message 213 in FIG. 2 above. For the exemplary embodiment depicted in FIG. 8, the KEM parameters 101f-x can be a subset of parameters 101f and could have and ID 801 of "3". In exemplary embodiments, the selected KEM parameters 101f-x for ePK.device 101h can also be a subset of server KEM parameters 103f, which is depicted in FIG. 8.

As depicted in FIG. 8, server 111 can store a set of supported cryptographic KEM parameters 103f in storage memory 111b during a server configuration step 203, which is depicted and described in connection with FIG. 2. The KEM parameters 103f can comprise a list of all parameters supported by server 111 for conducting a first KEM 101k/103j and a second KEM 103k/101j and a third KEM 101k'/103j'. In some exemplary embodiments, this set of supported cryptographic KEM parameters 103f comprises at least three rows with distinct KEM parameter identities 801. For the depicted parameters 103f in FIG. 8, server 111 could support an exemplary list of KEM parameters IDs 801 of "3" through "7". In preferred exemplary embodiments, the received and specified KEM parameters 101f-x can match a row or KEM parameters ID 801 for KEM parameters 103f.

As depicted in FIG. 8, device 101 in a step 209 from FIG. 2 can select a specific set of cryptographic KEM parameters 103f-y from parameters 101f, where the specific set of parameters 103f-y can be used with the server static public key PK.server 103d. For some embodiments, the server static public key PK.server 103*d* could be stored by device 101 in a server certificate, where the server certificate specifies the KEM parameters 103*f-y* for the PK.server 103*d*. Or, the parameters 103*f-y* could be stored by device 101 in nonvolatile memory within memory 101*m* along the key PK.server 103*d*. For the exemplary embodiment depicted in FIG. 8, the KEM parameters 103*f-y* can be a subset of parameters 101*f* and could have and ID 801 of "5" and also be associated with Classic McEliece. In exemplary embodiments, the selected KEM parameters 103*f-y* for PK.server 103*d* can also be a subset of server KEM parameters 103*f*, which is depicted in FIG. 8.

After receipt of the supported device KEM parameter 101*f* in a message 213, server 111 in a step 219*b* can select a third set of KEM parameters 103*f-z* that are both (i) different than the first set of KEM parameters 101*f-x* received in message 213 (for device public key ePK.device 101*h*) and (ii) supported by or included within the set of KEM parameters 101*f* also received in a message 213. In summary, for a step 219*b* and in a preferred exemplary embodiment, server 111 selects KEM parameters 103*f-z* for a third KEM 101*k'*/103*j'*. The first KEM comprises (i) KEM ENCAPS 101*k* by device 101 using PK.server 103*d* and (ii) KEM DECAPS 103*j* by server 111 as depicted and described in connection with FIG. 1 above. The second KEM comprises (i) KEM ENCAPS 103*k* by server 111 using ePK.device 101*h* and (ii) KEM DECAPS 101*j* by device 101. The third KEM comprises (i) KEM ENCAPS 101*k'* by device 101 using ePK.server 103*h* and (ii) KEM DECAPS 103*j'* by server 111 in a step 237. In addition, although FIG. 8 and the sentences above in this paragraph describe the use of third KEM parameters 103*f-z* that are different than KEM parameters 101*f-x* and KEM parameters 103*f-y*, in some embodiments the third KEM parameters 103*f-z* can be the same as KEM parameters 101*f-x* or KEM parameters 103*f-y*.

As described in a step 219*b* in FIG. 2, a server 111 can select a row or set of KEM parameters 103*f-z* that matches all of the following conditions: (i) is supported by the received KEM parameters 101*f*, (ii) is supported by the stored KEM parameters 103*f*, (iii) is different than the specified and received KEM parameters 101*f-x* for ePK.device 101*h*, and (iv) KEM parameters 103*f-y* use a different type than KEM parameters 103*f-y* (e.g. different algorithm such as lattice-based for 103*f-z* if 103*f-y* specifies code-based algorithms, etc). For the exemplary data depicted in FIG. 8, a server 111 can select the row with ID 801 of "6" for KEM parameters 103*f-z*, which meets all of the criteria (i) through (iv) from the above sentence. All of KEM parameters 101*f*, 103*f*, 101*f-x*, 103*f-y*, and 103*f-z* could represent different data or values than that depicted in FIG. 8 without departing from the scope of the present disclosure, such as including or specifying different KEM mechanisms and parameters. But in preferred exemplary embodiments, the parameters 103*f-z* for the third KEM 101*k'*/103*j'* support all of the criteria for (i) through (iv) as described in this paragraph.

For other exemplary embodiments, such as for devices 101 with more restricted memories that can support a single KEM algorithms such as a single row in the table depicted in FIG. 8, then the first KEM 101*k*/103*j* and the second KEM 103*k*/101*j* and the third KEM 101*k'*/103*j'* could be conducted with the same KEM parameters. In other words, for the embodiment described in this paragraph, the parameters 101*f*, 101*f-x*, 103*f-y*, and 103*f-z* could be the same and use the same values and settings for all of the first KEM 101*k*/103*j* and the second KEM 103*k*/101*j* and the third KEM 101*k'*/103*j'*.

FIG. 8 also depicts the use of (i) first KEM parameters 103*f-y* (or a first KEM algorithm) for use the a first KEM 101*f*/103*j*, second KEM parameters 101*f-x* (or a second KEM algorithm) for a second KEM 103*k*/101*j* and (ii) third KEM parameters 103*f-z* (or a third KEM algorithm) for a third KEM 101*k'*/103*j'*. The depiction in FIG. 8 provides additional details showing the formatting and use of KEM parameters with PM keys and ENCAPS and DECAPS functions. A device 101 can select second KEM parameters 101*f-x* (or second KEM algorithm) as a subset of KEM parameters 101*f* stored within device 101. The second KEM parameters 101*f-x* can be used with the KEM KeyGen function to generate a device ephemeral public key ePK.device 101*h-x* and device ephemeral private key eSK.device 101*i-x*. The added designation of "-x" shows that keys are formatted and use the selected parameters "101*f-x*", which can represent a designated row or ID 801 from the table in FIG. 8. The second KEM 103*k*/101*j* can comprise server 111 KEM ENCAPS 103*k* and device 101 KEM DECAPS 101*j* using the first KEM parameters 101*f-x*.

In exemplary embodiments, device 101 can select the KEM parameters 101*f-x* in a step 204. In exemplary embodiments, device 101 selects the KEM parameters 101*f-x* for the device ephemeral public key ePK.device 101*h* in a manner such that the KEM parameters 101*f-x* (or first KEM algorithm) are different than the stored KEM parameters 103*f-y* (or second KEM algorithm) for the stored server static public key PK.server 103*d*.

A server 111 can select third KEM parameters 103*f-z* (or third KEM algorithm) as a subset of KEM parameters 103*f* stored within server 111, and also preferably matching all of the conditions (i) through (iv) for a step 219*b* described four paragraphs above. The selected third KEM parameters 103*f-z* (or third KEM algorithm) from a step 203*b* can be used with the KEM KeyGen function to generate a server ephemeral public key ePK.server 103*h-z* and server ephemeral private key eSK.server 103*i-z*. The added designation of "-z" shows that keys are formatted and use the selected parameters "103*f-z*", which can represent a designated row or ID 801 from the table in FIG. 8. The third KEM 101*k'*/103*j'* can comprise server 111 KEM DECAPS 103*j'* and device 101 KEM ENCAPS 101*j'* using the third KEM parameters 103*f-z*.

In exemplary embodiments and as described herein, a first set of KEM parameters (or KEM algorithm) can comprise KEM parameters 103*f-y* associated with PK.server 103*d*. The first set of KEM parameters can be stored in device 101 before device 101 communicates with server 111 via IP network 107. A second set of KEM parameters 101*f-x* (or KEM algorithm) associated with ePK.device 101*h* can be selected by device 101 in a step 204. A third set of KEM parameters 103*f-z* (or KEM algorithm) associated with ePK-.server 101*h* can be selected in a step 219*b*. In addition, FIG. 8 depicts the use of a first KEM 101*k*/103*j*, a second KEM 103*k*/101*j*, and a third KEM 101*k'*/101*j'*, using the keys and associated KEM parameters.

FIG. 9*a*

Figure 9A:
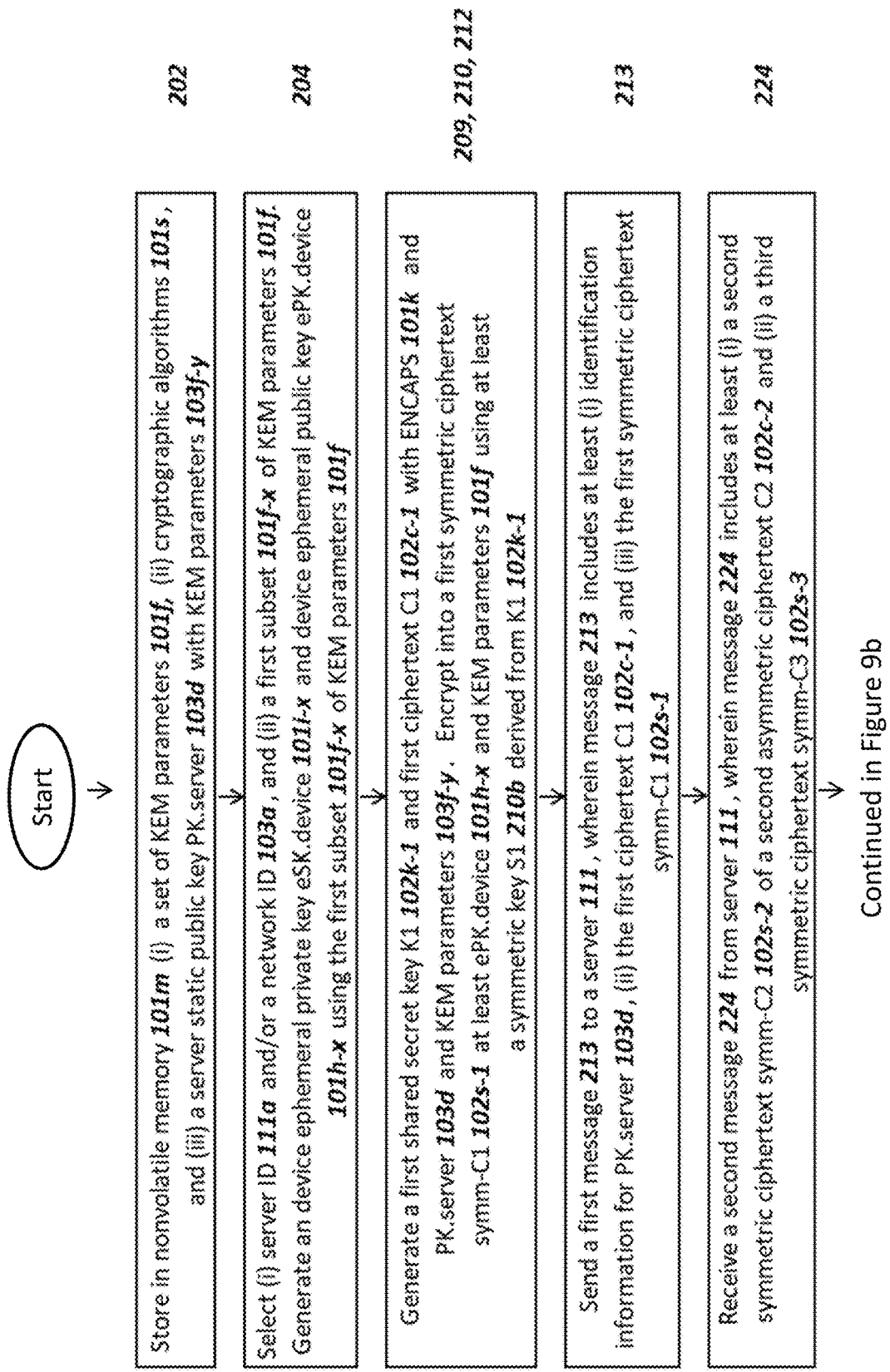
FIG. 9a is a flow chart illustrating exemplary steps for a device to use multiple different KEM algorithms in order to efficiently secure communications with a server, in accordance with exemplary embodiments.

FIG. 9*a* is a flow chart illustrating exemplary steps for a device to use multiple different KEM algorithms in order to efficiently secure communications with a server, in accordance with exemplary embodiments. The steps and components or values for device 101 in FIG. 9*a* also continue with FIG. 9*b* below. The steps and components depicted in FIG. 9*a* and FIG. 9*b* for a device 101 are also depicted and described in connection with FIG. 2 and additional Figures above. Device 101 can use the electrical components for device 101 depicted and described in connection with FIG.

Figure 9B:
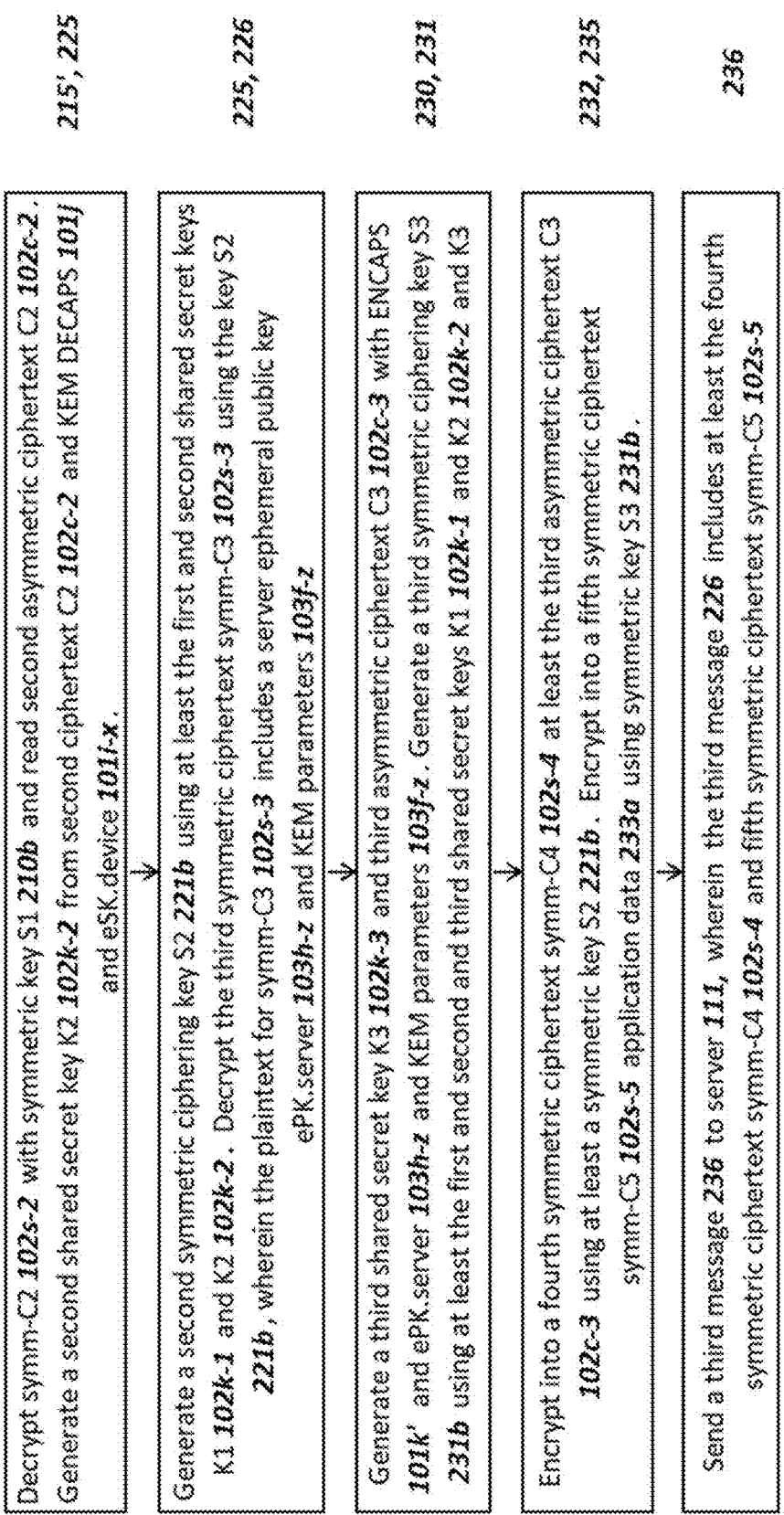
FIG. 9b is a flow chart illustrating exemplary steps for a device to use multiple different KEM algorithms in order to efficiently secure communications with a server, in accordance with exemplary embodiments.

1 in order to conduct the steps in FIG. 9a and FIG. 9b. Note that a device 101 can conduct the additional steps than the steps shown in FIG. 9a and FIG. 9b, as depicted in FIG. 2 and additional Figures above. FIG. 9a and FIG. 9b provides a summary of the primary steps for a preferred embodiment where a device 101 can use three different types of KEM algorithms for three different KEM with a server 111.

At step 202, device 101 can store in nonvolatile memory for device memory 101m (i) a set of KEM parameters 101f, (ii) cryptographic algorithms 101s, and (iii) a server static public key PK.server 103d with KEM parameters 103f-y. Note that the first set of KEM parameters 103f can be stored within server 103, and the first and second sets of KEM parameters 101f and 103f can have a common subset as depicted and described in connection with FIG. 8. The second set of KEM parameters 101f can be a subset of cryptographic parameters 101x. The data stored in device 101 can be stored during a configuration step for device 101. An example of the second set of KEM parameters 101f are depicted and described in connection with FIG. 8 above.

At step 204, device 101 can select (i) server ID 111a and/or a network ID 103a, and (ii) a first subset 101f-x of KEM parameters 101f. Device 101 can generate a device ephemeral private key eSK.device 101i-x and device ephemeral public key ePK.device 101h-x using the first subset 101f-x of KEM parameters 101f. As contemplated herein, the first subset 101f-x of the second set of KEM parameters 101f can be referred to as KEM parameters 101f-x. The KEM parameters 101f-x can specify a first type of KEM algorithm (e.g. lattice-based, code-based, or SIKE), such as, but not limited to, the KEM parameter 101f-x depicted FIG. 8. The KEM parameters 101f-x can be selected in a step 204 based on device 101 anticipating or previously storing that server 111 supports the KEM parameters 101f-x in order to conduct a first KEM 101k/103j as depicted and described in connection with FIG. 8.

At step 205, device 101 can generate an ephemeral private key 101h-x and ephemeral public key 101i-x using the first subset 101f-x of KEM parameters 101f, which are also referred to herein as KEM parameters 101f-x. At step 205, device 101 can use a PQC.KeyGen function 101q to generate a device ephemeral PM key pair comprising a device ephemeral public key ePK.device 101h and a device ephemeral private key eSK.device 101i. The algorithm used to generate the ephemeral PM key pair can be specified in KEM parameters 101f-x selected by device 101 in a step 204 above.

Steps 209 through 212 as depicted and described in connection with FIG. 2 and also FIG. 3 above. At step 209 device 101 can generate a first shared secret key K1 102k-1 and first asymmetric ciphertext C1 102c-1 using KEM ENCAPS 101k and PK.server 103d and KEM parameters 103f-y. In a step 212, device 101 can encrypt into a first symmetric ciphertext symm-C1 102s-1 comprising at least ePK.device 101h-x and KEM parameters 101f. The first symmetric ciphertext symm-C1 102s-1 can be encrypted using at least a symmetric key S1 210b derived from K1 102k-1 using HKDF 210a in a step 210.

Device 101 can send server 111 a message 213, wherein message 213 includes at least (i) identification information for PK.server 103d, (ii) the first asymmetric ciphertext C1 102c-1, and (iii) the first symmetric ciphertext symm-C1 102s-1. Device 101 can then receive a second message 224 from server 111, wherein message 224 includes at least (i) a second symmetric ciphertext symm-C2 102s-2 of a second asymmetric ciphertext C2 102c-2 and (ii) a third symmetric ciphertext symm-C3 102s-3. Note that for some embodiments, the use of "double encryption" and the second symmetric ciphertext symm-C2 102s-2 can be omitted, and the second asymmetric ciphertext C2 102c-2 could be received without additional encryption. In some embodiments, the second asymmetric ciphertext C2 102c-2 could be sent with MAC codes generated using MAC key MAC1 210c output from HKDF 210a in a step 210. FIG. 9a continues with FIG. 9b below.

FIG. 9b

FIG. 9b is a flow chart illustrating exemplary steps for a device to use multiple different KEM algorithms in order to efficiently secure communications with a server, in accordance with exemplary embodiments. The steps and components or values for device 101 in FIG. 9b also continue from FIG. 9a above.

At step 215', device 101 can decrypt the second symmetric ciphertext symm-C2 102s-2 with symmetric key S1 210b and read second asymmetric ciphertext C2 102c-2. Note that although step 215' in FIG. 5b and in FIG. 9 depicts and describes that symmetric key S1 201b is used to decrypt the second symmetric ciphertext symm-C2 102s-2, a protocol could specify the update or a key schedule for the symmetric key S1 210b, such that symmetric key S1 210b based on K1 102k-1 is updated with additional data input into HKDF 210a. For these embodiments, then a step 215' could be conducted with an updated symmetric key S1' 210b', where the key S1 210b is updated to S1' 210b'. Note that subsequent key S2 221b (as well as MAC keys) can be updated, where additional shared data is input into the generating HKDF with the original derived shared secret keys, such that key S2 221b could be used to decrypt the third symmetric ciphertext symm-C3 102s-3 in step 226 below, but then an updated key S2' 221b' could be used to encrypt the fourth symmetric ciphertext symm-C4 102s-4.

At step 225, device 101 can generate a second shared secret key K2 102k-2 from the second asymmetric ciphertext C2 102c-2 and KEM DECAPS 101j and eSK.device 101i-x. At step 225, device 101 could also generate a second symmetric ciphering key S2 221b using at least the first and second shared secret keys K1 102k-1 and K2 102k-2. A step 225 was depicted and described in connection with FIG. 2 and FIG. 5a above. At step 226, device 101 can decrypt the third symmetric ciphertext symm-C3 102s-3 using the second symmetric ciphering key S2 221b, wherein the plaintext for the third symmetric ciphertext symm-C3 102s-3 includes a server ephemeral public key ePK.server 103h-z and KEM parameters 103f-z.

At step 230, device 101 can generate a third shared secret key K3 102k-3 and third asymmetric ciphertext C3 102c-3 using the KEM ENCAPS 101k' and the server ephemeral public key ePK.server 103h-z and KEM parameters 103f-z. At step 231, device 101 can generate a third symmetric ciphering key S3 231b using at least the first and second and third shared secret keys K1 102k-1 and K2 102k-2 and K3 102k-3. Steps 230 and 231 for device 101 are depicted and described in connection with FIG. 2 and also FIG. 6 above.

At step 232, device 101 can encrypt into a fourth symmetric ciphertext symm-C4 102s-4 at least the third asymmetric ciphertext C3 102c-3 using at least the symmetric key S2 221b. As discussed three paragraphs above, for some embodiments the symmetric key S2 221b could be updated to a key S2' 221b' using data from message 224. At step 235, device 101 can encrypt into a fifth symmetric ciphertext symm-C5 102s-5 the device application data 233a using the symmetric key S3 231b. Device 101 can then send a third message 236 to server 111, wherein the third message 226 includes at least the fourth symmetric ciphertext symm-C4 102s-4 and the fifth symmetric ciphertext symm-C5 102s-5 FIG. 10

Figure 10:
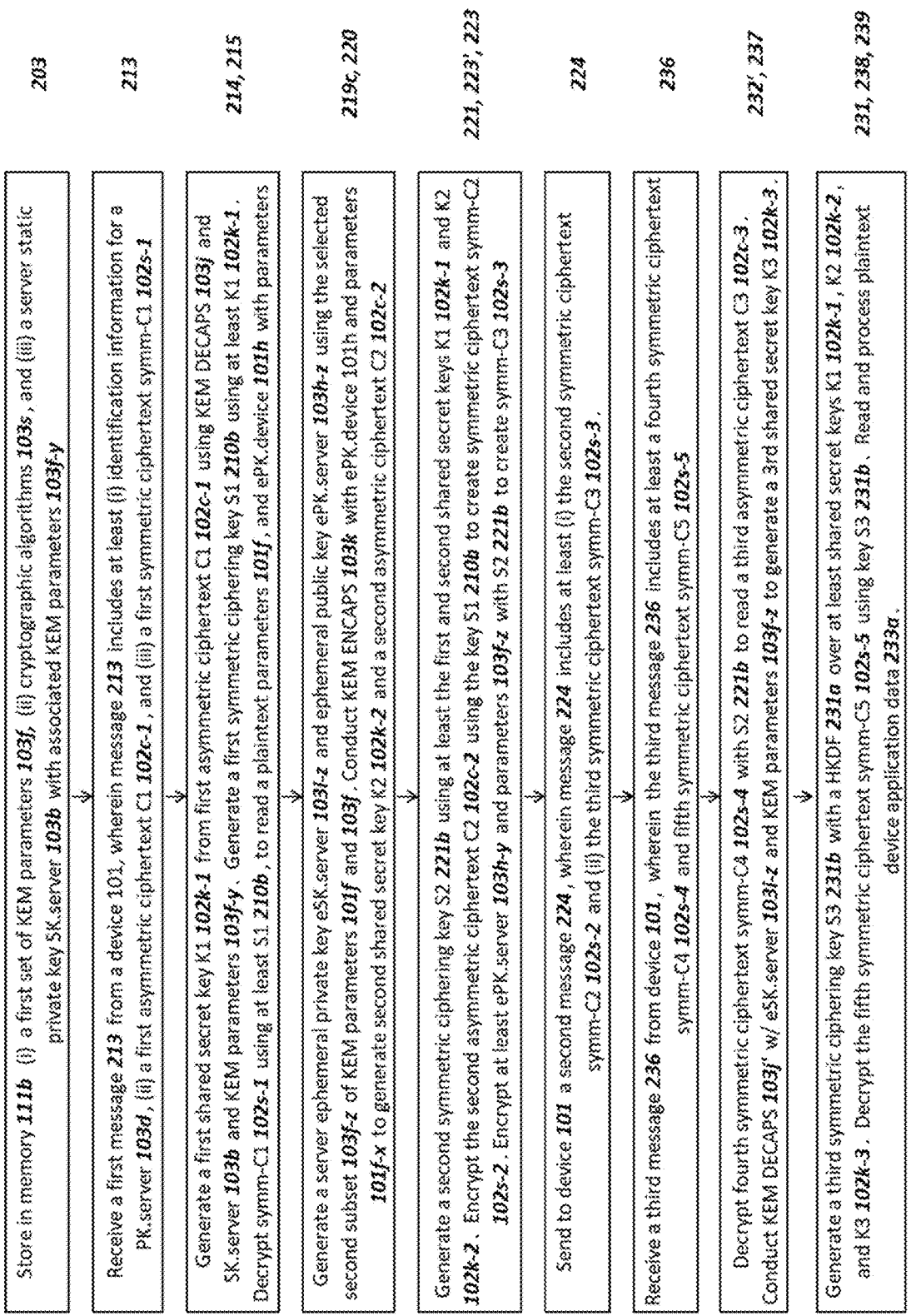
FIG. 10 is a flow chart illustrating exemplary steps for a server to use multiple different KEM algorithms in order to efficiently secure communications with a device, in accordance with exemplary embodiments.

FIG. 10 is a flow chart illustrating exemplary steps for a server to use multiple different KEM algorithms in order to efficiently secure communications with a device, in accordance with exemplary embodiments. The steps and components depicted in FIG. 10 for a server 111 are also depicted and described in connection with FIG. 2 and additional Figures above. Server 111 can use server hardware 111h in server 111 in order to conduct the steps in FIG. 10, where server hardware 111h is depicted and described in connection with FIG. 1. Although not depicted with a "Start" and an "End" in FIG. 10, the sequence of steps depicted can begin with a step 203 and end with a step 239. Note that a server can conduct the additional steps as depicted in FIG. 2 and additional Figures above, and FIG. 10 provides a summary of the primary steps for a preferred embodiment where a server 111 can use three KEM algorithms for three different KEM with a device 101.

At step 203, server 111 can store in nonvolatile memory 111b (i) a first set of KEM parameters 103f, (ii) cryptographic algorithms 103s, and (iii) a server static private key SK.server 103b with associated KEM parameters 103f-y. The first set of KEM parameters 103f can be a subset of cryptographic parameters 103x for server 111 as depicted and described in connection with FIG. 1. The data stored in server 111 can be stored during a configuration step for server 111. An example of the first set of KEM parameters 103f are depicted and described in connection with FIG. 8 above (with the data depicted as "in 111b").

Server 111 can then receive a first message 213 from a device 101, wherein message 213 includes at least (i) identification information for a server static public key of PK.server 103d, (ii) a first asymmetric ciphertext C1 102c-1, and (iii) a first symmetric ciphertext symm-C1 102s-1. For some embodiments the identification information can comprise a secure hash value over PK.server 103d, which is depicted for a message 213 in FIG. 2. Server 111 can use the identification information to select the server static private key SK.server 103b and associated KEM parameters 103f-y in order to process the first asymmetric ciphertext C1 102c-1.

At step 214, server 111 can generate a first shared secret key K1 102k-1 from the first asymmetric ciphertext C1 102c-1 using KEM DECAPS 103j and SK.server 103b and KEM parameters 103f-y. At step 214 server 111 can also generate a first symmetric ciphering key S1 210b using at least the first shared secret key K1 102k-1. At step 215, server 111 can decrypt the first symmetric ciphertext symm-C1 102s-1 using at least S1 210b, in order to read a plaintext parameters 101f, and ePK.device 101h with parameters 101f-x. Although not depicted in FIG. 10 but depicted and described in connection with FIG. 2 and also FIG. 8, server 111 can then conduct a step 219b in order to select KEM parameters 103f-z. The KEM parameters 103f-z can specify a PQC KEM algorithm that is a different type or different family than the KEM parameters 101f-x for ePK.device 101h received in message 213. The KEM parameters 103f-z can specify a PQC KEM algorithm that is a different type or different family than the KEM parameters 103f-y for SK.server 103b.

At step 219c, server 111 can generate a server ephemeral private key eSK.server 103i-z and ephemeral public key ePK.server 103h-z using a selected second subset 103f-z of KEM parameters 101f and 103f. At step 220, server 111 can conduct KEM ENCAPS 103k with ePK.device 101h and parameters 101f-x to generate second shared secret key K2 102k-2 and a second asymmetric ciphertext C2 102c-2.

At step 221, server 111 can generate a second symmetric ciphering key S2 221b using at least the first and second shared secret keys K1 102k-1 and K2 102k-2. A HDKF 221a with a step 221 as depicted and described in connection with FIG. 5a can be used to generate the key S2 221b along with a MAC key MAC2 221c. At step 223' server 111 can encrypt the second asymmetric ciphertext C2 102c-2 using the key S1 210b to create symmetric ciphertext symm-C2 102s-2. Note that the key S1 210b at a step 223' can be generated by a HKDF function that has input of at least the first shared secret key K1 102k-1 generated in a step 214. At step 223, server 111 can encrypt at least ePK.server 103h-y and parameters 103f-z with the second symmetric ciphering key S2 221b in order to create a third symmetric ciphertext symm-C3 102s-3. Server 111 can then send to device 101 a second message 224, wherein message 224 includes at least (i) the second symmetric ciphertext symm-C2 102s-2 and (ii) the third symmetric ciphertext symm-C3 102s-3. A message 224 is also depicted and described in connection with FIG. 2 above.

Server 111 can then receive a message 236 from device 101, wherein the third message 236 includes at least a fourth symmetric ciphertext symm-C4 102s-4 and fifth symmetric ciphertext symm-C5 102s-5. At step 232', server 111 can decrypt the fourth symmetric ciphertext symm-C4 102s-4 with the second symmetric ciphering key S2 221b in order to read the third asymmetric ciphertext C3 102c-3. Note that the key S2 221b at a step 232' can be generated by a HKDF function that has input of at least the first shared secret key K1 102k-1 generated in a step 214 and the second shared secret key K1 102k-2 from a step 220. Server 111 can then use the third asymmetric ciphertext C3 102c-3 to conduct a KEM DECAPS 103j' with eSK.server 103i-z and KEM parameters 103f-z to generate a third shared secret key K3 102k-3.

Server 111 can then conduct a step 231 to generate a third symmetric ciphering key S3 231b with a HKDF 231a over at least shared secret keys K1 102k-1, K2 102k-2, and K3 102k-3. A step 231 for server 111 and device 101 is depicted and described in connection with FIG. 6 above. Additional and mutually shared data could be input into the HKDF 231a in a step 231 as well. At step 238, server 111 can decrypt the fifth symmetric ciphertext symm-C5 using the third symmetric ciphering key S3 231b. At step 239, server 111 can read and process plaintext device application data 233a output from the step 238.

FIG. 11

Figure 11:
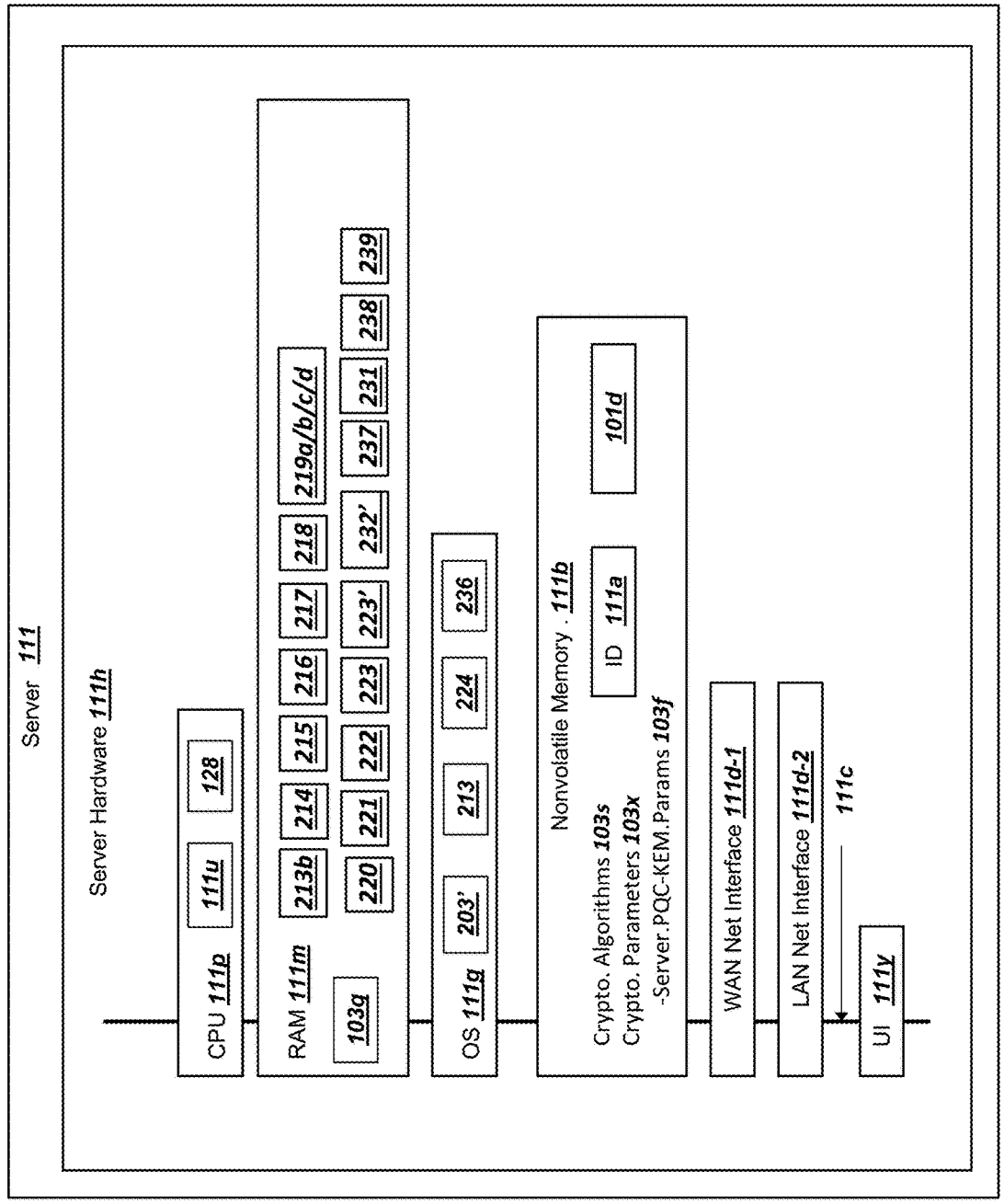
FIG. 11 is a graphical illustration of hardware, firmware, and software components for a server, in accordance with exemplary embodiments.

FIG. 11 is a graphical illustration of hardware, firmware, and software components for a server, in accordance with exemplary embodiments. FIG. 11 is illustrated to include several components that can be common within a server 111. Server 111 can include or operate with server hardware 111h. Server 111 may consist of multiple electrical components in order to communicate with both (i) a plurality of devices 101 and other servers, routers, firewalls, and computing devices within a network 103. In exemplary embodiments and as depicted in FIG. 11, server 111 can include a server identity 111a, a processor 111p (depicted as "CPU 111p"), random access memory (RANI) 111m, an operating system (OS) 111g, storage memory 111b (depicted as "nonvolatile memory 111b"), a Wide Area Network (WAN) interface 111d-1, a LAN interface 111d-2, a system bus 111c, and a user interface (UI) 111y.

Server identity 111a could comprise a preferably unique alpha-numeric or hexadecimal identifier for server 111, such as an Ethernet MAC address, a domain name service (DNS) name, a Uniform Resource Locator (URL), an owner interface identifier in an IPv6 network, a serial number, an IP address, or other sequence of digits to uniquely identify each of the many different possible nodes for a server 111 connected to an IP network 107. Server identity 111a can preferably be recorded in a non-volatile memory and recorded by a network 103 upon configuration of a server 111, such as during a configuration step 201c depicted and described in connection with FIG. 2 above. Server identity 111a may also be a number or string to identify an instance of server 111 running in a cloud or virtual networking environment.

In exemplary embodiments, server 111 can operate with multiple different server identities 111a, such as a first server identity 111a comprising a DNS name and a second server identity 111a comprising an IP address and a port number. A third server identity 111a could comprise an MAC address for WAN interface 111d-1. A fourth server identity 111a can comprise an identifier for an instance of a virtual machine operating in a cloud networking environment. A different server 111 could be associated with a different IP address and port number or a different MAC address for WAN interface 111d-1. In exemplary embodiments, (i) a server 111 with a first server identity 111a can operate with a first Internet Protocol address and port (IP:port) number with a first set of server extensions 103g and (ii) a second or different server 111 with a second server identity 111a can operate with a second IP:port number and a second set of server extensions 103g. Other possibilities exist as well for the use of a plurality of different server identities 111a without departing from the scope of the present disclosure.

The CPU 111p can comprise a general purpose processor appropriate for higher processing power requirements for a server 111 (compared to a device 101), and may operate with multiple different processor cores. CPU 111p can comprise a processor for server 111 such as an ARM® based process or an Intel® based processor such as belonging to the XEON® family of processors, and other possibilities exist as well. For some exemplary embodiments, the CPU 111p can be based on a processor using the RISC-V architecture. CPU 111p can utilize bus 111c to fetch instructions from RAM 111m and operate on the instruction. CPU 111p can include components such as registers, accumulators, and logic elements to add, subtract, multiply, and divide numerical values and record the results in RAM 111m or storage memory 111b, and also write the values to an external interface such as WAN interface 111d-1 and/or LAN interface 111d-2. In exemplary embodiments, CPU 111p can perform the mathematical calculations for KEM DECAPS 103j, KEM ENCAPS 103k, symmetric ciphering, etc. depicted and described in connection with in FIG. 1, FIG. 2, etc., above. A CPU 111p could also comprise a "system on a chip" (SOC) with a plurality of cores, including examples of the Amazon Graviton family of processors such as the Graviton 2 or the Apple "M" family of processors such as the M1

For servers 111 operating as virtual machines or containers such as, but not limited to, within Docker or Kubernetes, the server 111 could be allocated a portion of a physical processor CPU 111p from a host operating system in order for the server 111 to conduct processing and computational steps as contemplated herein. The portion of a physical processor CPU 111p for the server 111 could comprise different embodiments without departing from the scope of the present disclosure. A CPU 111p for a server 111 could comprise a "time slice" of a physical SOC within a physical host server (such as repeated brief periods of time on the order of milliseconds or less for CPU 111p) that is shared with other processes or virtual machines running on the host. The CPU 111p for a server 111 could comprise a dedicated (for a period of time) processing core of a physical SOC within a physical host server. Or, the CPU 111p for a first server could comprise a combination of the allocation of resources from a physical SOC within a physical host server as described in the previous two sentences.

CPU 111p can also include a secure processing environment (SPE) 111u in order to conduct post-quantum cryptography (PQC) key exchange mechanism (KEM) operations and algorithms, such as, but not limited to, (i) conducting KEM ENCAPS function 103k depicted and described in connection with FIG. 1 above, (ii) conducting KEM DECAPS function 103j depicted and described in connection with FIG. 1 above, and (iii) conducting HKDF functions 210a, 221a, and 231a in order to derive shared secret keys K1 102k-1, K2 102k-2, and K3 102k-3. SPE 111u can comprise a dedicated area of silicon or transistors within CPU 111p in order to isolate the PQC KEM operations from other programs or software operated by CPU 111p, including many processes or programs running operating system 111g. SPE 111u could contain RANI memory equivalent to RAM 111m and nonvolatile memory equivalent to storage memory 111b, as well as a separately functioning processor on a smaller scale than CPU 111p, such as possibly a dedicated processor core within CPU 111p. SPE 111u can comprise a "secure enclave" or a "secure environment", based on the manufacturer of CPU 111p. In some exemplary embodiments, an SPE 111u can be omitted and the CPU 111p can conduct PQC operations or calculations without an SPE 111u.

A processor 111p for server 111 could include a hardware random number generator 128. The hardware random number generator 128 can use a sensor such as a sensor in server 111 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number or sensor data can also be used to generate (i) the value M2 220a as a random number for the KEM ENCAPS function 103k in a step 220 above, and also other random numbers generated and used by a server 111 as contemplated herein, including random numbers for a server ephemeral PM key pair.

RAM 111m may comprise a random access memory for server 111. RAM 111m can be a volatile memory providing rapid read/write memory access to CPU 111p. RANI 111m could be located on a separate integrated circuit in server 111 or located within CPU 111p. The RAM 111m can include data recorded in server 111 for the operation when communicating with a plurality of devices 101 or other servers or computing devices in a network 103. RAM 111m may be connected to CPU 111p using a system bus 111c which could comprise a memory bus, such as supporting DDR5 RAM memory and other possibilities exist as well. As depicted and described in connection with FIG. 1 above, RAM 111m could also include an operating system 111g, or components of an operating system 111g such as a kernel, and other components of operating system 111g, such as some supporting libraries could be stored within storage memory 111b.

The system bus 111c may be any of several types of bus structures including a memory bus or memory controller, a peripheral bus, and a local bus using any of a variety of bus architectures including a data bus. System bus 111c connects components within server 111 as illustrated in FIG. 11, such as transferring electrical signals between the components illustrated. Server 111 can include multiple different versions of bus 111c to connect different components, including a first system bus 111c between CPU 111p and RAM 111m (which could be a memory bus), and a second system bus 111c between CPU 111p and WAN interface 111d-1 or LAN interface 111d-2, which could be an I2C bus, an SPI bus, a PCI bus, or similar data busses.

In exemplary embodiments, RAM 111m operating with server 111 can record values and algorithmic steps or computer instructions for conducting a post-quantum cryptography (PQC) key encapsulation mechanisms (KEM). RAM 111m may also store the values (i) M1 208a from a step 208 and (ii) M2 220a from a step 220 above in FIG. 2 and also FIG. 1. RAM 111m may store the computer executable instructions for conducting the steps and associated variables and values or constants for steps or functions 103q, 213b, 214, 215, 216, 217, 218, 219a, 219b, 219c, 219d, 220, 220b, 221, 222, 223, 223', 232', 237, 231, 238, and 239, which are depicted and described in connection with FIG. 2 above and also previous Figures herein. The exemplary steps depicted in RAM 111m listed in the above sentence can comprise computer executable instructions for the processor CPU 111p as well as memory cells for storing constants and variables associated with conducting the computer executable instructions. The computer executable instructions for the different steps can be stored in storage memory 111b when the server 111 is powered off or in an extended sleep state (such as greater than 10 seconds). The computer executable instructions can be moved by an OS 111g from the storage memory 111b to the RAM 111m during a boot process or a process for the server 111 to begin supporting communications with at least one device 101.

Note that the associated data or values for the steps can also be stored within RAM 111m for a period of time to both conduct the step and use the resulting data in subsequent steps. As one example, in a step 221 to conduct a hash based key derivation function (HKDF) 221a (depicted and described in connection with FIG. 5a above), the output from a step 220 comprising a second shared secret key K2 102k-2 can be stored in RANI 111m and be input into the HKDF 221a. In other words and as one example, the depiction of a step 221 in RAM 111m can include both (i) the computer executable instructions to conduct the step and (ii) the data or values associated with the step such as the second shared secret key K2 102k-2 generated or processed by the step. Consequently, a step depicted in RAM 111m can include all of the associated data and instructions or logic to conduct the step, where details for the steps are depicted in FIG. 2 and FIG. 5a above. The output of the HKDF 221a can comprise the second shared symmetric ciphering key S2 221b and MAC key MAC2 221c, which could also be stored within RAM 111m and within physical memory associated with a step 221 allocated to RAM 111m.

As another example for RANI 111m within server 111 or allocated to server 111, RANI 111m could store both computer executable instructions and associated values for a step 231 as depicted in FIG. 6 above. The step 231 within RAM 111m could include the data from message 236, the first shared secret key K1 102k-1, the second shared secret key K2 102k-2, the third shared secret key K3 102k-3, and the HDKF 231a, as well as the third symmetric ciphering keys S3 231b and MAC3 231c. For some data within RAM 111m for step 231, the depicted data for a step 231 or recited data from the previous sentence could comprise a pointer within RAM 111m for a step 231, such that the data could be recorded or stored within RANI 111m in a different location within RAM 111m than the memory allocated to data for step 231 within RAM 111m.

The operating system (OS) 111g can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 111b, etc. Although the OS 111g is depicted as a component within server hardware 111h, OS 111g may not necessarily comprise a separate electrical component and could comprise a portion of memory cells that store binary data for the OS 111g.

The operating system 111g may include timers and schedulers for managing the access of software to hardware resources within server 111, where the hardware resources managed by OS 111g can include CPU 111p, RAM 111m, nonvolatile memory 111b, and system bus 111c, and well as connections to the IP network 107 via a WAN interface 111d-1 and also another server within network 103 via LAN interface 111d-2. The operating system shown of 111g can be appropriate for a higher power computing device with more memory and CPU resources (compared to a device 101). Example operating systems 111g for a server 111 includes Linux or Windows® Server, and other possibilities exist as well. Although depicted as a separate element within server 111 in FIG. 11, OS 111g may reside in RANI 111m and/or nonvolatile memory 111b during operation of server 111.

As depicted in FIG. 11, OS 111g in FIG. 11 can contain algorithms, programs, or computer executable instructions (by processor 111p or SPE 111u) for conducting or performing a configuration step 203 for server 111. The portion of actions for a configuration step 203 performed by the OS 111g is depicted in FIG. 11 as 203'. An OS 111g can include algorithms for the server 111 to receive and process the network layer data from a message 213 from device 101, where the message 213 is depicted and described in connection with FIG. 2 above. An OS 111g can also include the executable instructions for processor 111p to send messages, such as but not limited to, a message 224 as depicted and described above in connection with FIG. 2. In other words, OS 111g can include libraries and drivers such that the message 224 could be assembled based on the output and data from the series of steps 213b through 223' depicted and described in connection with FIG. 2, and then the OS 111g could write the data for message 224 via the system bus 111c to the WAN interface 111d-1, where the WAN interface 111d-1 can subsequently transmit the message 224 to the IP network 107.

An OS 111g can also include the executable instructions for processor 111p to receive messages such as, but not limited to, a message 236 as depicted and described above in connection with FIG. 2. In other words, OS 111g can include libraries and drivers such that the message 236 could be received from the IP network 107 using the WAN interface 111d-1 and system bus 111c. The OS 111g could parse the data received in a message 236 and store contents from the message 236 in RAM 111m such that the server 111 could conduct the subsequent steps using the data from the message 236. The OS 111g could write data from the message 236 to RAM 111m, and then the computer executable steps in RAM 111m such as associated with a step 237, 231, and 238 could process the data from a message 236. The receipt of a message 236 and then steps 237, 231, and 238 using the data from a message 236 is also depicted and described in connection with FIG. 2 above.

Nonvolatile memory 111*b* or "storage memory" 111*b* (which can also be referred to herein as "memory 111*b*") within server 111 can comprise a non-volatile memory for long-term storage of data, including times when server 111 may be powered off or within an extended sleep state such as a sleep state longer than a few seconds. Memory 111*b* may be a NAND flash memory or a NOR flash memory and record firmware for server 111, such as a bootloader program and OS 111*g*. Memory 111*b* can record long-term and non-volatile storage of data or files for server 111. In an exemplary embodiment, OS 111*g* is recorded in memory 111*b* when server 111 is powered off, and portions of memory 111*b* are moved by CPU 111*p* into RAM 111*m* using a boot loader when server 111 powers on.

Memory 111*b* (i) can be integrated with CPU 111*p* into a single integrated circuit (potentially as a "system on a chip"), or (ii) operate as a separate integrated circuit or a removable card or "disk", such as a solid state drive (SSD). Storage memory 111*b* can also comprise a plurality of spinning hard disk drives in a redundant array of independent disks (RAID) configuration. Memory 111*b* may also be referred to as "server storage" and can include exemplary file systems of FAT16, FAT32, NTFS, ext3, ext4, UDF, or similar file systems. As contemplated herein, the terms "memory 111*b*", "storage memory 111*b*", and "nonvolatile memory 111*b*" can be considered equivalent. As depicted in FIG. 11, non-volatile memory 111*b* can record cryptographic algorithms 103*s*, cryptographic parameters 103*x*, server PQC KEM parameters 103*f*, and at least one server identity of 111*a*.

Server 111 can include a WAN interface 111*d*-1 to communicate with IP network 107 and a plurality of devices 103, as depicted in FIG. 1 above (where FIG. 1 depicts a single device 103). WAN interface 111*d*-1 can comprise either a wired connection such as Ethernet or a wireless connection. For wireless configurations of server 111, then WAN interface 111*d*-1 can comprise a radio, which could connect with an antenna in order to transmit and receive radio frequency signals. For a wireless configuration of server 111, WAN interface 111*d*-1 within server 111 can provide connectivity to an IP network 107 through 3GPP standards such as 3G, 4G, 4G LTE, and 5G networks, or subsequent and similar standards. A single network interface 111*d* is depicted and described in connection with FIG. 1 and the network interface 111*d* could consist of separate physical interfaces such as a WAN interface 111*d*-1 and a LAN interface 111*d*-2.

Server 111 may also operate a LAN interface 111*d*-2, where LAN interface 111*d*-2 can be used to connect and communicate with other servers or devices in a network 103, such as a network database 224 as depicted and described in connection with FIG. 2 above. LAN interface 111*d*-2 can comprise a physical interface connected to system bus 111*c* for server 111. In exemplary embodiments, LAN interface 111*d*-2 can comprise an Ethernet or fiber optic physical connection. In other words, (i) LAN interface 111*d*-2 can connect server 111 to private network (which could comprise an IP network with private IP addresses that are not globally routable), and (ii) WAN interface 111*d*-1 can comprise an interface for communicating with a plurality of devices 101 through insecure networks such as the globally routable public Internet. The use of a separate WAN interface 111*d*-1 and LAN interface 111*d*-2 can increase the security of operation for server 111. However, the use of separate physical interfaces for LAN interface 111*d*-2 and WAN interface 111*d*-1 can be omitted, and a single physical interface such as Ethernet or fiber-optic could be used by server 111 to communicate with both devices 101 and at least a second server 112.

Server 111 may also optionally include user interface 111*y* which may include one or more sub-servers for receiving inputs and/or one or more sub-servers for conveying outputs. User interfaces are known in the art and may be simple for many first servers 111 such as a few LED lights or and LCD display, and thus user interfaces are not described in detail here. User interface 111*y* could comprise a touch screen or screen display with keyboard and mouse, if server 111 has sophisticated interaction with a user, such as a network administrator. Server 111 can optionally omit a user interface 111*y*, if no user input or display is required for establishing communications within a network 103 and/or IP network 107.

Although not depicted in FIG. 11, server 111 can include other components to support operation, such as a clock, power source or power connection, antennas, etc. Other possibilities exist as well for hardware and electrical components operating in a server 111 without departing from the scope of the present disclosure. Using the electrical components depicted in FIG. 11, a server 111 could send and receive the data 106 in FIG. 1 in an encrypted and secure manner after conducting the authenticated PQC KEM steps as contemplated herein, in order to conduct secure communications with a plurality of devices 101.

FIG. 12

Figure 12:
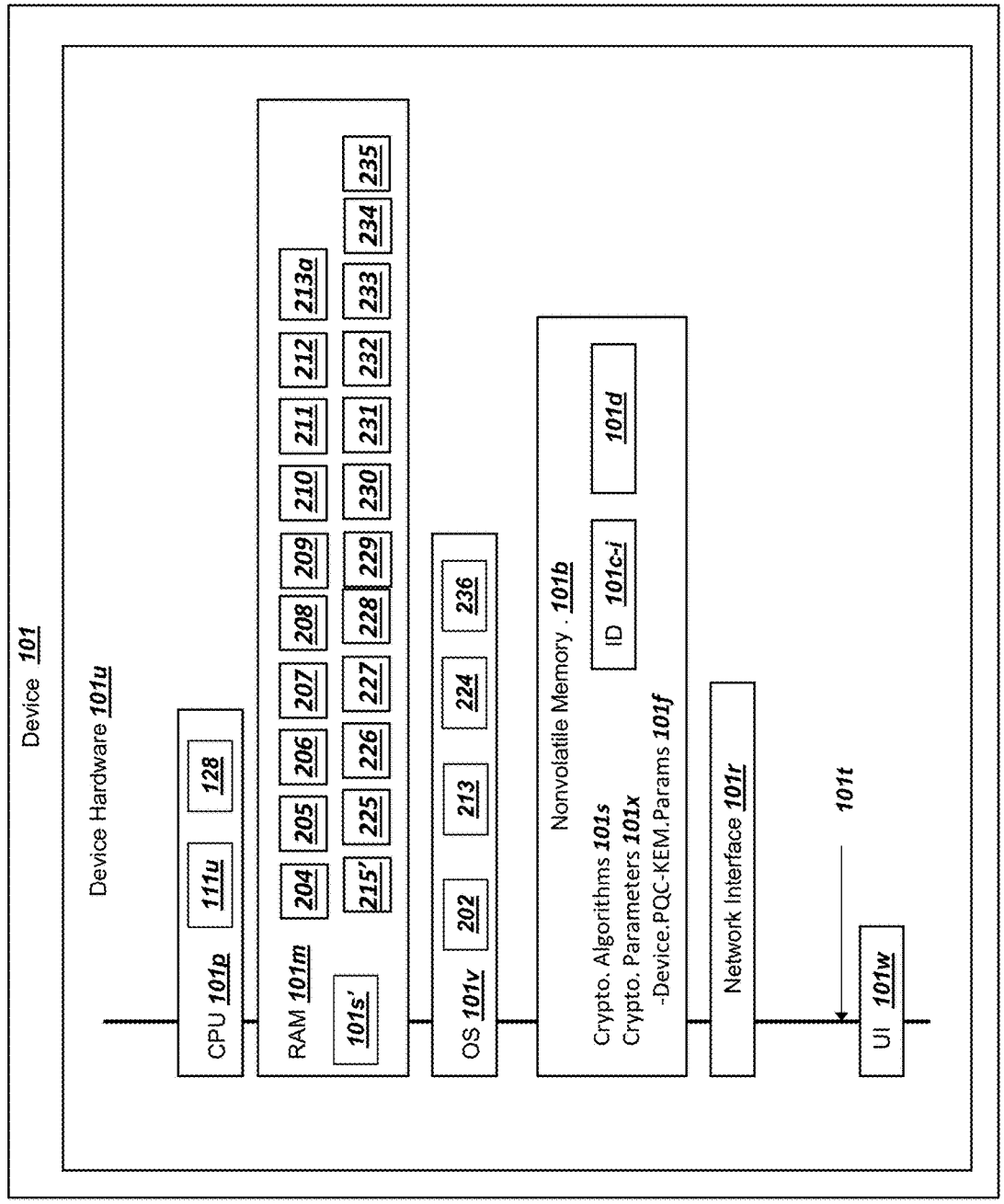
FIG. 12 is a graphical illustration of hardware, firmware, and software components for a device, in accordance with exemplary embodiments.

FIG. 12 is a graphical illustration of hardware, firmware, and software components for a device, in accordance with exemplary embodiments. FIG. 12 is illustrated to include several components that can be common within a device 101. Device 101 can include or operate with device hardware 101*u*. Device 101 may consist of multiple electrical components in order to communicate with a network 103 and a server 111 through an IP network 107. In exemplary embodiments and as depicted in FIG. 12, device 101 can include a device identity 101*c-i*, a processor 101*p* (depicted as "CPU 101*p*"), random access memory (RAM) 101*m*, an operating system (OS) 101*v*, storage memory 101*b* (depicted as "nonvolatile memory 101*b*"), a network interface 101*r* which could comprise a radio, a system bus 101*t*, and a user interface (UI) 101*w*.

Device identity 101*c-i* could comprise a preferably unique alpha-numeric or hexadecimal identifier for device 101, such as an Ethernet MAC address, a domain name service (DNS) name, a Uniform Resource Locator (URL), an owner interface identifier in an IPv6 network, a serial number, an IP address, or other sequence of digits to uniquely identify each of the many different possible nodes for a device 101 connected to an IP network 107. Device identity 101*c-i* can preferably be recorded in a non-volatile memory and recorded during a configuration of a device 101, such as during a configuration step 202 depicted and described in connection with FIG. 2 above.

The CPU 101*p* can comprise a general purpose processor appropriate for lower processing power requirements for a device 101 (compared to a server 111), and may operate with multiple different processor cores. CPU 101*p* can comprise a processor for device 101 such as an ARM® based process or an Intel® based processor such as belonging to the ATOM® family of processors, and other possibilities exist as well. For some exemplary embodiments, the CPU 101*p* can be based on a processor using the RISC-V architecture. CPU 101*p* can utilize bus 101*t* to fetch instructions from RAM 101*m* and operate on the instruction. CPU 101*p* can include components such as registers, accumulators, and logic elements to add, subtract, multiply, and divide numerical values and record the results in RAM 101*m* or storage memory 101*b*, and also write the values to an external interface such as network interface 101*r*. In exemplary embodiments, CPU 101*p* can perform the mathematical calculations for KEM DECAPS 101*j*, KEM ENCAPS 101*k*, symmetric ciphering, etc. depicted and described in connection with in FIG. 1, FIG. 2, etc., above. A CPU 101*p* could also comprise a "system on a chip" (SOC) with a plurality of cores, including an example from the Apple "M" family of processors such as the M1.

For a device 101 operating as virtual machines or containers such as, but not limited to, within Docker or Kubernetes, the device 101 could be allocated a portion of a physical processor CPU 101*p* from a host operating system in order for the device 101 to conduct processing and computational steps as contemplated herein. The portion of a physical processor CPU 101*p* for the device 101 could comprise different embodiments without departing from the scope of the present disclosure. A CPU 101*p* for a device 101 could comprise a "time slice" of a physical SOC within a physical computing device (such as repeated brief periods of time on the order of milliseconds or less for CPU 101*p*) that is shared with other processes or virtual machines running on the host. The CPU 101*p* for a device 101 could comprise a dedicated (for a period of time) processing core of a physical SOC within a physical host server. Or, the CPU 101*p* for a first server could comprise a combination of the allocation of resources from a physical SOC within a physical host server as described in the previous two sentences.

CPU 101*p* can also include a secure processing environment (SPE) or tamper resistant element (TRE) 113 in order to conduct post-quantum cryptography (PQC) key exchange mechanism (KEM) operations and algorithms, such as, but not limited to, (i) conducting KEM ENCAPS function 101*k* depicted and described in connection with FIG. 1 above, (ii) conducting KEM DECAPS function 101*j* depicted and described in connection with FIG. 1 above, and (iii) conducting HKDF functions 210*a*, 221*a*, and 231*a* in order to derive shared secret keys K1 102*k*-1, K2 102*k*-2, and K3 102*k*-3. SPE 101*u* can comprise a dedicated area of silicon or transistors within CPU 101*p* in order to isolate the PQC KEM operations from other programs or software operated by CPU 101*p*, including many processes or programs running operating system 101*v*. TRE 113 could contain RAM memory equivalent to RAM 101*m* and nonvolatile memory equivalent to storage memory 101*b*, as well as a separately functioning processor on a smaller scale than CPU 101*p*, such as possibly a dedicated processor core within CPU 101*p*. TRE 113 can comprise a "secure enclave" or a "secure environment", based on the manufacturer of CPU 101*p*. In some exemplary embodiments, an SPE 101*u* can be omitted and the CPU 101*p* can conduct PQC operations or calculations without an SPE 101*u*.

A processor 101*p* for device 101 could include a hardware random number generator 128. The hardware random number generator 128 can use a sensor such as a sensor in device 101 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number or sensor data can also be used to generate the value M1 208*a* as a random number for the KEM ENCAPS function 101*k* in a step 208 above. The random number generator 128 could also be used to generate random numbers for the use with algorithms and steps as contemplated herein, including the generation of a device ephemeral PM key pair.

RAM 101*m* may comprise a random access memory for device 101. RAM 101*m* can be a volatile memory providing rapid read/write memory access to CPU 101*p*. RANI 101*m* could be located on a separate integrated circuit in device 101 or located within CPU 101*p*. The RAM 101*m* can include data recorded in device 101 for the operation when communicating with a plurality of servers or other devices through an IP network 107. RAM 101*m* may be connected to CPU 101*p* using a system bus 101*t* which could comprise a memory bus, such as supporting DDR5 RAM memory and other possibilities exist as well. As depicted and described in connection with FIG. 1 above, RANI 101*m* could also include an operating system 101*v*, or components of an operating system 101*v* such as a kernel, and other components of operating system 101*v*, such as some supporting libraries could be stored within storage memory 101*b*.

The system bus 101*t* may be any of several types of bus structures including a memory bus or memory controller, a peripheral bus, and a local bus using any of a variety of bus architectures including a data bus. System bus 101*t* connects components within device 101 as illustrated in FIG. 12, such as transferring electrical signals between the components illustrated. Device 101 can include multiple different versions of bus 101*t* to connect different components, including a first system bus 101*t* between CPU 101*p* and RAM 101*m* (which could be a memory bus), and a second system bus 101*t* between CPU 101*p* and network interface 101*r*, which could be an I2C bus, an SPI bus, a PCI bus, or similar data busses.

In exemplary embodiments, RAM 101*m* operating with device 101 can record values and algorithmic steps or computer instructions for conducting a post-quantum cryptography (PQC) key encapsulation mechanisms (KEM). RAM 101*m* may also store the values (i) M1 208*a* from a step 208 and (ii) M2 220*a* from a step 220 above in FIG. 2 and also FIG. 1. RAM 101*m* may store the computer executable instructions for conducting the steps and associated variables and values or constants for steps or functions 204, 205, 206, 207, 208, 209, 210, 211, 212, 213*a*, 215', 225, 226, 227, 228, 229, 230, 231, 232, 233, 234, and 235, which are depicted and described in connection with FIG. 2 above and also previous Figures herein. The exemplary steps depicted in RAM 101*m* listed in the above sentence can comprise computer executable instructions for the processor CPU 101*p* as well as memory cells for storing constants and variables associated with conducting the computer executable instructions. The computer executable instructions for the different steps can be stored in storage memory 101*b* when the device 101 is powered off or in an extended sleep state (such as greater than 10 seconds). The computer executable instructions can be moved by an OS 101*v* from the storage memory 101*b* to the RANI 101*m* during a boot process or a process for the device 101 to begin supporting communications with at least one network 103 or server 111.

Note that the associated data or values for the steps can also be stored within RAM 101*m* for a period of time to both conduct the step and use the resulting data in subsequent steps. As one example, in a step 225 to conduct a hash based key derivation function (HKDF) 221*a* (depicted and described in connection with FIG. 5*a* above), the output from a step 225 comprising a second shared secret key K2 102*k*-2 can be stored in RANI 101*m* and be input into the HKDF 221*a*. In other words and as one example, the depiction of a step 225 in RAM 101m can include both (i) the computer executable instructions to conduct the step and (ii) the data or values associated with the step such as the second shared secret key K2 102k-2 generated or processed by the step. Consequently, a step depicted in RAM 101m can include all of the associated data and instructions or logic to conduct the step, where details for the steps are depicted in FIG. 2 and FIG. 5a above. The output of the HKDF 221a can comprise the second shared symmetric ciphering key S2 221b and MAC key MAC2 221c, which could also be stored within RAM 101m and within physical memory associated with a step 225 allocated to RAM 101m.

As another example for RAM 101m within device 101 or allocated to device 101, RAM 101m could store both computer executable instructions and associated values for a step 231 as depicted in FIG. 6 above. The step 231 within RAM 101m could include the data for a message 236, the first shared secret key K1 102k-1, the second shared secret key K2 102k-2, the third shared secret key K3 102k-3, and the HDKF 231a, as well as the third symmetric ciphering keys S3 231b and MAC3 231c. For some data within RAM 101m for step 231, the depicted data for a step 231 or recited data from the previous sentence could comprise a pointer within RAM 101m for a step 231, such that the data could be recorded or stored within RAM 101m in a different location within RAM 101m than the memory allocated to data for step 231 within RAM 101m.

The operating system (OS) 101v can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 101b, etc. Although the OS 101v is depicted as a component within device hardware 101u, OS 101v may not necessarily comprise a separate electrical component and could comprise a portion of memory cells that store binary data for the OS 101v.

The operating system 101v may include timers and schedulers for managing the access of software to hardware resources within device 101, where the hardware resources managed by OS 101v can include CPU 101p, RAM 101m, nonvolatile memory 101b, and system bus 101t, and well as connections to the IP network 107 via a network interface 101r, which could be a radio or another physical network interface for device 101. The operating system shown of 101v can be appropriate for a lower power computing device with less memory and CPU resources (compared to a server 111). Example operating systems 101v for a device 101 includes Linux or Android or IOS, and other possibilities exist as well. Although depicted as a separate element within device 101 in FIG. 12, OS 101v may reside in RAM 101m and/or nonvolatile memory 101b during operation of device 101.

As depicted in FIG. 12, OS 101v in FIG. 12 can contain algorithms, programs, or computer executable instructions (by processor 101p or TRE 113) for conducting or performing a configuration step 202 for device 101. The portion of actions for a configuration step 202 performed by the OS 101v are depicted in FIG. 12 as 202', which can include the steps to store data in a step 202 as depicted and described in connection with FIG. 9 above. An OS 101v can include algorithms for the device 101 to process the network layer data (such as a server 111 destination IP address) and transmit a message 213 from device 101 using a network interface 101r, where the message 213 is depicted and described in connection with FIG. 2 above. In other words, OS 101v can include libraries and drivers such that the message 213 could be processed using the data from the series of steps 204 through 213a depicted and described in connection with FIG. 2. The OS 101v could then write the data for message 213 via the system bus 101t to the network interface 101r (which could comprise a radio), where the network interface 101r can subsequently transmit the message 213 to the IP network 107.

An OS 101v can also include the executable instructions for processor 101p to receive messages such as, but not limited to, a message 224 as depicted and described above in connection with FIG. 2. In other words, OS 101v can include libraries and drivers such that the message 224 could be received from the IP network 107 using the network interface 101r and system bus 101c. The OS 101v could parse the data received in a message 224 and store contents from the message 224 in RAM 101m such that the device 101 could conduct the subsequent steps using the data from the message 224. The OS 101v could write data from the message 224 to RAM 101m, and then the computer executable steps in RAM 101m such as associated with steps 215' through 235 could process the data from a message 224. The receipt of a message 224 and then steps 215' through 235 using the data from a message 224 and additional data stored in RAM 101m is also depicted and described in connection with FIG. 2 above.

Nonvolatile memory 101b or "storage memory" 101b (which can also be referred to herein as "memory 101b") within device 101 can comprise a non-volatile memory for long-term storage of data, including times when device 101 may be powered off or within an extended sleep state such as a sleep state longer than a few seconds. Memory 101b may be a NAND flash memory or a NOR flash memory and record firmware for device 101, such as a bootloader program and OS 101v. Memory 101b can record long-term and non-volatile storage of data or files for device 101. In an exemplary embodiment, OS 101v is recorded in memory 101b when device 101 is powered off, and portions of memory 101b are moved by CPU 101p into RAM 101m using a boot loader when device 101 powers on. FIG. 12 depicts device 101 when powered on and communicating with a server 111 as depicted and described in connection with FIG. 2 above. When device 101 is powered off, then the nonvolatile memory 101b could also record the associated steps depicted for RAM 101m in nonvolatile memory 101b, and an OS 101v could copy the steps depicted for RAM 101m in FIG. 12 from nonvolatile memory 101b into RAM 101m.

Memory 101b (i) can be integrated with CPU 101p into a single integrated circuit (potentially as a "system on a chip"), or (ii) operate as a separate integrated circuit connected to CPU 101p via a memory bus for system bus 101t. Memory 101b may also be referred to as "device storage" and can include exemplary file systems of FAT16, FAT32, NTFS, ext3, ext4, UDF, or similar file systems. As contemplated herein, the terms "memory 101b", "storage memory 101b", and "nonvolatile memory 101b" can be considered equivalent. As depicted in FIG. 12, non-volatile memory 101b can record cryptographic algorithms 101s, cryptographic parameters 101x, device PQC KEM parameters 103f, and at least one device identity of 101c-i, and a device static private key for signatures of SK-signature.device 101d.

Device 101 can include a network interface 101r to communicate with IP network 107 and a plurality of networks 103 and servers 111, as depicted in FIG. 1 above (where FIG. 1 depicts a single network 103 and server 111). Network interface 101r can comprise either a wired connection such as Ethernet or a wireless connection using a radio. FIG. 1 depicts the use of a radio for network interface 101r, but other physical network interfaces for communicating through an IP network 107 are possible as well. For wireless configurations of device 101, then network interface 101r can comprise a radio, which could connect with an antenna in order to transmit and receive radio frequency signals. For a wireless configuration of device 101, network interface 101r within device 101 can provide connectivity to an IP network 107 through (i) 3GPP standards such as 3G, 4G, 4G LTE, and 5G networks, or IEEE 802.11 networks or subsequent and similar standards. A single network interface 101r is depicted within FIG. 1 and FIG. 12, and the network interface 101r could consist of separate physical interfaces such as a both a first interface for connecting with a wired network and a second interface for connecting with a first wireless network and a third network interface for connecting with a second wireless network.

Device 101 may also optionally include user interface 101w which may include one or more interfaces for receiving inputs and/or one or more interfaces for conveying outputs. User interfaces are known in the art and may be standard for many devices 101 such as a few LED lights or and LCD display, and thus user interfaces are not described in detail here. User interface 101w could comprise a touch screen or screen display with keyboard and mouse, if device 101 has sophisticated interaction with a user, such as a user with administrative rights. Device 101 can optionally omit a user interface 101w, if no user input or display is required for establishing communications with a network 103 and/or server 111 through an IP network 107.

Although not depicted in FIG. 12, device 101 can include other components to support operation, such as a clock, power source or power connection, antennas, etc. Other possibilities exist as well for hardware and electrical components operating in a device 101 without departing from the scope of the present disclosure. Using the electrical components depicted in FIG. 12, a device 101 could send and receive the data 106 in FIG. 1 in an encrypted and secure manner after conducting the authenticated PQC KEM steps as contemplated herein, in order to conduct secure communications with at least one network 103 and server 111.

CONCLUSION

Various exemplary embodiments have been described above. Those skilled in the art will understand, however, that changes and modifications may be made to those examples without departing from the scope of the claims.

The invention claimed is:

1. A method for a server to securely communicate with a device, the method performed by the server, the method comprising:
   a) storing in nonvolatile memory a first set of key encapsulation mechanism (KEM) parameters and a server static private key;
   b) receiving a first message from the device, wherein the first message includes a first asymmetric ciphertext and a first symmetric ciphertext;
   c) conducting a KEM decapsulation (DECAPS) function with the first asymmetric ciphertext and the server static private key in order to generate a first shared secret;
   d) generating a first symmetric ciphering key using at least the first shared secret;
   e) decrypting the first symmetric ciphertext using the first symmetric ciphering key, wherein a first plaintext from the first symmetric ciphertext includes a device ephemeral public key, a second set of KEM parameters, and a first subset of both (i) the first set of KEM parameters and (ii) the second set of KEM parameters;
   f) selecting a second subset of both the first set of KEM parameters and the second set of KEM parameters, wherein the first subset and the second subset are different;
   g) conducting a KEM encapsulation (ENCAPS) function to generate a second shared secret and a second asymmetric ciphertext using at least (i) the device ephemeral public key and (ii) the first subset;
   h) generating a second symmetric ciphering key using at least the second shared secret;
   i) generating a server ephemeral public key and a server ephemeral private key using the second subset;
   j) encrypting (i) the second asymmetric ciphertext into a second symmetric ciphertext using the first symmetric ciphering key, and (ii) a second plaintext comprising the server ephemeral public key into a third symmetric ciphertext using the second symmetric ciphering key; and
   k) sending a second message to the device, wherein the second message includes the second symmetric ciphertext and the third symmetric ciphertext.

2. The method of claim 1, wherein the first set of KEM parameters comprises a first KEM algorithm, and wherein the second set of KEM parameters comprises a second KEM algorithm, and wherein the first subset of KEM parameters and the second subset of KEM parameters comprise different algorithm types.

3. The method of claim 2, wherein the first KEM algorithm comprises a first algorithm type for lattice-based cryptography and the second KEM algorithm comprises a second algorithm type for code-based cryptography.

4. The method of claim 2, wherein the first KEM algorithm comprises a first algorithm type for code-based cryptography and the second KEM algorithm comprises a second algorithm type for lattice-based cryptography.

5. The method of claim 1, wherein the first plaintext includes (i) a device certificate with a device static public key and (ii) a device digital signature over at least the device ephemeral public key, and wherein the server verifies the device digital signature using the device static public key.

6. The method of claim 1, wherein the second plaintext includes (i) a server digital signature over at least the server ephemeral public key, and (ii) a server certificate.

7. The method of claim 1, wherein the first symmetric ciphering key comprises a first portion and a second portion, wherein in step e) the server decrypts with the first portion of the first symmetric ciphering key, and wherein in step j) the server encrypts the second asymmetric ciphertext with the second portion of the first symmetric ciphering key.

8. The method of claim 1, further comprising in step h), generating the second symmetric ciphering key using a HMAC-based Extract-and-Expand Key Derivation Function (HKDF) with at least the first shared secret and the second shared secret.

9. The method of claim 8, further comprising in step h) generating a message authentication code (MAC) key and an initialization vector with the HKDF.

10. The method of claim 1, wherein the second plaintext comprises a secure hash value over at least the first message and the second message.

11. A network for securely communicating with a device, the network comprising:

a nonvolatile memory configured to store a first set of key encapsulation mechanism (KEM) parameters and a server static private key;

a network interface configured to:

a) receive, from the device, a first message comprising a first asymmetric ciphertext and a first symmetric ciphertext of a first plaintext comprising (i) a device ephemeral public key, (ii) a second set of KEM parameters and (iii) a first subset of both the first set of KEM parameters and the second set of KEM parameters, wherein the device ephemeral public key supports the first subset; and b) send, to the device, a second message comprising a second symmetric ciphertext and a third symmetric ciphertext;

a random access memory (RAM) storing computer executable instructions configured to:

a) select a second subset of both the first set of KEM parameters and the second set of KEM parameters, wherein the first subset and the second subset comprise different algorithm types; and b) generate a server ephemeral public key and a server ephemeral private key for the second subset, wherein the server ephemeral public key corresponds to the server ephemeral private key; and a processor configured to:

a) conduct a KEM decapsulation (DECAPS) function with the first asymmetric ciphertext and the server static private key in order to generate a first shared secret;

b) generate a first symmetric ciphering key using at least the first shared secret;

c) decrypt the first symmetric ciphertext using the first symmetric ciphering key;

d) conduct a KEM encapsulation (ENCAPS) function to generate a second shared secret and a second asymmetric ciphertext using at least (i) the device ephemeral public key and (ii) the first subset;

e) generate a second symmetric ciphering key using at least the second shared secret and the first shared secret; and f) encrypt (i) the second asymmetric ciphertext into the second symmetric ciphertext using the first symmetric ciphering key, and (ii) a second plaintext comprising the server ephemeral public key and the second subset into the third symmetric ciphertext using the second symmetric ciphering key.

12. The network of claim 11, wherein the first subset of both the first set of KEM parameters and the second set of KEM parameters comprises a first KEM algorithm, and wherein the second subset of both the first set of KEM parameters and the second set of KEM parameters comprises a second KEM algorithm, and wherein the first subset and the second subset of KEM parameters comprise different algorithm types.

13. The network of claim 12, wherein the first KEM algorithm comprises a first algorithm type for lattice-based cryptography and the second KEM algorithm comprises a second algorithm type for code-based cryptography.

14. The network of claim 12, wherein the first KEM algorithm comprises a first algorithm type for code-based cryptography and the second KEM algorithm comprises a second algorithm type for lattice-based cryptography.

15. The network of claim 11, wherein the first plaintext includes (i) a device certificate with a device static public key and (ii) a device digital signature over at least the device ephemeral public key, and wherein the network verifies the device digital signature using the device static public key.

16. The network of claim 11, wherein the second plaintext includes (i) a server digital signature over at least the server ephemeral public key, and (ii) a server certificate.

17. The network of claim 11, wherein the first symmetric ciphering key comprises a first portion and a second portion, wherein, in step c) for the processor, the processor decrypts with the first portion of the first symmetric ciphering key, and wherein, in step f) for the processor, the processor encrypts the second asymmetric ciphertext with the second portion of the first symmetric ciphering key.

18. The network of claim 11, further comprising in step e) for the processor, generating the second symmetric ciphering key using a HMAC-based Extract-and-Expand Key Derivation Function (HKDF) with at least the first shared secret and the second shared secret.

19. The network of claim 18, further comprising in step e) for the processor, generating a message authentication code (MAC) key and an initialization vector with the HKDF.

20. The network of claim 11, wherein the second plaintext comprises a secure hash value over at least the first message and the second message.

* * * * *